United States Patent [19]

Frankle et al.

[11] 4,384,336

[45] May 17, 1983

[54] METHOD AND APPARATUS FOR LIGHTNESS IMAGING

[75] Inventors: Jonathan A. Frankle, Watertown; John J. McCann, Belmont, both of Mass.

[73] Assignee: Polaroid Corporation, Cambridge, Mass.

[21] Appl. No.: 182,636

[22] Filed: Aug. 29, 1980

[51] Int. Cl.$^3$ .......................... G06F 15/20; H04N 5/19
[52] U.S. Cl. ..................................... 382/49; 358/160; 358/280; 364/525
[58] Field of Search ............................. 364/515–525; 358/21 R, 37, 134, 133, 160, 166, 280, 284

[56] References Cited

U.S. PATENT DOCUMENTS

| | | | |
|---|---|---|---|
| 4,057,830 | 11/1977 | Adcock | 358/134 |
| 4,174,515 | 11/1979 | Sternberg | 364/515 X |
| 4,215,414 | 7/1980 | Huelsman | 364/515 |
| 4,229,797 | 10/1980 | Ledley | 364/515 |
| 4,231,095 | 10/1980 | Cassagne | 364/515 |

OTHER PUBLICATIONS

Hubel, David H. and Wiesel, Torsten N., "Uniformity of Monkey Striate Cortex: A Parallel Relationship Between Field Size, Scatter, and Magnification Factor", *Journal of Comparative Neurology*, Dec. 1, 1974, vol. 158, pp. 295–306.

Blakemore, C. and Campbell, F. W., "On The Existence of Neurones In The Human Visual System Selectively Sensitive to the Orientation And Size of Retinal Images", *Journal of Physiology*, 1969, vol. 203, pp. 237–260.

Andrews, Harry C., "Monochrome Digital Image Enhancement", *Applied Optics*, Feb. 1976, vol. 15, No. 2, pp. 495–503.

Primary Examiner—Felix D. Gruber
Attorney, Agent, or Firm—W. Hugo Liepmann; William D. Roberson

[57] ABSTRACT

This invention provides mechanisms that detect the large dynamic range of radiant intensities in the natural environment, that use novel strategies to calculate an approximation of visual properties of objects, and that represent a scene with an image having a specific dynamic range that is optimal for display media such as photography, television and printing.

Photographs and other images are made according to the foregoing mechanisms from lightness fields produced from multiple comparisons between information associated with a different segmental areas of an image field. Different comparisons involve different groups of segmental areas, and different groupings have at least one spatial parameter different from other groupings of areas. Comparisons advantageously are made in succession with an ordered sequence of the spatial parameter and employing results of prior comparisons.

86 Claims, 21 Drawing Figures

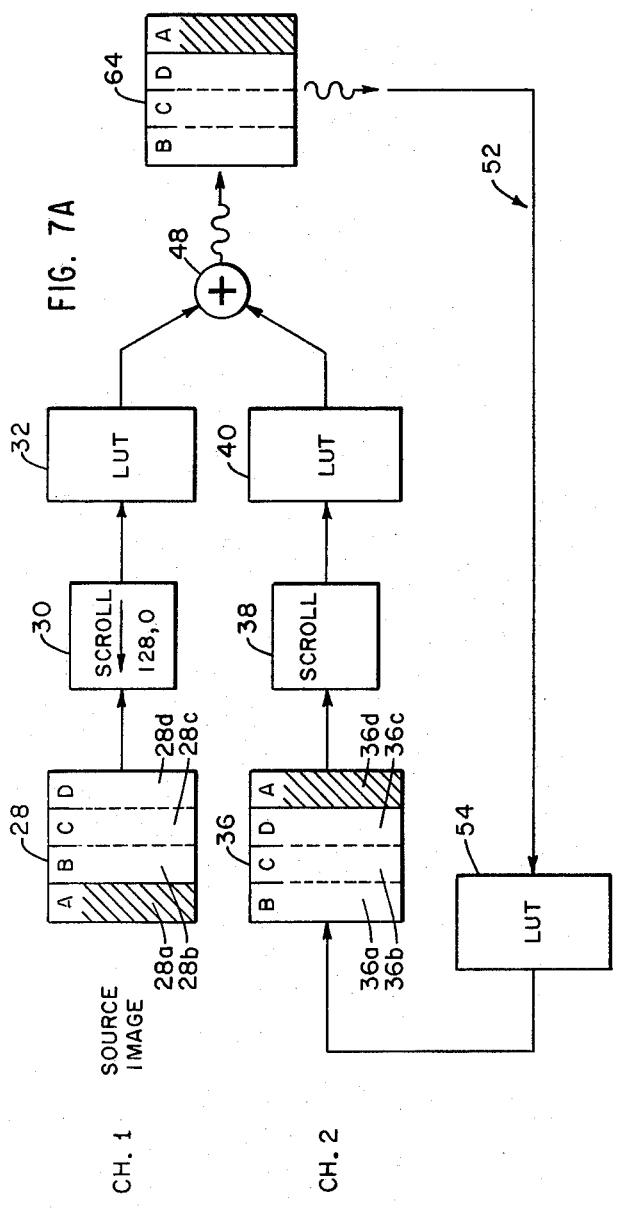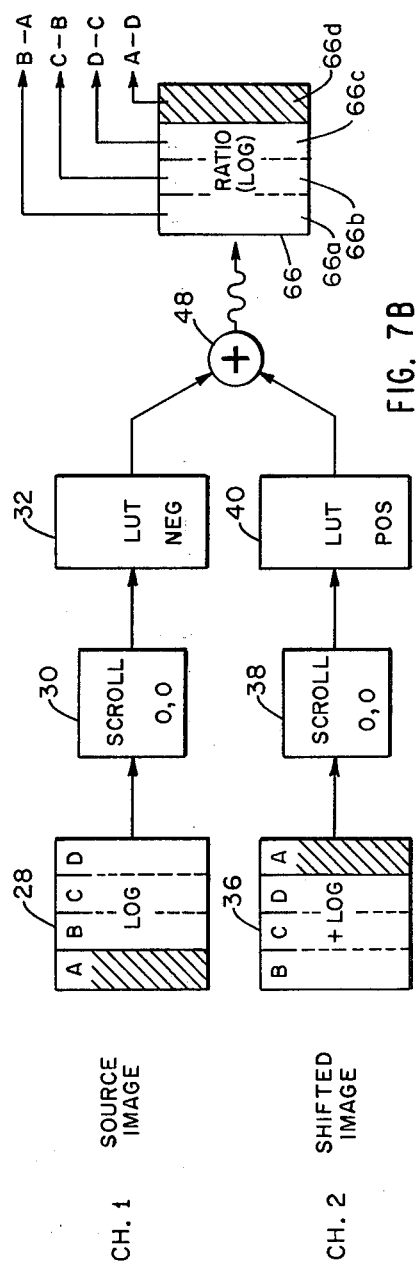

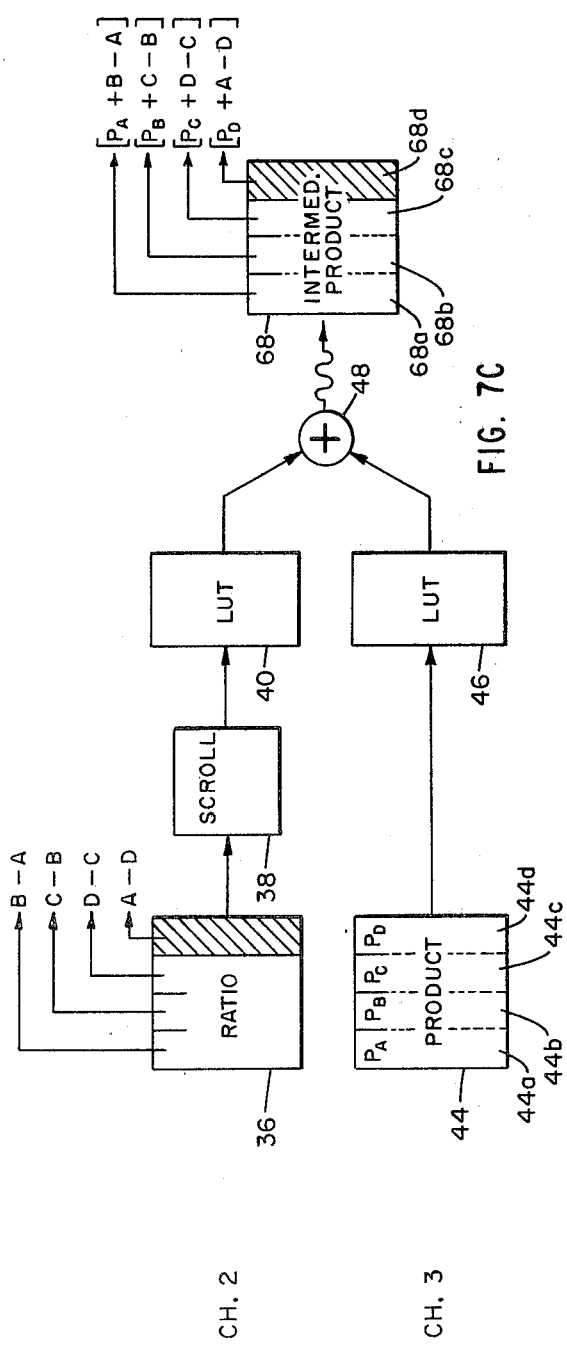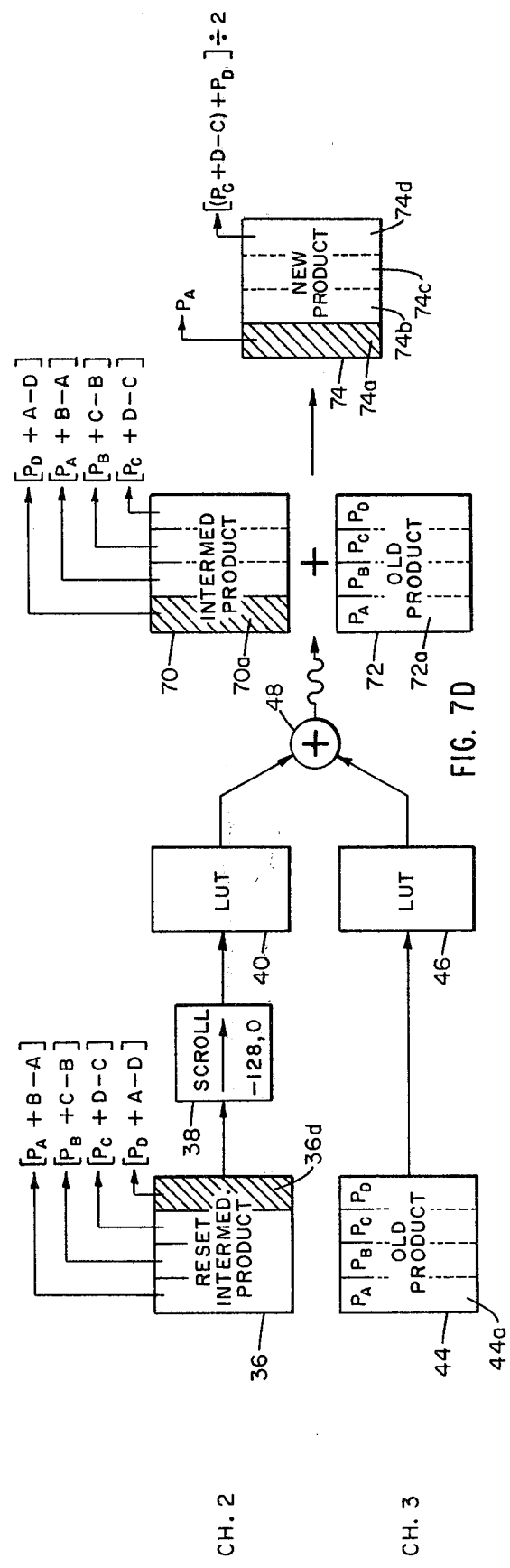

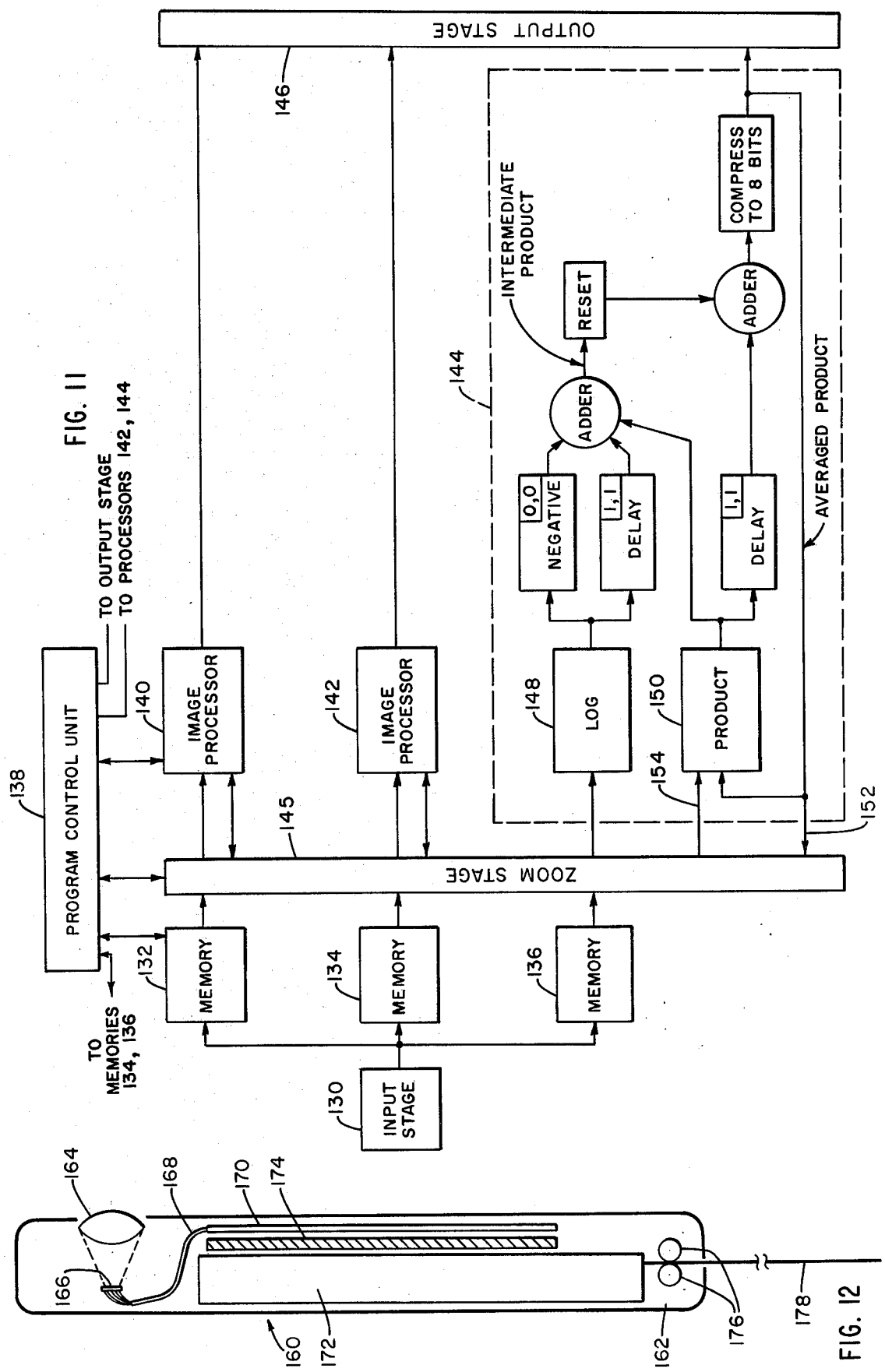

METHOD AND APPARATUS FOR LIGHTNESS IMAGING

BACKGROUND OF THE INVENTION

This invention relates to the art of creating and of processing images. It provides a method and apparatus for computing or processing visually perceptible images in terms of a lightness field. A lightness field is herein defined as the output of a process that uses radiances falling on a light-detector from an original image to produce a new set of values that correspond to the sensations of lightness produced by the human visual system.

Vision science begins with the basic properties of light, for which there are clearly established quantitative concepts tied to physical measures. For example, the radiance from a given region denotes flux of radiant energy per unit projected area per unit solid angle. Reflectance of a surface denotes the fraction of incident radiant energy (of a specified wavelength distribution) reflected by the surface.

Less consensus has developed in characterizing human reaction to light, and it is not surprising that a term such as lightness, which generally refers to a sensation, has at different times been assigned different meanings. Thus, in Webster's New International Dictionary, Second Edition, lightness was defined as the "state or quality of illumination, or degree of illumination," i.e., a physical measure. In Webster's New International Dictionary, Third Edition, lightness in addition denotes a sensation, namely, "the attribute of object colors by which the object appears to reflect or transmit more or less of the incident light and which varies for surface colors from black as a minimum to white as a maximum. . .".

The later definition recognizes the importance of appearance, i.e. the sensation. Sensation is important because the lightness of an object is not necessarily related to the physical quantity of light from the object, either in radiometric or photometric terms. An object will hold its position on a lightness scale despite large changes in its intensity. Much of the difficulty in terminology thus arises because visual sensations characterizing a specific region cannot be directly related to any physical measure of light from that region alone.

The term lightness as used in connection with these teachings will have a primary meaning of a visual sensation as produced by biological systems such as human vision. These lightness sensations are produced by a biological system that takes the radiance at each point in the field of view and yields a lightness value for each point in the field of view. In particular, lightness denotes a visual sensation which ranges from dark to light and which characterizes image regions in specific conditions. One of the more interesting properties of human vision is that the cerebro-retinal lightness signal processing system is such that the lightness sensed at any point does not have a simple functional relationship to the radiance at that point. Lightness thus does not depend on the physical properties of single points or objects in the field; lightness instead depends on relationships between physical properties of all the points or objects across the field of view. Lightness does not result from point by-point processing; lightness results from processing the entire field.

Lightness can be quantified by employing a technique of visual comparisons. First, one establishes a standard display that includes reference areas covering the range from minimum to maximum reflectance in controlled illumination and surround. One then presents an observer with another area in any viewing condition and asks the observer to select the best visual match of that area to a reference area of the standard display. Finally, one takes the reflectance of the chosen reference area and typically applies a monotonic scaling function so that equal increments in the resulting lightness numbers are assigned to equal changes in sensation. Such approach emphasizes the fact that although lightness is a sensation produced by a human or other biological system, it is a quantifiable entity. The correspondence in reports from large numbers of observers in numerous experiments of this type shows that these sensations are generated by a repeatable set of physical relationships. Since lightness depends on the entire image, a physical definition of lightness must incorporate a process which utilizes the entire field of view.

The teaching herein describes signal processing systems which generate quantities that correspond to lightness. The quantities, however, are generated by machine signal processing systems rather than biological systems. For clarity we define a separate term to described these machine-generated quantities that correspond to lightness. We have chosen the term "lightness field" as the name of the output of the machine for the selected field of view. The choice emphasizes the fact that a lightness field is derived from signal processing operations which involve the field of view. This characteristic of lightness field computation distinguishes it from other signal processing strategies that involve either single points or local areas of the image.

Human vision is remarkable for its ability to generate sensations that correspond to the physical properties of objects in the field of view regardless of the radiant intensity and of the wavelength distribution of the light falling on the retina. The wavelength-intensity distribution of the light from an object falling on a light detector such as a photosensitive element is a function of two independent variables: the illumination at the object and the ability of the object to reflect or transmit light. However, the radiance measurements for any single picture element, i.e. pixel, are not subject to an analysis which identifies the independent contributions of illumination and of object properties.

This invention, on the other hand, uses the entire field of view to calculate visual properties of objects substantially independently of the properties of the illuminant. Using the entire field of view is considered essential to a solution of the problem that cannot presently be solved by processing information at individual pixels independently of that at other pixels.

It is difficult for a photograph or like image to accommodate variabilities of lighting conditions, even when care is taken to center the limited dynamic range of the image medium on the dynamic range of the light being recorded. Consider the light reflected from a collection of different colored and textured objects, ranging from the brightest white to the darkest black, when special effort is taken to illuminate the collection so that the same intensity of light of the same spectral composition falls on each point in the field of view. The dynamic range of the light reflected from this collection of uniformly-illuminated objects is significantly less than a range of 100-to-1. The brightest white objects may reflect roughly only 92% of the light falling on them, whereas the darkest black velvet objects may reflect roughly at least 3% of the light falling on them. The light reflected from objects having matte surface falls between these extreme values for bright white and for black velvet.

These physical properties of objects limit reflective reproduction media, such a photographic prints and printing, to a like dynamic range, i.e. to a range significantly less than 100-to-1.

However, the dynamic range of intensities from real life, i.e. from natural images, is far larger than that in this special uniformly-illuminated experiment. Natural scenes include sizable variations in the dynamic range of the illumination. First, natural illumination varies both in overall total intensity and in local regions because some objects are shaded by others. Second, the spectral composition of the incident light may vary dramatically from skylight to sunlight to tungsten light to fluorescent light. As noted, human vision is remarkable in that it generates image sensations which are nearly indifferent to this extreme variability of lighting conditions. These same variations in illumination, however, produce marked and usually detrimental results in conventional image-reproducing systems, whether photographic, television or printing.

The present invention endeavors to resolve these imaging problems. More particularly, this invention provides mechanisms that detect the large dynamic range of light intensities, that use a novel strategy to calculate approximations of visual properties of the objects in the field of view, and that represent the entire image in a limited dynamic range that is optimal for media such as photography, television and printing. A significant feature of the invention accordingly is the calculation of lightness fields that portray large dyanmic ranges of the original scene in terms of limited dynamic ranges defined by the range of intensities available in various media.

Various photographic defects result from attempting to photograph the natural environment "as is". Ordinarily the photographer consciously tries to avoid or minimize these defects by the practice of his art. He measures the light coming from the objects in the scene and adjusts the time and the aperture settings so that the exposure will fall on the desired portion of the limited dynamic range of the film. He artificially illuminates all or part of the scene to compensate for non-uniformities in illumination across the scene. He uses color-correcting filters to match the spectral properties of the scene to the spectral sensitivity of the film. The photographer makes these corrections in part by estimating the physical properties of the illumination, perhaps with the aid of a light meter. A television cameraman and his crew follow similar procedures. Further, present-day automatic cameras determine the lens aperture and the shutter time settings, but they do not do all that is necessary to correct the range of lighting problems found in a natural environment.

The power of the concepts set forth herein can be illustrated by the following practical experiments demonstrating advantages realized and realizable in one practice of this invention. The description is of six experiments that emphasize typical common handicaps presently encountered in photographing complex images. Typical photographic defects result from the mismatch between the dynamic color range of an orginal scene and the limited color and intensity responses of photographic materials. For the following experiments, a complex original scene is provided in the form of a recorded and displayed television image. This image is in full color and portrays a wide range of hues occurring in varying densities, for example, a woman in a colorful costume against a bright multicolored floral background.

In each experiment a control image is described which represents the response to each original scene of a conventional photographic system that does not employ this invention. The first such control image demonstrates the mismatch commonly encountered between the dynamic color range of an original scene and the limited color response characteristic of color film. For example, highlights exhibit a degree of levelling and desaturation, whereas shadow areas show little evident image detail. In the first experiment of the invention, the same original scene is subjected to lightness analysis by the lightness imaging system defined below and is photographed on a standard photographic medium. This first processed image is found to possess much clearer image detail in shadow and in highlight areas, a better defined range of color values, and improved saturation. To the eye of an observer, the processed image more accurately represents the content of the original scene than does the control image. In producing the processed image in this first experiment, as in the others described below, the only image information available to the lightness imaging system is that which is contained within the original scene itself.

In a second experiment, the same original scene used in the first experiment is modified by the superimposition of a ten-to-one illumination gradient from one side of the scene to the other. When this modified scene is photographed, using conventional techniques to produce a control image, most of the image detail is lost in the darkest portions of the image, or in the brightest portions, and most of the color values are lost. But when this modified scene is analyzed and photographed using the lightness imaging system of this invention, a second processed color print is obtained which is virtually indistinguishable from the first processed image described above. The ten-to-one illumination gradient has disappeared, and the resultant image displays the same saturation, image detail, and pleasing dynamic range as that of the first processed image. Furthermore, this second processed image is obtained by the same lightness imaging system operating in the same way and with no further modifications, adjustments, or revised programming.

A third experiment is performed. The original scene is now subjected to different modification representing tungsten illumination of the scene. As a consequence, the intensity of the middle-wavelength illuminant is only 41% of that of the long-wavelength illuminant, and that of the short-wavelength illuminant is a mere 5% of that of the long-wavelength illuminant. An ordinary photograph of this modified scene is strongly reddish with few discernible green color values and with practically no visible blue color values. However, when this modified scene is processed by the lightness imaging system, operating in the same unmodified way, a third processed color print is obtained which is virtually indistinguishable from the first two.

Then in a fourth experiment, the original scene is subjected to both of the illumination modifications employed in the second and third experiments. Thus, not only are the color values of the entire scene altered by a tungsten illuminant, but the illuminant varies by a ten-to-one gradient from one side of the original scene to the other. A conventional photograph of this modified scene is strongly reddish with few discernible green color values and practically no blues, and all the image detail appears lost in the darker portion of the illumination gradient. At this point it should come as no surprise to learn that indeed the fourth processed image obtained by the apparatus and method of this invention is not only essentially free of the imposed modifications, but is substantially identical to the first, second, and third processed images.

A common problem in photography, different from those already considered, is that of preserving image detail in distinct areas of a scene that has different overall levels of illumination. Two additional experiments are described with a new original scene that shows a household interior in which a person is seated by a window onto a colorful outdoor view.

In a fifth experiment, the new original scene is characterized by an eight-fold reduction in the illumination of the view outside the window; that is, this modified original scene depicts the illumination of an evening. When this evening scene is photographed, with the same conventional practices previously used to produce a control image, most of the image detail and color values in the outdoor portion of the scene are lost. But when this modified scene is analyzed and photographed using the lightness imaging system of this invention, a fifth processed color print is obtained in which the scene is accurately represented both inside and outside the window with the same improvements in image quality described for the previous experiments and in which the outdoor view still appears somewhat darker, as is true of the evening setting.

In a sixth experiment, the new original scene is characterized by an eight-fold reduction in the illumination of the indoor scene in front of the window with no reduction in the illumination of the outdoor view behind the window. The modified scene now represents a daytime setting with the indoor portion relatively darker than the bright outdoor view. When this daytime setting is photographed, most of the image detail and color values in the indoor portion are lost. But when this modified scene is analyzed and photographed using the lightness imaging system of this invention, a sixth processed color print is obtained in which the scene is accurately represented both inside and outside the window with the same improvements in image quality described for the previous experiments and in which the indoor scene appears somewhat darker, as is the actual case for a daytime setting.

Furthermore, the fifth and the sixth processed images are obtained with exactly the same lightness imaging system operating in exactly the same way as for the first four processed images.

The invention thus advances the art of retinex processing as disclosed in the literature, examples of which are:

U.S. Pat. No. 3,553,360
U.S. Pat. No. 3,651,252
E. H. Land and J. J. McCann, "Lightness and Retinex Theory", *J. Opt. Soc., Am.*, 61, 1–11 (1971).
E. H. Land, "The Retinex Theory of Colour Vision", *Proc. Royal Inst. of Gr. Brit.*, 47 (1974).
J. J. McCann, S. P. McKee and T. H. Taylor, "Quantitative Studies in Retinex Theory", *Vision Research*, 16, 445–458 (1976).

Other publications in the imaging art are the article by T. G. Stockham, Jr., "Image Processing in the Context of a Visual Model", *Proceedings of the IEEE*, Vol. 60, No. 7, July 1972, pages 828 through 842; the article by David Marr, "The Computation of Lightness by the Primate Retina", *Vision Research*, Vol. 14, pages 1377 through 1388; and the article by Oliver D. Faugeras, "Digital Color Image Processing Within the Framework of a Human Visual Model", *IEEE Transactions on Acoustics, Speech, and Signal Processing*, Vol. ASSP27, No. 4, August 1979, pages 380–393. This invention employs techniques which differ significantly from the image processing which these articles discuss.

Objects of this invention, and advantages which it brings to the art of imaging, include attaining lightness imaging with fewer signal processing steps or computations in considerably less time then previously available.

A further object is to provide a method and apparatus for lightness imaging applicable on a practical basis to numerous image processing and numerous image creating instances.

Another object of the invention is to provide a method and apparatus for providing an image, termed a lightness image, which represents a scene in a limited dynamic range that is optimal for display media such as photography, television and printing.

It is also an object to provide image processing that uses information acquired at one segmental area of an image in evaluating information acquired at other segmental areas in a learning-like manner that attains a desired lightness field in relatively small time and with relatively few processing steps.

It is also an object to provide a method and apparatus of the above character suited for commercial application.

Other objects of the invention will in part be obvious and will in part appear hereinafter.

SUMMARY OF THE INVENTION

The practice of the invention enables one to produce images in a way that is analogous to human vision because it represents in a limited dynamic range the much larger dynamic range of radiances found in the natural environment. Media using lightness fields produced in this way can have a far greater visual fidelity then previously available on a repeatable basis. Further, the media images can be essentially free of defects such as illumination artifacts, color imbalance, and other spectral mismatches.

In accordance with the invention an image is produced from multiple comparisons between radiance information at different locations of an image field. The different comparisons are made between different groupings of locations, and at least some groupings involve locations characterized by a spatial parameter different from that of other groupings.

In further accordance with the invention, information is provided, for example by viewing a scene with an optical detector array, identifying the radiances associated with arrayed sections of an image field. Multiple measures are made of transitions in the radiance information between each segmental area of the image field and other such areas of the field. The several measures involve groupings of each area with other areas in a way such that the areas of different groupings differ in at least on spatial parameter. The different grouped areas cover different sectors of the viewing field and consequently can be areas separated by different distances, areas separated along different directions, and areas of different sizes. These measures—produced in response to radiance information and from such differently grouped segmental areas of the viewing field—are combined to provide the desired lightness information for the entire image field.

The measures of transition in radiance information preferably are determined for different groupings of segmental areas according to a sequential ordering which proceeds, for example, from groupings of maximum spatial parameter to groupings of progressively smaller spatial parameter. This sequential ordering has been found to diminish the level of unwanted artifacts in the processed image.

A feature of the invention is that it produces an image from multiple comparisons between radiance information at different locations in an image field by proceeding on a field-by-field basis. Each iteration of the process, in the illustrated embodiments, makes new comparisons for essentially all locations in the entire field. This is in contrast to a prior practice in which each basic operation provides a new comparison for only one location.

Another feature of the invention is that it produces an image from multiple comparisons between radiance information at different locations in the image field by also using a combined reset-pooling technique. The technique enables image information accumulated for each location to be used in evaluating image information for other interacting locations.

It is also a feature of the invention that the multiple image-producing radiance comparisons combine local image information with information from more distant parts of the image. This local-global computation attains a lightness field of desired quality with relatively few computations and in relatively short time.

Yet another feature of the invention is that it combines the foregoing field-by-field computations, information accumlation by reset-pooling techniques, and local-global calculations to accomplish in real time all calculations for imaging complex natural scenes.

In the embodiments described below, the groupings of segmental areas are pairings, i.e. each involves two segmental areas or picture elements. Further, each measure is made with two pixels, i.e. picture elements, that are identical in size and in shape. The two pixels in an illustrated pairing, however, differ in a spatial parameter from other paired pixels. In one instance, the pixels of one pair are of different size from the pixels of another pair. In another instance, one pair involves pixels separated by a distance different from the separation between other paired pixels, and/or one pair involves pixels separated along a direction different from the separation direction of other paired pixels.

Also in the embodiments below, each measure of the radiance information at the paired pixels is determined with a transition measure e.g. with the ratio of the radiance information associated with two paired pixels. This ratio is multiplied by a dimensionless value previously assigned to or determined for one pixel of the pair, i.e. for the divisor pixel of the ratio. The resultant product is reset with reference to a selected limit. The reset ratio product can serve as the desired comparison measure for a given pairing of pixels.

However, in a preferred practice of the invention, the reset ratio product is pooled by combining it with a dimensionless lightness-related value previously assigned to or determined for the other pixel of the pair. The resultant from this operation is the desired measure for that pair of pixels. This further step is desirable because it increases the rate at which radiance information is accumulated from different pixels. It hence decreases the number of computational steps needed to attain a lightness image.

More particularly, each radiance-transition measure for a pixel contains information regarding the lightness generating property to be provided at that location in the resultant image. An objective for lightness imaging in accordance with the invention is to compare the radiance information for each pixel with that of substantially all others and thereby determine the lightness property which each pixel has in the complete image field. The output of this process for all locations is the lightness field. The repetitive replacement of the reset ratio product information for one pixel in each pair accumulates this information relatively slowly. The rate of information accumulation is increased significantly by combining the reset ratio product from one iteration with the measure previously determined for or assigned to one pixel in each pair, and using the combined measure for the next iteration, i.e. in the next pairing of that pixel.

To this end, a preferred embodiment of the invention provides that each reset ratio product measure of a transition in radiance information be combined according to an arithmetic averaging function with the prior measure assigned to the other pixel of that pair. This pooling of information provides a geometric increase in comparisons of the radiance information of different pixels from each measuring iteration to the next measuring iteration. Consequently, it markedly decreases the number of iterations required to produce an image, and thereby contributes to a new fast rate for image production. The combination of this pooling of reset ratio product measures with a selected sequential ordering of pixel pairings for effecting the measurements yields compound advantages in accumulating information for the creation of lightness images.

In a preferred practice of the pooling embodiment of this invention, the imaging process accumulates information in a learning-like manner. The information at each pixel, at the end of any iteration, is the combined measure of all the reset ratio products that have so far reported to that pixel. Thus the number of pixels affecting the reset ratio product can be equal to two raised to the power of the number of iterations. If there are eighteen iterations, then the number of interactions is equal to two to the eighteenth power. By way of contrast, a prior process brings to each pixel a reset ratio product carrying the information from a number of pixels equal to only the number of iterations.

A mode of operation intermediate to the iterative replacing of reset ratio product measures and the pooling of such measures, is the averaging of reset ratio product measures from different sets of pairings. Another operating mode involves determining reset ratio product measures for a set of pixel pairings, and using the resultant measure in determining further measures with a successive set of pixel pairings with a different magnification of the image field.

These and other features of the invention are described below with reference to different image-producing embodiments. One embodiment involves pairs of pixels of identical size and configuration. It employs a sequence of pixel pairings ordered both with successively smaller pixel spacings and with different directions of pixel separation. The processing of radiance information in these embodiments preferably proceeds on a field-by-field basis. That is, the iterations for any one pixel or other segmental area of the image field occur essentially in step with iterations for other pixels of the field. The steps within each iteration can occur either time sequentially or in parallel for the different pixels. Radiance information is compared in the field-by-field basis by shifting a pattern of radiance information and comparing it to the unshifted pattern. The shifting is illustrated both on a time basis, e.g. by use of delay lines, and on a spatial basis, e.g. by the use of known scroll techniques.

Other embodiments involve pairs of pixels that represent areas of the image field different in size from those which other pairings represent. The measurements of radiance transition in either instance can proceed in different sequences to attain replaced reset ratio product measures, to pool the measures from one iteration or set of iterations to the next, or to average the measures from independent sets of iterations.

These and other image-producing features of the invention may have wide application. Specific instances include photographic processing, e.g. in a camera as well as in print making, and television signal processing, e.g. in broadcast equipment as well as in a receiver. Other instances include devices, for example laser scanning devices, used in graphic arts to scan documents and generate corresponding printing plates. In these applications, as the above-described experiments illustrate, the invention enhances the overall lightness quality of the displayed image. In addition, it corrects for a variety of visually detrimental factors including illumination deficiencies and material and equipment limitations in reproducing wide bandwidth and intensity ranges.

Further applications of the invention can produce displays in instances where a scene is examined non-optically, and even where there is no original scene. Examples of the former include the creation of an image display of an object examined with sonar techniques, with infrared techniques, or with radar techniques. Instances of the latter application include displays produced with computerized axial tomography (CAT) scanners and with other nuclear medicine instruments. All these applications of lightness imaging in accordance with the invention can produce images that are consistently perceived as more satisfactory than those heretofore available. Those skilled in the art will realize from these teachings that the practice of the invention can also produce images with all manner of specially contrived lightness effects.

The invention accordingly comprises the several steps and the relation of one or more of such steps with respect to each of the others, and the apparatus embodying features of construction, combinations of elements, and arrangements of parts adapted to effect such steps, all as explained in the following detailed disclosure, and the scope of the invention is indicated in the claims.

BRIEF DESCRIPTION OF DRAWINGS

For a fuller understanding of the nature and objects of the invention, reference should be made to the following detailed description and the accompanying drawings, in which:

FIGS. 7A, 7B, 7C and 7D are diagrammatic representations of a portion of an image processor of FIG. 3 and illustrate one implementation of wraparound insulation in accordance with the invention;

FIG. 11 is a block schematic representation of another image-producing system embodying features of the invention; and FIG. 12 is a diagrammatic representation of a self-developing camera in accordance with the invention.

DESCRIPTION OF ILLUSTRATED EMBODIMENTS

Figure 1:
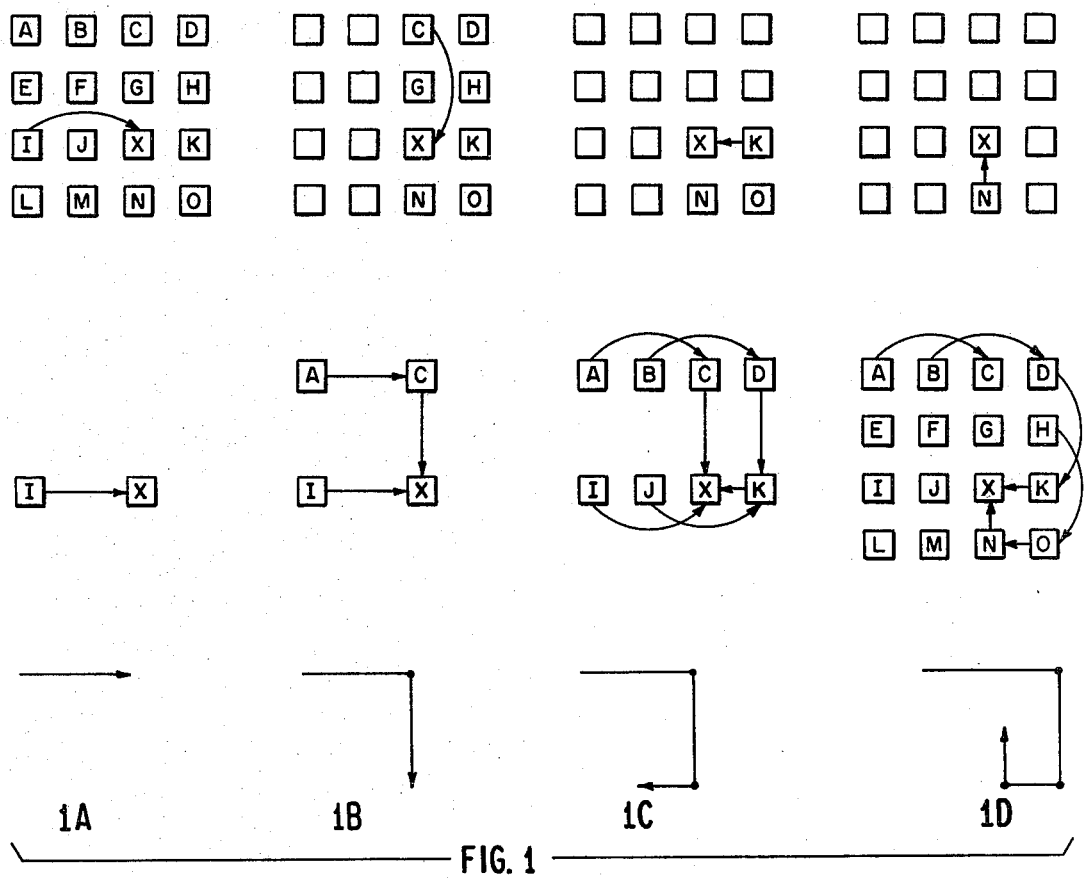
FIGS. 1A, 1B, 1C and 1D are diagrammatic illustrations of an information pooling feature of the invention.

The processing of this invention determines a measure of all transitions in the radiance associated with each of different groups of areas or pixels in an image field. One practice involves groupings of two pixels, i.e. pairs of pixels, and determines the desired measure as the product of (i) the ratio of the radiances at the paired pixels and (ii) an existing measure initially assigned to or previously determined for the pixel associated with the denominator of the ratio. Numbers proportional to logarithms of the relevant measures are typically employed, so that an adder can perform the computations: the log of the ratio is the sum of the log of one radiance plus the negative log of the other radiance, and the log of the product is the sum of the log of the existing measure and the log of the ratio.

The resultant ratio-product, also termed an intermediate product, is referenced to a selected lightness condition. A preferred practice is to reset each resultant which exceeds the value equivalent to maximum image lightness to that value. This reset operation establishes those specific locations or pixels in the scene which are lightness reference points for subsequent operations. The above-noted U.S. Pat. Nos. 3,553,360 and 3,651,252 and the above-noted article of McCann, McKee and Taylor discuss prior practices regarding the foregoing ratio, product and reset operations.

The reset intermediate product determined with each such measuring iteration can be used as the existing measure for the next iteration. However, the invention attains a decrease in the number of iterations required to produce a high quality image by averaging the reset product with the existing measure at the pixel which is associated with the numerator of the ratio for that pair. The resultant averaged product is the transition desired measure for that pixel, as determined with that pair of pixels at this iterative stage in the sequence. This averaged product also replaces the prior measure for that pixel and is used in the next measuring iteration. This averaging operation increases significantly the information which the resultant averaged product contains, because in each iteration information from nearly every pixel contributes to two resultant products.

The objective for lightness imaging in this way is to determine a comparison measure for each pixel relative to every other pixel, i.e. to compare the radiance of each pixel with that of every other pixel by subjecting selected radiance ratios to the foregoing product, reset and averaging operations. In principle, there are many practices of these comparison measuring operations that can yield the desired lightness information for creating a high quality image. However, in addition to using an averaged product rather than simply the reset product as just discussed, the invention minimizes computation by using multiple groupings of pixels, each with a spatial parameter different from other groupings or at least other sets of groupings. One specific example is to use pairs of pixels, each of which differs from other pairs in the spatial separation between the paired pixels, and/or in the direction of the spacing between paired pixels. Another specific example is to compare with one pairing pixels different in size from those compared in other pairings.

Another feature of this invention is the realization that an image can be broken down into multiple groupings of pixels in a manner such that both local and global interactions, e.g. comparative measures with proximate locations and with remote locations, can be calculated at an extremely rapid rate. Different segmental areas are compared so that long-distance spatial interactions can be computed in much less time than with processes involving only contiguous pixels. By transforming the image into a representation that contains comparatively few segmental areas, locations which are separated by long distances in the original representation of the image are now comparatively close. This strategy loses resolution, or introduces errors, due to the coarseness of the analysis. Nevertheless, this ability to perform long distance calculations in few iterations yields enormous reductions in the number of iterations and correspondingly in the processing time. Further, the problems regarding resolution and characteristic errors are overcome by a judicious choice of segmental areas in subsequent stages of the calculation. A corollary feature is the provision for a subdivision of the image into various segmental areas for separate calculations of various components of a lightness field, followed by a recombination of the processed information into a lightness field that is influenced by each characteristic set of segmental areas.

Still another iteration-saving feature is to order the comparison-measuring iterations according to the magnitude of the pixel spacings or other spatial parameter. These features, together with others described hereinafter, are remarkably effective in attaining a close approximation to the foregoing objective on a real-time basis.

FIG. 1 illustrates the effectiveness of the foregoing features in inter-comparing various elements of an image field with a limited number of operating iterations. FIG. 1 is arranged in four columns, i.e. FIGS. 1A, 1B, 1C and 1D, and in three rows. Each column from left to right represents a successive comparison-measuring iteration. The top row shows the same sixteen arrayed sections A, B, C . . . O and X of an image field for each of the four iterations. The sixteen sections of the field, or sixteen picture elements, i.e. pixels, are for clarity shown well spaced apart, but in actuality adjacent ones are often contiguous or nearly contiguous. The middle row of FIG. 1 shows those pixels of the top row which, at the end of each iteration, have contributed radiance information to a measure made with the pixel (X). The lower row shows a vector representation of the magnitude and direction of the spacing between paired pixels.

The first illustrated iteration, FIG. 1A, shows the aforesaid measure of radiance transition between each pixel and the pixel two locations to the left of it. Directing attention to pixel (X), the radiance there is compared with the radiance of pixel (I). The specific computation forms the ratio of the radiance at pixel (X) to that at pixel (I) and multiplies the ratio by the existing measure at pixel (I) to form an intermediate product. The intermediate product is reset and averaged with the existing measure at pixel (X). This computation yields the desired averaged product at pixel (X). It is a function of the radiances at pixels (X) and (I) and of the previously existing products at these two pixels. The second row in FIG. 1A accordingly shows these two pixels. The third row designates with a single horizontal vector the direction from which pixel (X) received radiance information. Simultaneous with these measuring steps, every other pixel (A) through (O) in the upper column of FIG. 1A receives radiance information from the pixel two locations to the left of it, neglecting for the moment pixels in the left half of the image field for there are no pixels two locations to the left of them.

FIG. 1B illustrates that the next iteration measures a radiance transition between each pixel and the pixel two locations above it. The radiance at pixel (X) is accordingly compared with the radiance at pixel (C), and the ratio is multiplied by the existing product determined for pixel (C) in the first iteration. After resetting and averaging with the existing product just determined for pixel (X), the result is a new averaged product for pixel (X).

This averaged product is a function of both the radiances at pixels (X) and (C), and the existing products, i.e. averaged products, determined for each of these locations in the first iteration. Hence the new averaged product assigned to pixel (X), after the second iteration, is a function of the radiance information at pixels (X), (I), (C) and (A). The middle row in FIG. 1B depicts this multiple feeding or contribution of radiance information to pixel (X). The third row of FIG. 1B represents the second iteration pairing as a vector whch starts from the terminus of the first iteration vector. This cumulative vector representation reflects the progressive accumulation of information at pixel (X), that is, the measure at pixel (X) has a history from the prior iterations. Again, information for every other pixel in the illustrated sixteen-pixel array is processed during the second iteration in the same manner as just described for pixel (X).

The third iteration, shown in FIG. 1C, pairs each pixel with the pixel one location to the right. It hence relates pixels (X) and (K). The existing measure at pixel (K) is an averaged product with a history of two iterations and hence is a function of the radiances at pixels (J), (B) and (D). Accordingly, the new averaged product at pixel (X) is a function of the radiances at eight pixels, as the second column in FIG. 1C depicts. The vector representation of the pixel jump for this third iteration appears in the lower row of FIG. 1C.

The illustrated fourth iteration pairs each pixel with the one located one unit below it, FIG. 1D. The information for pixel (X) is hence compared with that at pixel (N). The averaged product for each of these locations has a different eight-pixel history, as FIG. 1C shows in the middle row for pixel (X), developed over the three prior iterations. Consequently, the resultant new averaged product at pixel (X) is a function of the initial radiances at each of the other fifteen pixels, as the simplified FIG. 1D depicts in the second row. (The simplification in the second row of FIG. 1D is that only some prior interactions are shown.) The pairing vector between pixel (N) and pixel (X) is added to the prior vectors to yield the vector representation which appears in the lower row of FIG. 1D. Note that successive vectors extend at right angles to one another. Note also that successive vectors, from iteration one to four, are either of the same or lesser size.

In this manner, four relatively simple iterations compare the radiance at each pixel with that of fifteen others. Expressed mathematically, the process is such that after (N) steps the radiance at each pixel is compared with those at $(2^N - 1)$ other pixels.

Figure 2:
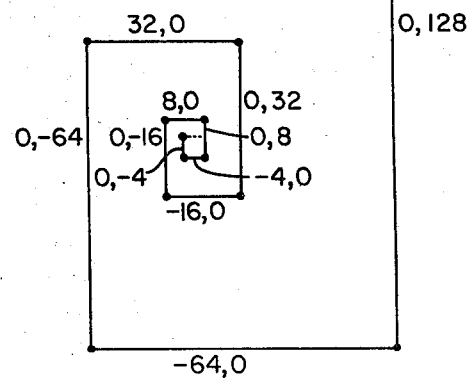
FIG. 2 is a vector pattern partially illustrating a progression of spatial parameters for pairing pixels in accordance with one practice of the invention.

FIG. 2 shows twelve steps of an actual eighteen-step vector pattern with which the invention has been successfully practiced with an image field having a (512)×(512) array of pixels. For clarity of illustration, FIG. 2 omits the two initial largest steps and the final four smallest steps. The illustrated pattern involves an ordered progression of iterations commencing with two successive steps of (256) pixels each (not shown in FIG. 2), followed by the two steps shown of (128) pixels each, and proceeding as shown with two steps of sixty-four pixels each, two of thirty-two pixels each, two of sixteen pixels each, two of eight pixels each, and two of four pixels each. These are followed by four steps not shown: two of two pixels each and two of one pixel each. The spacings between the pixels of successive pairings thus progressively decrease in length. The directions of the spacings also progressively change, e.g. successive directions in the illustrated pattern (including the six steps not shown in FIG. 2) are perpendicular to one another in clockwise order. The eighteen comparison-measuring iterations with this ordered succession of pairing steps yield an averaged product for each pixel, aside from those which are to be compared with locations beyond a boundary of the image field, which is the result of comparing the radiance there with those at over a quarter-million other pixels. The final averaged products can be used to produce a photographic image having the significantly improved lightness qualities described in the foregoing examples.

The image processing described with reference to FIGS. 1 and 2 incorporates several features. One is that it uses field-by-field computations so that each iteration calculates a new measure for each pixel. The example in FIG. 1 explicitly describes the process that calculates the measure for pixel (X). That process, however, is a one-pixel part of multi-pixel field-by-field computations that yield, at each iteration, a new resultant for each pixel in the field. Further, each iteration after the first one brings every pixel the information already accumulated by another pixel, thus producing a geometric growth of interactions.

The process next uses a reset-pooling technique that calculates, for each pixel, a combined measure that is an optimal lightness field value for that pixel. This resultant can be attained by averaging each new reset ratio product value with the previously assigned or determined value. Each ratio product value is reset before it is averaged with the previously determined value for that pixel; the reset mechanism removes from the combined measure those ratio product values that are known to report lightness field values higher than the particular imaging medium can display. The presence of this severely non-linear resetting operation distinguishes this image processing from others that simply compare radiances to average values computed over portions of the image or over the entire image.

In addition to this reset-pooling technique, which accumulates information in a learning-like manner, the processing incorporates the noted local-global calculations that reduce the total number of calculations to gain the same information. Local-global computations are preferred to attain a satisfactory lightness field calculation which does not ignore any portion of the image field. The global or long-distance interactions provide each portion of the image with the correct relationship to distant parts of the image. Local interactions are important as well, because they provide high resolution information which reliably relates nearby points to each other. The composite technique just described processes the entire image using field-by-field computations to sample information for long distance interactions. It then processes the entire image again using slightly shorter distance interactions, and combines the results with the reset-pooling technique. The process continues in this manner until it examines the image with single pixel resolution.

Each processing iteration illustrated in FIG. 1 preferably involves at least four steps, i.e. ratio, product, reset and average, with a field of radiance information like the field associated with the (4)×(4) array of pixels in FIG. 1. Each item of information in the field stems from the radiance at a particular location, i.e. pixel, in the two-dimensional image field and hence can be identified by labeling with the coordinates of that pixel.

The first step of each iteration is to pair the pixels of the image field and to compute for each pair the ratio of the radiance values at the paired pixels. The ratio is a measure which compares the radiance at one pixel, termed a source pixel, to the radiance at the paired pixel, termed a comparison pixel. When the radiance information is logarithmic, the log of this ratio can be calculated as the arithmetic difference between the logs of the paired radiance values. Thus where r(o,o) represents the radiance information at the origin pixel and r(x,y) represents the radiance value at the comparison pixel, the ratio operation which the first step performs can be represented by the algebraic expression:

$$\log \frac{r(x,y)}{r(o,o)} = \log r(x,y) - \log r(o,o) \quad (1)$$

The second step in the processing iteration is to multiply this ratio by a product previously assigned to or determined for the origin pixel of each pair, to determine an intermediate product for the comparison pixel. The multiplication can be performed by the addition of logarithms of the numbers. Hence, the algebraic expression for the log of the intermediate product at the comparison pixel is $$\log ip(x,y) = \log op(o,o) + \log r(x,y) - \log r(o,o) \quad (2)$$

where:
- log ip(x,y) is the log of the intermediate product at the comparison pixel of the pair; and
- log op(o,o) is the log of the old product previously existing, i.e. old product, at the origin pixel.

The system is initialized for the first iteration by assigning an old product to each pixel. The initializing product preferably corresponds to an extreme optical condition such as total blackness or full whiteness. The illustrated embodiment initializes with the latter, which corresponds to an initializing value of unity.

In each processing iteration the third step takes intermediate products which are greater than unity and resets them to unity. A star (*), designates a reset intermediate product in the following equations (3) and (4).

The fourth processing step combines reset intermediate products to form, for each comparison pixel, a new averaged product to be used in the next iteration. As described with reference to FIG. 1, it has been found preferable to produce the new averaged product as the geometric mean of the existing or old averaged product at the comparison pixel in each pairing and the new value of the reset intermediate product that pixel, formed as set forth in equation (2). Where the term "log op(x,y)" is the logarithm of the old averaged product at the comparison pixel, the new product (np) at that location is thus calculated as $$\log np(x,y) = [\log op(x,y) + \log ip^*(x,y)]/2 \quad (3)$$

and is defined as $$\log np(x,y) = 1/2\{[\log op(x,y)] + [\log op(o,o) + \log r(x,y) - \log r(O,O)]^*\} \quad (4)$$

This log of the new averaged product at the comparison location (x,y) is used as the log of the old product term for that location in the next iteration.

The invention can be practiced without the fourth processing step. That practice uses the reset intermediate product as the comparison measure assigned to the comparison pixel for the next iteration. The preferred practice, however, includes the fourth step, which improves both the efficiency of the process and the quality of the results.

An Image Producing System

Figure 3:
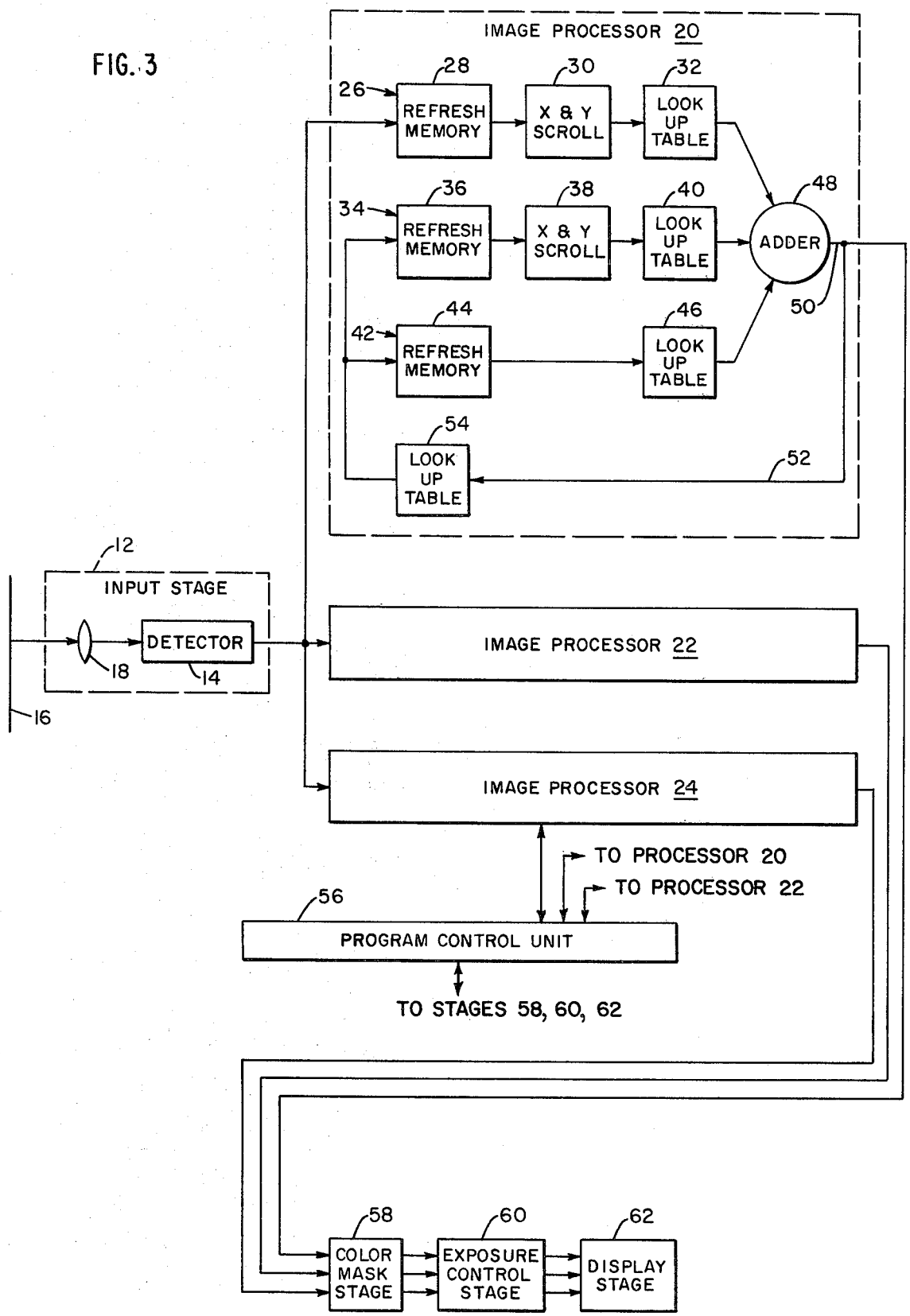
FIG. 3 is a block schematic representation of an image-producing system embodying features of the invention.

FIG. 3 shows a full-color image-producing system which implements the foregoing lightness-imaging techniques. The system has an input stage 12 that develops information identifying the optical radiance of a field of view to be displayed. The illustrated input stage is a camera, e.g. photographic or television, and has an optical detector 14 that receives the light energy from a field of view or other original image 16 via a lens system 18. The detector 14 is typically a multi-element array of photosensitive elements, each of which produces an electrical signal in response to the light energy incident on it. The detector response preferably is proportional to the logarithm of the light energy to facilitate subsequent signal processing. Examples of such a detector are an array of charge coupled devices, i.e. a CCD array, or a charge induction (CID) array.

The input stage 12 thus applies electrical signals proportional to the logarithm of radiance to each of three identical image processors 20, 22 and 24, one for each of the red, blue and green color bands as conventional in full color electronic image processing. Each processor 20, 22 and 24 processes the radiance-identifying signals in a single color band to develop signals identifying the image lightness property for that color band at each point in the image field, e.g. in the field of view of the lens system 18.

One processor 20, shown in further detail, has a first refresh memory channel 26 which has a refresh memory 28, a scroll device 30, and a look up table 32. The refresh memory can be a random access memory to store the field of image information from the input stage. The illustrated input stage detector has a (512)×(512) CCD array and the refresh memory has capacity to store the radiance information for each detector element as a byte of eight bits. In a typical representation of signals, the maximum possible response is assigned to the level 255, and 0.01% response is assigned to the level 0, with logarithmic signal increments evenly assigned to the levels between. The scroll device 30 can displace the field of image information from the refresh memory independently along both the (X) and the (Y) directions by a number of specified coordinates. It typically employs a shift register and a memory to recall a sequence of scroll positions. The look up table 32 employs a random access memory that is addressed by each information byte being processed to provide a real time transformation. The table 32 provides a negative transformation function. The term "negative" denotes an arithmetic function having a slope of (−1). The effect of processing a field of image information with such a polarity inverting function is to convert between a positive image and a negative image.

The FIG. 3 system has a second refresh channel 34 with a refresh memory 36, a scroll device 38, and a look up table 40. A third refresh channel 42 has a refresh memory 44 and a look up table 46, but requires no scroll device. An adder 48 is connected with the look up tables 32, 40, 46 from each of the three channels 26, 34 and 42. It sums any active inputs and applies the resultant to an adder output line 50. A feedback connection 52 applies the output from the adder, by way of a look up table 54, selectively to the input of the second channel memory 36 and third channel memory 44.

The system output stages are illustrated as a nonlinear color masking stage 58, an exposure control stage 60, and a display stage 62. A program control unit 56, typically including a programmable processor and connected with each processor 20, 22 and 24 and with each stage 58, 60 and 62 as illustrated, controls the system operation. The color masking stage 58 provides a color masking operation which accentuates the color of each area of the image field and compensates for color desaturation both in the input stage detector 14 and in the display stage 62. By way of example, a general purpose of color masking in photography is to correct for differences between ideal dyes and dyes realizable in actual photographic systems. The literature regarding such color masking includes: Clulow, F. W., *Color Its Principles And Applications*, published by Morgan & Morgan in New York, 1972, pages 157-159 and 172-179; and Hunt, R. W. G., *The Reproduction Of Color*, published by Wiley in London, 1967, pages 233-263 and 383-416. The color mask stage 58 can also correct for the limited color response and limited color transmission capabilities in the various stages and elements of the system. The color mask stage 58 thus typically provides color correction, color enhancement and color masking to optimize the output signals from the image processors 20, 22 and 24 for subsequent color display. It can also provide an antilog conversion function unless that function has been provided in adder 48.

The exposure control stage 60 transforms the processed and color masked lightness-identifying signals into the format which matches the display stage 62. In a television-imaging system, the display element 62 typically includes a cathode ray tube television display such as a video monitor, whereas in a photographic camera system this element typically includes a light-emitting diode (LED) array arranged to expose photographic film.

The foregoing elements of the FIG. 3 system can be conventional devices known to those skilled in the art, including the arts of computer graphics, electronic image processors, and image computers. By way of example, the International Imaging Systems division of Stanford Technology Corporation markets an image computer which employs elements suitable for the image-producing system of FIG. 3.

System Operation

Figure 4:
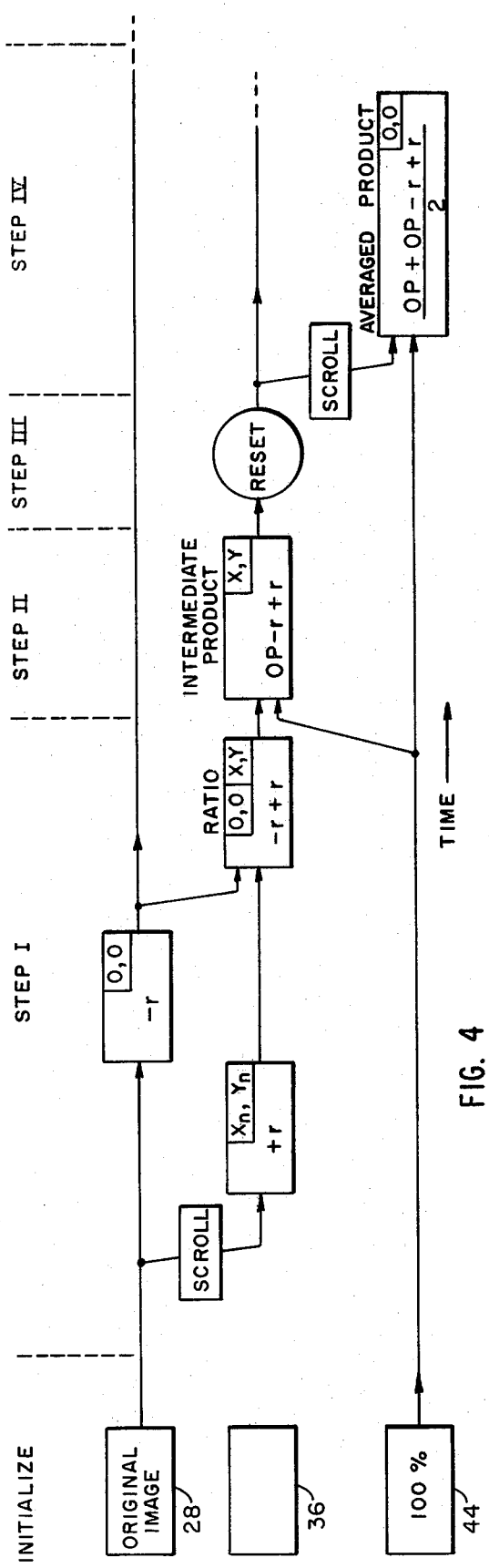
FIG. 4 is a flow chart illustrating a practice of the invention with the system of FIG. 3.

FIG. 4 is a flow chart of the foregoing four step iteration applied to the FIG. 3 processor 20. This processor is typical of the other processors 22 and 24, for the three image processors can be identical in construction and in operation, and operate independently of one another except as the program control unit 56 imposes simultaneous or other time-coordinated operation. The three refresh memories 28, 36 and 44 of the processor 20 are assigned different rows of the flow chart, and successive operations are shown at different positions along the chart starting with the initial conditions at the left and progressing to the right. The processor is initialized by storing original image radiance information received from the input stage 12 in the first channel refresh memory 28. The initial contents of the second channel memory 36 are not significant. The third channel memory 44 is initialized with reset ratio product values corresponding to 100% reflectance, as discussed above.

The flow chart of FIG. 4 is described further together with FIGS. 6A, 6B, 6C and 6D, which show the image processor 20 at different stages in the four-step iteration. The several FIG. 6 drawings are thus identical except that each shows different specific connections which the program control unit 56 provides between the elements of the processor. Further, each FIG. 6 illustration shows with a heavy line the path of information transfer between the processor elements for a specific step in the operating sequence.

Figure 5:
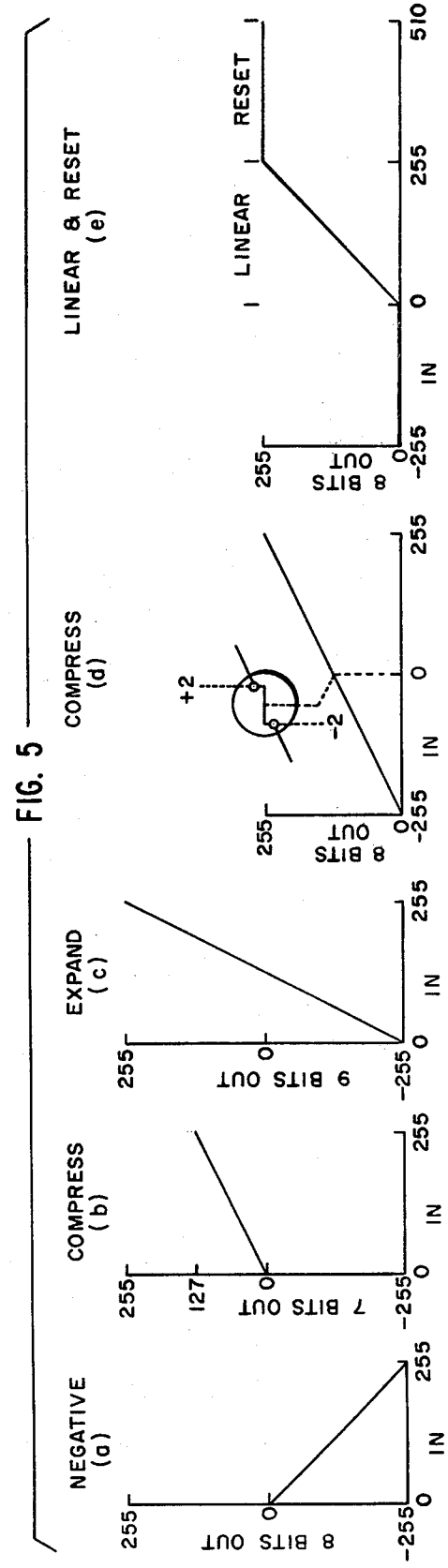
FIG. 5 shows five look up table functions for use in the system of FIG. 3.

The FIG. 6 drawings also designate the functions which each illustrated look up table 32, 40, 46 and 54 can provide, and FIG. 5 shows a graphical representation of each function. With particular reference to FIG. 6A, the look up table 32 can provide either no transformation or the negative function of FIG. 5A. The look up table 40 in the second refresh channel can provide either no transformation, an expand to nine-bit function of FIG. 5C, or a compress to seven-bit function of FIG. 5B. The feedback look up table 54 likewise can provide any of three functions, i.e. no transformation, a compress to eight-bit function of FIG. 5D, or a linear and reset function of FIG. 5E.

Each look up table 32, 40, 46 and 54 thus can assign new values to each byte applied to it. The eight-bit bytes which the illustrated refresh memories 28, 36 and 44 store can have any of (256) possible values. The FIG. 5 functions hence show the new values which the different look up functions assign to each of the possible (256) values, and to the possible values which the sum of two bytes can have.

Figure 6A:
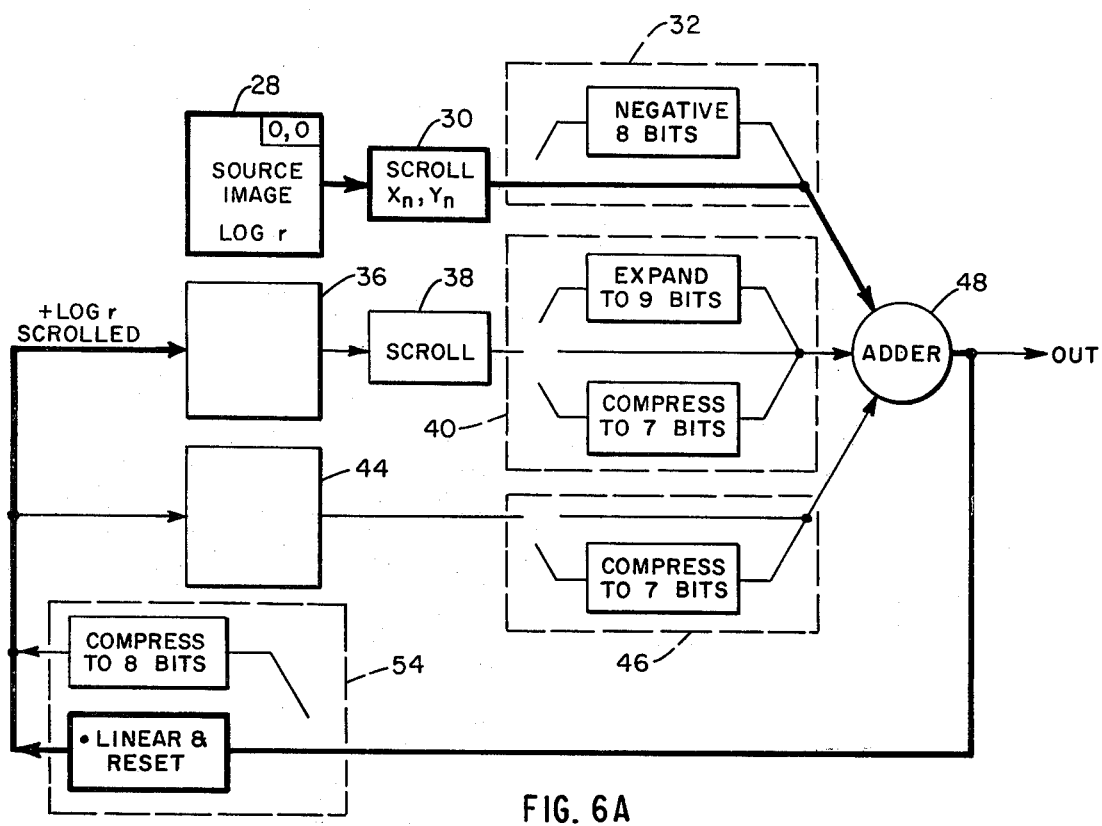
FIGS. 6A, 6B, 6C and 6D are schematic drawings of one image processor of the system of FIG. 3 illustrating successive operating stages.

FIGS. 4 and 6A show that the aforementioned first-step operation of pairing pixels is carried out by scrolling the contents of the first channel refresh memory 28 with the scroll device 30. The scroll, which can be of any magnitude in either or both directions, is designated as being of $(x_n, y_n)$ pixels. The subscript $(n)$ identifies the number of the iteration being performed, inasmuch as different iterations in an operating cycle can—and generally do—involve different scroll steps. The first illustrated step of the eighteen-iteration operating cycle which FIG. 2 in part shows involves, by way of example, a scroll of (128, 0) at this juncture. Where pertinent, FIGS. 4 and 6 show the block representation of each refresh memory with a coordinate designation in the upper right corner to indicate whether the contents correspond to the origin pixel or to the comparison pixel of a pairing. FIG. 6A accordingly shows the refresh memory 28 with the origin-designating coordinates (o,o).

FIG. 6A also shows that the data path which the program control unit 56 (FIG. 3) establishes in the processor 20 for this scroll operation applies the contents of the first channel refresh memory 28 to the scroll device 30, which introduces the specified scroll. The scrolled image information is applied to the look up table 32, which transfers it without change to the adder 48. The adder has no other active inputs and hence simply applies the same scrolled image information to the feedback look up table 54. This element applies the linear and reset function of FIG. 5E, which in this instance imparts no transformation to the data, so that the scrolled image information output from the scroll device 30 is applied to the refresh memory 36 of the second channel 34. The memory stores this information with an operation subsequent to FIG. 6A.

FIG. 4 designates the foregoing scroll and store operations in the first portion of Step I. At this juncture, the radiance information for each pixel of the original image is paired with the radiance information of the pixel offset from it by $x_n$ and $y_n$ pixels.

Figure 6B:
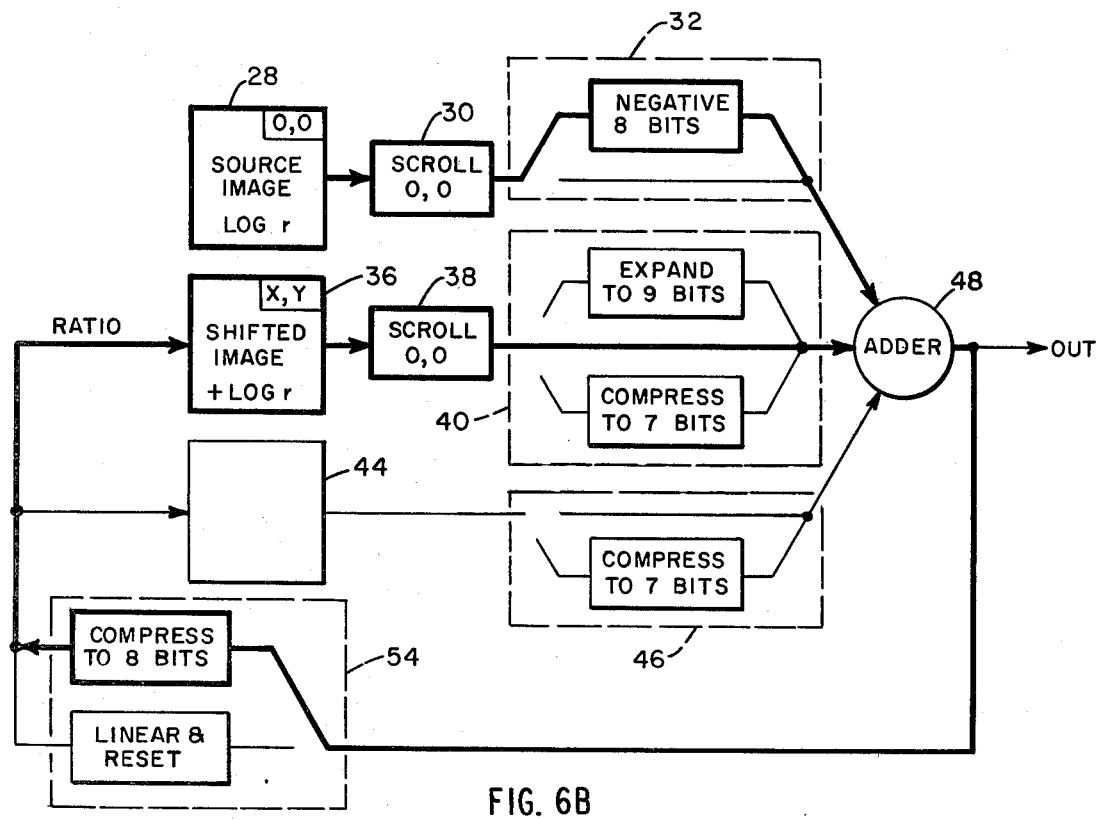

The illustrated image processor 20 executes the remaining first-step operation of computing the ratios of paired radiance values by applying both the negative contents of the first channel memory 28 and the contents of the second channel memory 36 to the adder 48, and by storing the resultant sum from the adder in the memory 36. FIG. 4 designates these operations in the last portion of Step I. FIG. 6B shows that to provide this operation the program control unit 56 applies the contents of the first channel memory 28 through the scroll device 30, which imparts no scroll, and actuates the look up table 32 to provide the negative function and apply the transformed data to the adder 48. The control unit also applies the scrolled image information in the second channel memory 36 through the scrolled device 38, again without scroll, and through the look up table 40 without transformation to a second input of the adder 48.

The adder sums the two binary input signals and applies the resultant nine-bit byte to the feedback look up table 54, which the control unit 56 actuates to provide the compress to eight-bit function (FIG. 5D). This function changes the nine-bit byte output from the adder 48 to an eight-bit representation. The purpose is merely to accommodate a memory 36 which has only an eight-bit byte capacity. (Note that each FIG. 6 drawing shows the contents of the refresh memories 28 and 36 and 44 at the beginning of the operation which it depicts. Thus, FIG. 6A shows the contents of the refresh memories at the beginning of the scroll operation, and FIG. 6B shows the memory contents at the beginning of the ratio-computing operation.)

Figure 6C:
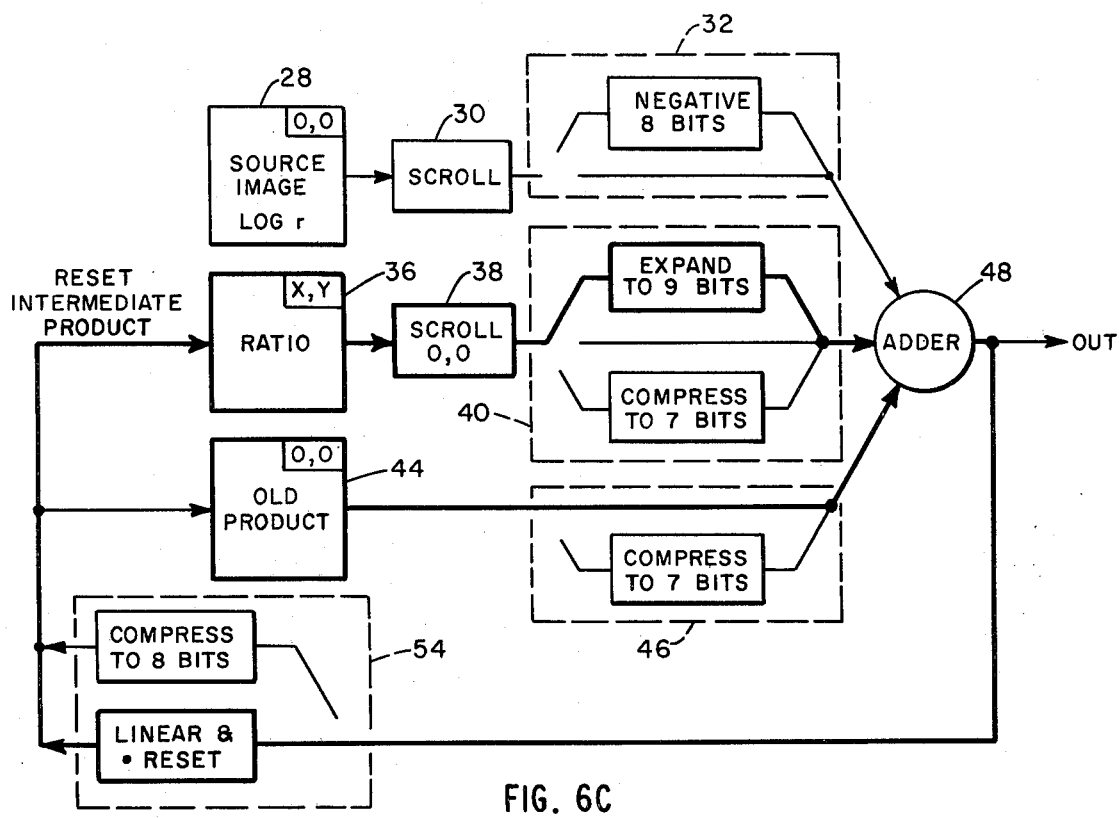

To execute the second step of an iteration, which forms the product of the ratio with a quantity designated an old product and which may be existing or assigned, the program control unit 56 conditions the channel two and channel three elements to sum the contents of the refresh memories 36 and 44, as FIG. 6C shows. The resultant intermediate product is stored in the refresh memory 36, all as the flow chart of FIG. 4 designates for Step II and in accordance with Equation (2). More particularly, with reference to FIG. 6C, the ratio information in the refresh memory 36 is applied through the scroll device 38, without offset, to the expand function of the look up table 40. This transformation expands the eight-bit representation of each number to a nine-bit byte, FIG. 5C. This expand operation restores to the information read from the refresh memory 36 the nine-bit format it had prior to the compress to eight-bit function which the feedback look up table 54 imposed during the prior, ratio computing, step. The nine-bit output from the look up table 40 is applied to the adder 48, as are the contents of the third channel refresh memory 44. For the first iteration of operation, this memory stores an initialized old product for each pixel, preferably corresponding to a uniform field of 100% reflectance as previously discussed. The adder 48 sums the two inputs to develop the intermediate product.

The feedback look up table 54 performs the Step III reset operation on the intermediate product from the adder 48 as FIG. 6C shows. The reset intermediate product is applied to the second channel refresh memory 36. Each byte input to the table 54 is a sum from the adder 48, and the reset portion of the FIG. 5E function is effective at this juncture. This function transforms input numbers valued between ($-255$) and (0) to (0), transforms input numbers with a value between (0) and (255) to an eight-bit number of identical value, and transforms input numbers with a value greater than (255) to the maximum value of (255). This reset function thus produces a field of eight-bit reset products which are limited to values between (0) and (255), and in which input values both lower and greater than this range are effectively clipped. Prior to this reset operation, each intermediate product identifies at least in part a lightness value. The reset operation normalizes the values of the highest lightnesses in the image being produced, regardless of the radiance detected or sensed from that pixel in the original scene.

Figure 6D:
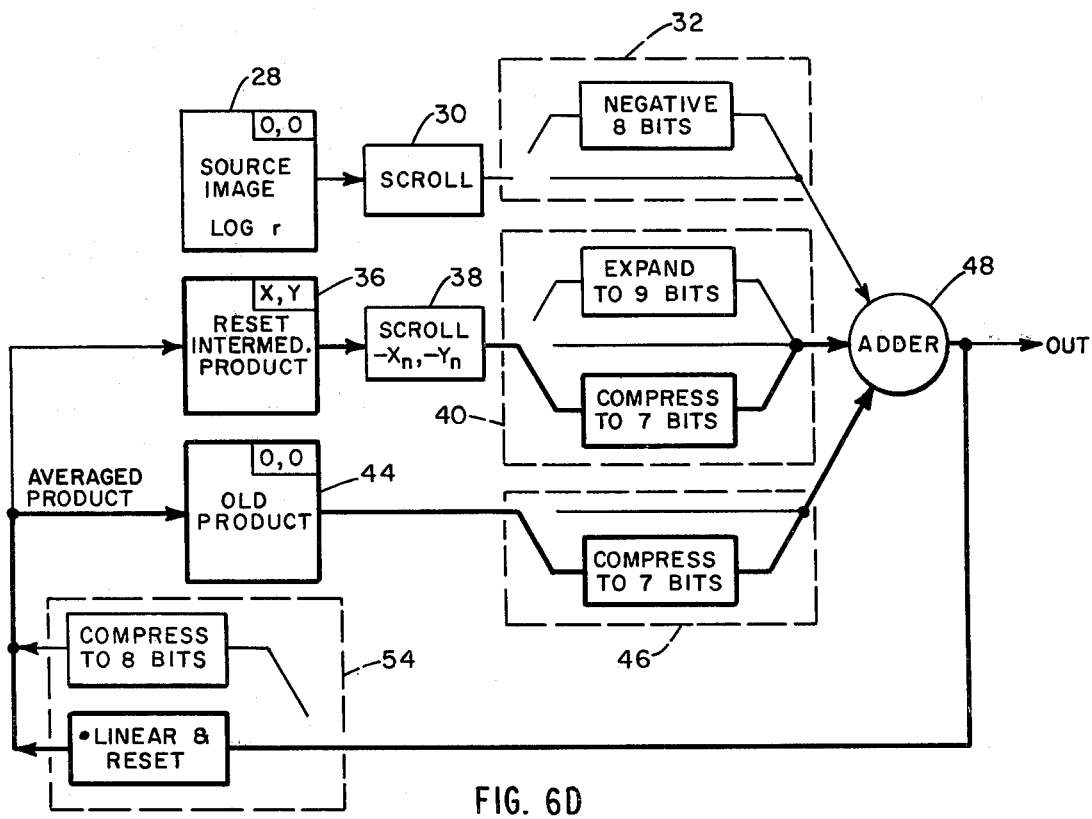

The reset intermediate products output from the feedback look up table 54 are stored in the second channel refresh memory 36 at the end of the Step III operation, as appears in FIG. 6D, which shows the condition of the memory 36 prior to the next operation.

This next operation is the iteration Step IV determination of a new average product for each pixel. The two sets of logarithmic numbers to be combined for forming the new product are in the second channel refresh memory 36 and in the third channel refresh memory 44. However, the set of numbers in the former memory is scrolled by (x) and (y) units from the initial coordinates, as a result of the scroll operation performed in Step I, whereas the contents of the latter memory are at the initial coordinates designated (o, o). The reset product contents of the refresh memory 36 accordingly are scrolled back to the initial coordinates with the scroll device 38 by the requisite ($-x_n$) and ($-y_n$) coordinates, as FIG. 6D shows, before being applied to the adder 48.

With further reference to FIG. 6D, the second channel look up table 40 compresses the reset products to seven-bit bytes with the function of FIG. 5B. The third channel look up table 46 imparts a similar compress function to the old product contents of the refresh memory 44. The resultant two sets of numbers are applied to the adder 48. The compress operations imposed by the look up tables 40 and 46 yield from the adder 48 an eight-bit sum which can be stored directly within the eight-bit capacity of the refresh memory 44.

More importantly, by compressing each set of numbers from the memories 36 and 44 in this manner prior to the addition, the resultant sum from the adder represents an equal weighted, i.e. fifty-fifty, average of the two sets of numbers. Where unequal weightings are desired for the averaging, the look up tables 40 and 46 can have appropriate compressing functions to yield a sum which is the appropriately weighted average. A further reason for the compress to seven-bit operation prior to addition is described hereinafter.

FIG. 6D also shows that the feedback look up table 54 applies the linear the reset function (FIG. 5E) to the resultant sum from the adder 48, and that the output from the table is applied to the third channel refresh memory 44. The numbers input to the look up table 54 are all within the (0) to (255) range, and accordingly the table applies the linear portion of its function to the sum, i.e., applies the sum from the adder to the memory 44 without transformation.

FIG. 4 shows the resultant averaged new product in the refresh memory 44 at the completion of this Step IV operation in terms of equation (4).

The FIG. 3 image processor 20 is now ready to repeat the four-step iteration. Each iteration after the first one uses the same original image field of radiance information which the first channel refresh memory 28 initially stored. However, the succeeding iterations do not use the initialized conditions in the third channel refresh memory 44, but rather use the new averaged product as computed and stored in that memory in the last step of the preceding iteration.

The FIG. 3 system performs a number of the iterations described with reference to FIGS. 3–6 and compares different pixels in each iteration. The comparisons are made by scrolling the contents of the refresh memories 28 and 36 with the scroll devices 30 and 38 through different coordinate distances in each iteration. The theoretical objective is to compare the original image radiance information, stored in the first channel memory 28, for each pixel with that stored for every other pixel. FIG. 2 shows a sub-set of twelve scroll displacements. It is a measure of the significance of the invention that a complete image-producing cycle requires only eighteen such iterations. The operation commences with a largest displacement, and proceeds through the cycle with successive sets of two iterations, each of which involves progressively smaller scroll displacements. Note that in every iteration except the final two, (i.e. numbers seventeen and eighteen), each pixel is paired for comparison with a pixel spaced from it by more than one pixel unit. That is, all but the final two pairings are between pixels that are separated with at least one pixel between them. The array of averaged new products available from each processor 20, 22 and 24 at the completion of these eighteen iterations is applied, under control of the program control unit 56, to the output stages 58, 60 and 62. This completes one operating cycle of the FIG. 3 system.

Threshold

With further reference to FIG. 3, where it is desired to impose a threshold on the ratio of radiances determined in each processing iteration, the feedback look up table 54 can provide this operation. The inset in FIG. 5D shows a compress to eight-bit function which also provides a threshold function. This illustrated threshold function is such that all input values between (−2) units and (+2) units inclusive produce the same output value. Such a threshold function can be advantageous in an image processor according to the invention to yield a ratio of unity when the two radiance values being compared are within a specified percent of each other. This threshold removes the spatially slow changing effects of gradients of illumination found in many images. As desired, a suitable threshold does not visibly affect the accurate imaging of discontinuous changes in radiance information. The latter radiance changes or transitions, which are the ones measured with the practice of this invention, generally stem from the changes in reflectance that occur at the boundaries or edge of an object in the original scene or image. By way of specific example, where the memory levels (0) to (255) evenly represent four log units of radiance, the foregoing threshold suitably treats radiance values that are within seven percent (7%) of each other as being equal. This value is not critical; other values can be used as appropriate for the implementation and the application.

The threshold operation is applied to the ratio output from the adder 48 in Step I of the iteration described above. That is, the feedback look up table 54 imposes the threshold function simultaneous with the compress to eight-bit operation discussed with reference to FIG. 6B. It will be appreciated that a threshold is to some extent inherent as a result of quantifying data in the present embodiment of the invention. The practice of the invention as described with the system of FIG. 3 hence can be considered as imposing a threshold on each ratio computation.

A further finding of this invention is that a threshold alone is insufficient to remove from all images the undesirable effects on total dynamic range of gradual changes in illumination. When a uniformly illuminated image has pixel-to-pixel variations in radiance which regularly exceed the threshold, the threshold alone is not sufficient to remove gradients superimposed on that image. The problem is typically encountered in images with significant pixel-to-pixel signal fluctuations which are introduced by limitations of the image detecting mechanism. Within a single image object, these variations commonly exceed the thresholds of plus or minus one or two grey levels which typically are adequate in fluctuation-free images. This degree of consistency exceeds the tolerance levels of typical electronic image systems. Even with low-fluctuation images, a predominance of minute object detail can have similar effects. Despite the already demonstrated abilities of a threshold process, other techniques are important for many images to reduce the influence of gradients on the dynamic range of calculated lightness fields.

One mechanism alternative to a threshold for gradient removal is a system that combines a reset step with a lightness field-determining operation in which many different comparison segmental areas influence each segmental area. Each segmental area has a different history of spatial interactions with other areas. When the history of interactions is limited, the influence of random fluctuations is propagated along these limited directions and causes local areas of unwarranted higher or lower lightness. This unwanted propagation of random fluctuations does not occur when each segmental area is influenced by very large numbers of comparison segmental areas. Instead, the random events cancel one another.

In addition, a gradient is by definition a radiance change in a particular direction. The combination measure which this invention provides does not emphasize radiance gradients. The contributions of such gradients are different in magnitude for each direction and spatial parameter of comparison. Further, a gradient produces a smaller change in lightness field calculations than an object edge of the same magnitude. An extended edge is equally detectable in all directions that cross it. It is considered that the combination measure may emphasize radiance changes produced by abrupt edges because most directions and most spatial parameters for grouping segmental areas for comparison yield the same measure of the change. Hence multiple measuring iterations as described herein yield measures which reinforce one another.

In the study of human vision one often finds in the literature the division of segments of visual images into two arbitrary categories: objects, and illumination. In addition, the literature contains numerous discussions of how human vision discounts illumination, so that information about objects in the field of view has greater emphasis. This arbitrary division of visual images has many exceptions. For example, shadows produce large changes in sensation, despite the fact that they are intensity variations in illumination. As another example, gradual reflectance changes across the surface of an object cause small changes in sensation, despite the fact that they represent changes in the properties of the object.

Instead of characterizing different portions of images as objects and as illumination, it is more useful to characterize them as radiance transitions that are abrupt, or as radiance changes that are gradual. Radiance transitions that are abrupt generate large changes in lightness, whereas radiance transitions that are gradual generate small changes in lightness. Signal processing systems that produce lightness fields produce quantities that correspond to lightness.

The foregoing lightness image processing of this invention realizes these properties of visual processing by calculating combination measures in such a way that abrupt changes in radiance are characterized by a set of reports all of which are the same. Furthermore, combination measures are calculated in such a way that gradients are de-emphasized by either a threshold or a technique using many comparison segmental areas with different spatial interaction histories, or both.

Wraparound Insulation

Each image processor 20, 22 and 24 of FIG. 3 provides the foregoing measure of a radiance transition in a manner different from that previously described in the case of a pixel that is paired with a location that lies beyond a boundary of the image field. This different operation, termed wraparound insulation, minimizes errors that otherwise can arise from the foregoing determination of a radiance transition measure, e.g. a new product, for a pixel located such that after the scroll displacement it is to be compared with an out-of-field location, i.e. a location that lies beyond a boundary of the image field being processed.

The image processor which the invention provides avoids this error by identifying, in each iteration, each pixel that is to be compared with an out-of-field location. The processor retains the old product for that pixel, and uses it as the new product. This feature of the invention is described with reference to an illustrative iteration diagrammed in FIGS. 7A, 7B, 7C and 7D for the image processor 20 and which involves pairing each pixel with the one located (128) pixel units to the left. Each FIG. 7 drawing shows only a portion of the processor 20, and each designates the contents of each illustrated refresh memory as mapped in four equal sized regions, each of (128) pixels by (512) pixels. The original image information which memory 28 stores in the memory regions 28a, 28b, 28c and 28d is designated as A, B, C and D, respectively.

The illustrated image processor 20 handles the out-of-field situation which the scroll of (128) units presents in a conventional manner. As FIG. 7A shows, the processor scrolls the information A, which is originally stored in the leftmost region 28a of the first channel memory, to the opposite side and places it into the right edge region 36d of the memory 36 in the second channel.

FIG. 7A, which thus corresponds to FIG. 6A, further illustrates this wraparound scroll operation with the representation that the contents of the refresh memory 28, upon being scrolled (128) pixel units to the left, have the format which appears in the memory map 64 shown to the right of the adder 48. This mapping of information is stored in the second channel refresh memory 36 by way of the feedback path 52. FIG. 7A thus shows the contents of the two refresh memories 28 and 36 after the Step I scroll operation. The shading designates the memory regions 28a and 36d which store information that the scroll operation wraps around from one memory border to the other, i.e. the memory region which in this example stores the information A. Thus, in every iteration described above with reference to FIGS. 4 and 6, the image processor 20 scrolls the contents of memory elements adjacent an edge or boundary of the memory and wraps it around for storage in memory elements adjacent the opposite edge or boundary.

The transition-measuring image processing described above with reference to FIG. 6, however, can encounter problems if it processes the wraparound information in the same manner as other information. That is, imaging errors are likely to arise in the present example if the radiance information A wrapped around for storage in region 36d of memory 36 is processed in the same manner as the information in the other regions 36a, 36b and 36c of that refresh memory. An example of this error occurs where the original image being processed is of a scene illuminated from the right side with ten times more light than on the left side. The 10-to-1 gradient in illumination improperly dominates the Step I ratio calculations where radiance information from pixels at opposite sides of the image field are compared by virtue of the scroll wraparound.

The processor 20 which the invention provides solves this problem by disregarding transition measures which result from such wraparound ratios. The processor instead identifies each pixel where the radiance information is compared with information that is scrolled from edge to edge, i.e. where a wraparound ratio is involved. The processor retains the old product for each such identified pixel and uses that product in the next iteration, instead of determining a new product, as occurs for all other pixels. The processor 20, typical of the processors 22 and 24, thereby insulates each iteration from communication between image locations that are separated in a direction opposite to the direction of the scroll for that iteration.

FIG. 7B shows the same portions of the processor 20, with the mapped contents of memories 28 and 36, as FIG. 7A. The mapping 66 at the right of FIG. 7B depicts the logarithm of a ratio and hence depicts the sum of the negative of the memory 28 contents and the memory 36 contents output from the adder 48 after the Step I ratio computation of Equation (1). The right-most mapping region 66d contains the sum designated (A-D), wnich is a wraparound ratio, i.e. a difference between memory contents which in the first channel memory 28 are separated in the direction opposite to the direction of the scroll that preceded the ratio computation. This sum manifests the wraparound error discussed above. The contents of the remaining mapping regions 66a, 66b and 66c are correct and unaffected by the scroll wraparound.

The illustrated processor proceeds in the same manner described with reference to FIG. 6C with the Step II computation of an intermediate product. FIG. 7C shows the mapping of the refresh memory contents for the second and third channels of the processor 20. The contents of the memory 36 have the same mapping as appears in the mapping 66 at the right side of FIG. 7B. The refresh memory 44 contains old product information designated as PA, PB, PC, and PD for the four memory regions 44a, 44b, 44c and 44d, respectively. The mapping 68 of the sum of these two memory contents with the adder 48 appears at the right side of FIG. 7C. This sum is the intermediate product computed according to Equation (2). The sums mapped in regions 68a, 68b and 68c are in the desired form, unaffected by the scroll wraparound. The sum mapped in region 68d, however, is prone to scroll wraparound error.

The processor operation proceeds to the Step III reset operation which the feedback look up table 54 performs, as described above with reference to FIG. 6D. The reset intermediate product is stored in the second channel refresh memory 36, as FIG. 7D shows.

To execute the last iteration step, i.e. the Step IV averaging computation, the scroll device 38 scrolls the contents of the second channel memory 36 by an equal and opposite amount from the scroll effected in the first step of FIG. 7A, i.e. a scroll of (128) pixels to the right in this example. The mapping 70 in FIG. 7D represents the second channel refresh memory 36 contents after this scroll operation. The field of information is applied to the adder 48 by way of the look up table 40. At the same time, the contents of the channel three memory 44, shown in mapping 72 juxtaposed with mapping 70, are applied to the adder 48 by way of the look up table 46.

The illustrated processor 20 combines the two sets or fields of information in a straightforward manner for all regions of the mappings except for the region that includes information manifesting scroll wraparound. This is the information in the channel two memory region 36d, and which the scroll device 38 scrolled to the mapping region 70a.

The processor 20 develops the new product information for this region in response entirely to the old product information in the mapping region 72a, i.e. in the region 44a of the third channel memory 44. As FIG. 7D shows, the resultant mapping 74 of the adder 48 output contains old product information in the region 74a. This mapping region corresponds identically to the memory 28 region 28a designated in FIG. 7A as containing information which this iteration would subject to a scroll wrapround. The remaining mapping regions 74b, 74c and 74d contain new products computed as described above according to Equation (4). The modified new product which the mapping 74 represents is stored in the channel three refresh memory 44, in accordance with the flow chart of FIG. 4, Step IV.

One detailed operating sequence for determining a new product which retains old product information in the foregoing manner, as mapped in the memory region 74a, is to save the old product information in a buffer or other store of the program control unit 56, FIG. 3, prior to the product-producing addition operation of Step IV. A subsequent operation writes the saved old product information into the specified region of the third channel refresh memory 44. The program control unit 56 can identify the region of memory 44 which contains old product information to be saved in this manner by using the coordinate displacement information, i.e. ($x_n$, $y_n$), which controls the scroll devices 30 and 38 for the iteration in process.

Another operating sequence for effecting the foregoing wraparound insulation involves inserting a marker digit in each refresh memory location which stores information that is to be subjected to a scroll wraparound. The look up tables 40 and 46 can effect a compress function, with the sets of marked information, different from that of FIG. 5B to yield from the adder 48 an averaging in which the resultant for the marked memory locations is responsive exclusively to the old product information. More particularly, according to this alternative sequence, after the reset intermediate product is stored in the second channel memory 36 to complete Step III (FIGS. 3 and 7D), the program control unit 56 clears the low order bit of every byte of product information in both refresh memories 36 and 44. The control unit next writes a binary ONE into the low order bit of only those bytes which the register of the scroll device 38 identifies as being involved in a scroll wraparound for that iteration. This selective storing of binary ONES tags or marks each byte of product information in the memories 36 and 44 to identify those which reflect scroll wraparound. The marked contents of the memory 36 are next scrolled in the usual manner with the scroll device 38.

Figure 8:
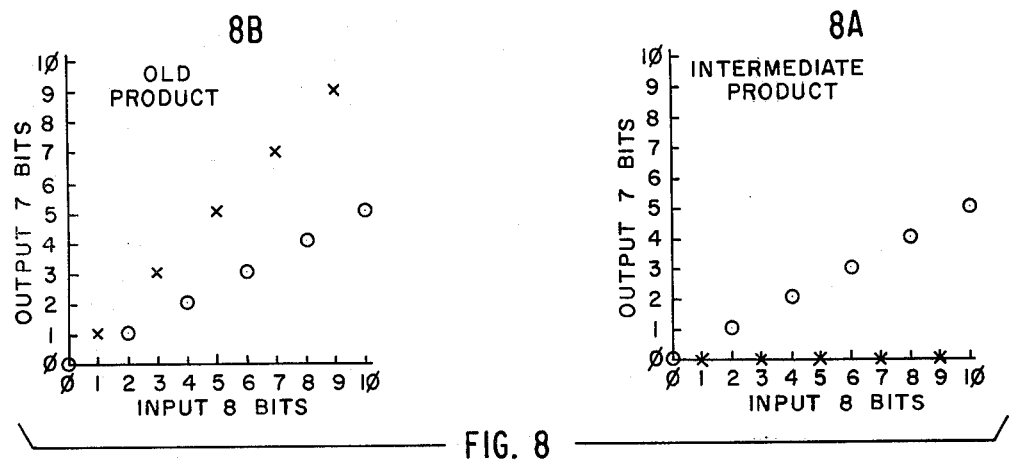
FIG. 8 shows two look up table functions for the practice of wraparound insulation as illustrated in FIGS. 7A-D.

However, instead of using the equal-weighting compress function of FIG. 5B as discussed above with reference to FIG. 6D, the second channel look up table 40 provides a selective-averaging transfer function shown in FIG. 8A, and the third channel look up table 46 provides a selective-averaging transfer function shown in FIG. 8B. FIGS. 8A and 8B show each transfer function for inputs of decimal magnitude (0) to (10); each function ranges in the same manner shown for inputs of magnitude (0) to (255).

Each selective-averaging transfer function processes a byte of marked information differently from a byte of unmarked information. More particularly, each marked byte is an odd-valued number because it has a binary ONE in the lowest order bit plane, whereas every unmarked byte has a binary ZERO in the low order bit and hence is valued as an even number. FIGS. 8A and 8B designate the transfer function for each odd-valued input with a cross, and a circle designates the function for each even-valued input.

The FIG. 8A transfer function produces a zerovalued output in response to every odd-valued input, and produces a seven-bit output valued at one-half the magnitude of each even-valued input. That is, an input byte of decimal value 1, 3, 5, 7 . . . 255 produces an output byte of value zero, whereas an input byte of decimal value (8), for example, produces an output value of decimal (4). With this transfer function of FIG. 8A, the look-up table 40 in the second refresh channel applies a zero-valued input to the adder 48 in response to each marked byte, which is a byte involved in a scroll wraparound, and applies a one-half value byte to the adder in response to every unmarked input byte.

The look up table of FIG. 8B likewise produces a one-half valued output for every even valued input byte. However, it responds to each odd-valued input byte to produce an output value of the same magnitude. With this transfer function, the look up table 46 responds to each unmarked input byte to apply a byte of one-half the input value to the adder 48, but responds to each marked input byte to apply a byte of the same value to the adder 48.

The adder 48 responds to the fields of intermediate product and old products transformed with these functions to produce the desired "insulated" field of new products which FIG. 7D shows with the mapping 74.

A Two Channel Image Processor

Figure 9:
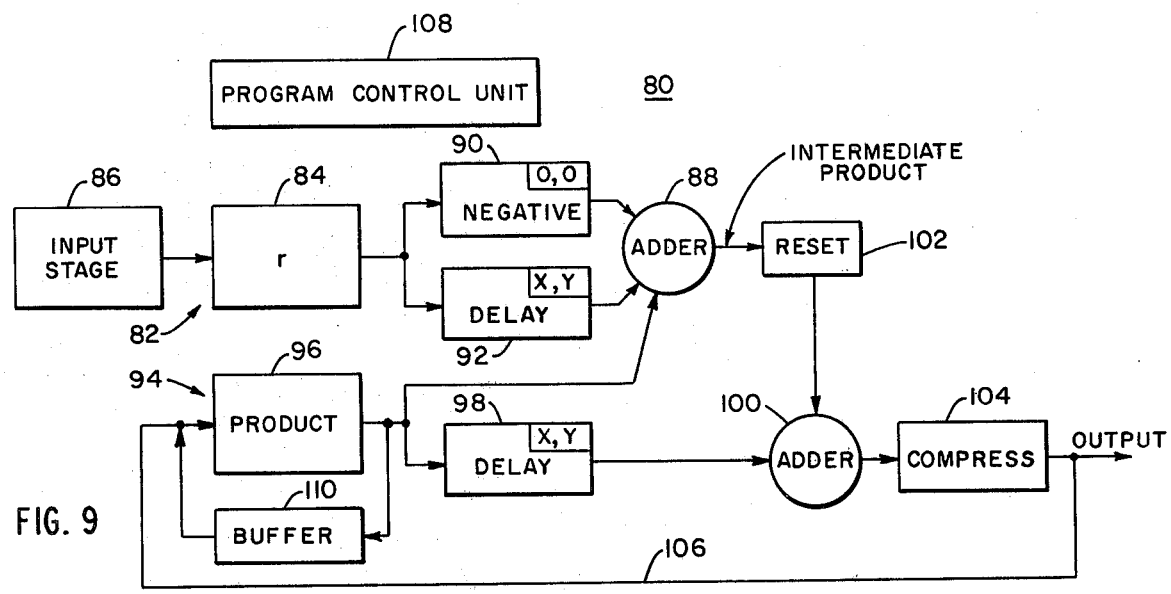
FIG. 9 is a block schematic diagram of another embodiment of an image processor in accordance with the invention.

Before considering a further embodiment of the invention, note that the image processor 20 described with reference to FIGS. 6 and 7 employs three refresh channels. The first stores original radiance information regarding the image being processed. The second channel is used to perform calculations in accordance with the lightness imaging process summarized in the flow chart of FIG. 4. The third channel stores new product information and presents it as old product information for the next iteration. In contrast to these features, FIG. 9 shows another image processor 80 in accordance with the invention. The processor 80 attains the same results as the processor 20, but with two memory channels. Further, it uses delay lines to effect scrolling in a time domain, in contrast to scrolling in a spatial domain as in the processor 20.

More particularly, the signal processor 80 has a first refresh channel 82 with a refresh memory 84 that receives information from an input stage 86. The contents of the memory 84 can be applied to different inputs of an array adder 88 by way of either a negative look up table 90 or a delay line 92. A second refresh channel 94 of the processor 80 has a memory 96 connected to apply the contents to a further input of the adder 88 or to a second adder 100 by way of a further delay line 98. A reset look up table 102 is connected to receive the output from the first adder 88 and apply it to the second adder 100. The output from the adder 100 is applied to a look up table 104 having a compress to eight-bit function as shown in FIG. 5D. The output of the look up table 104 is the output from the processor 80. A feedback path 106 applied this output to the input of the second channel memory 94. The processor 80 operates in conjunction with a program control unit 108.

The operation of the FIG. 9 processor 80 typically commences in the same manner as described for the processor 20 with the first channel memory 84 storing a field of original image information proportional to the logarithm of the radiance at each element of the image field. The second channel memory 96 is initialized with the logarithm of a selected uniform radiance field. The processor 80 reads information from the refresh memories on a time sequential basis characteristic of conventional shift register systems. With such operation, time after onset of a memory scan or read operation is directly related to pixel location in the image field being processed. That is, the information for successive pixels is read out at known successive times in a memory read operation. Further, each memory 84 and 96 can advantageously use two orthogonal interconnections of the memory elements therein, in order to accomplish image displacements in either the x (horizontal) direction or the y (vertical) direction with less delay than the time required to read a single line of information from either memory.

The processor 80 simultaneously performs the calculations of Equations (1) and (2) to produce an intermediate product. For this operation the processor simultaneously sums, with the adder 88, the three sets of information identified by the three terms on the right side of Equation (2), i.e. log op(o,o), log r(x,y) and the negative of log r(o,o). To effect this operation, the contents of the memory 84 as made negative with look up table 90 are applied to one input of the adder 88, the contents of the memory 96 are applied to another input of the adder, and the contents of the memory 84 are applied to a third input of the adder by way of the delay line 92. The delay line introduces a time delay that displaces the information being read sequentially from the memory 84 in time by an amount equal to the desired (x,y) scroll. The processor 80 thus generates the intermediate product at the output from the first channel adder 88.

The intermediate product is reset with a transformation function similar to that of FIG. 5E by applying the signals output from the adder 88 to the look up table 102. For memories 84 and 96 that store radiance information as eight-bit bytes, the reset function for table 102 transforms ten-bit bytes, which the adder 88 produces in summing three eight-bit input bytes, to eight-bit bytes. The reset product is applied to the second channel adder 100, which sums it with information identified by the additional term on the right side of Equation (4), i.e. the log op(x,y) term. This information is in the memory 96 and is applied to the adder 100 by way of the delay line 98, which imparts the same time delay as delay line 92. The look up table 104 compresses the resultant summation signal output from the adder 100 to effect the divide by two operation for completing the average computation of Equation (4). The resultant averaged product information is applied by way of the feedback path 106 to the second channel memory 96, where it is written on the same time sequential basis with which the memories are read.

The FIG. 9 processor 80 further has a buffer 110 to store the information in the memory 96 that is combined with wraparound information from memory 84. The program control unit 108 reads the buffer-stored information back into the memory 96 in place of the new product information which results from locations that are paired by way of a time-delay scan wraparound. This use of the buffer 110 provides wraparound insulation in the manner described above with reference to FIGS. 7A through 7D.

Three image processors identical to the processor 80 of FIG. 9 can provide a full-color image producing system like the system of FIG. 3. That is, the system of FIG. 3 can be constructed with a two-channel processor 80 (FIG. 9) in place of each processor 20, 22 and 24. It will also be apparent that the invention can provide black-and-white and other single color imaging with a system as shown in FIG. 3 which has only a single image processor, instead of three as shown. Further, a single-processor system can calculate all three lightness fields for full color imaging with a time-sharing operation, i.e. by processing the red, the green, and the blue components separately on a time sequential basis.

Multi-Size Pairings

The embodiments of the invention described above with reference to FIGS. 3 through 9 employ pixels which represent image sections of uniform size. Also, the spacings between elements paired in each iteration with these embodiments bridge a variety of distances and extend in different directions. The invention can also be practiced using different elements to represent image sections of different sizes. As with the foregoing embodiments, these further embodiments can be practiced using independent iterations or averaged iterations, i.e. using either a reset intermediate product or an averaged product as the final combined measure for each iteration.

Figure 10:
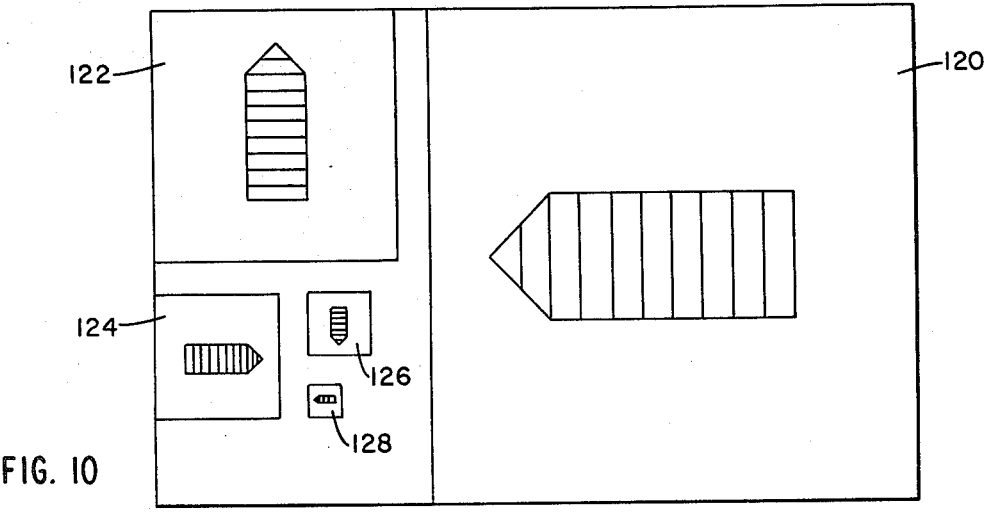
FIG. 10 is a diagrammatic representation of a mapping of information in a memory for practice of features of the invention.

A first embodiment of this practice of the invention with image elements of different sizes is practiced with the system of FIG. 3 using the image processors 20, 22 and 24, although it can equally be practiced with the same system using the processor 80 of FIG. 9 in place of each processor 20, 22 and 24. As will become apparent, the embodiment employs refresh memories with greater storage capacity than in prior embodiments to attain the same level of image resolution. In this practice of the invention, the radiance information identifying the image to be processed is recorded or otherwise stored, as in a memory element of the program control unit 56. The program control unit 56 also records the original image information, as thus recorded or stored, in a portion 120 of the first channel refresh memory 28, as FIG. 10 shows. The identical image information is also copied into four other portions of the memory 28 with different reduced sizes and orientations, as mapped in FIG. 10 in the memory portions 122, 124, 126 and 128. The illustrated mapping thus stores five image representations, each perpendicular to and one-half as large as the next larger one. Further, the several image representations preferably are stored spaced apart.

Those skilled in the art will recognize that other devices can be used to generate different size images of the same scene on a single detector array. Except for the different orientations, the same image representations as shown in FIG. 10 can be produced by using five lenses of different focal lengths and five different lens-to-detector distances. The shortest focal length lens forms an image representation analogous to the one mapped in the memory portion 128 in FIG. 10. Each successively larger image representation is made with a longer focal length lens that makes the image representation twice the size of the previous lens. The longest focal length lens forms the largest image representation, analogous to the one mapped in the FIG. 10 memory portion 120. This embodiment does not require a high resolution record of the entire image in the program control unit 56 because each lens in the system makes individual minified image representations of the scene. The image representations, whether optically or electronically minified, are processed in the same manner.

The FIG. 3 system computes transition measures for each image representation, in the same manner as described above with reference to FIGS. 6A through 6D and the flow chart of FIG. 4 (and with wraparound insulation according to FIGS. 7A–7D), to compute a field of new products for each of the multiple image representations mapped in the memory 28 as shown in FIG. 10. The scroll in each iteration, however, is selected to compare only elements of the same image representation. That is, the image representation stored in each memory portion 120, 122, 124, 126 and 128 is compared only with elements within that memory portion. Comparisons between different image representations are avoided or are processed as scroll wraparounds in the manner described above with reference to FIG. 7. With perpendicular or like differently-oriented image representations as in FIG. 10, the system operates with uniformly-directed scrolls, which can yield economies in implementation.

Upon completion of the selected number of such iterations, the final new products for the several image representations in the third channel refresh memory 44 represent the results of five independent lightness imaging calculations that use diverse path directions to compare elemental areas of different real size. The program control unit 56 electronically zooms and rotates the resultant average products for the different image representations to identical size and orientation, and then averages the several new product fields to form the final single field of lightness-imaging products.

Table I lists, in order, the scroll coordinates for a two-hundred-iteration operating cycle for processing different image representations as shown in FIG. 10 in the foregoing manner. The Table identifies each iteration by number, i.e. (1) through (200), and presents the (x) and (y) scroll displacement coordinates for each iteration. The practice of the invention as described with reference to FIGS. 3 and 10 and Table I employs larger capacity memories to store the multiple image representations with equivalent resolution, as compared to the practice according to FIGS. 3 and 6.

TABLE 1

| | | | | | |
|---|---|---|---|---|---|
| 1 | 1 | 1 | 60 | 0 | −1 |
| 2 | 0 | 1 | 61 | 1 | −1 |
| 3 | 1 | 1 | 62 | 0 | −1 |
| 4 | 0 | 1 | 63 | −1 | −1 |
| 5 | −1 | 1 | 64 | 0 | −1 |
| 6 | −1 | 0 | 65 | 1 | −1 |
| 7 | −1 | 1 | 66 | 0 | −1 |
| 8 | −1 | 0 | 67 | −1 | −1 |
| 9 | −1 | −1 | 68 | −1 | 0 |
| 10 | 0 | −1 | 69 | −1 | −1 |
| 11 | −1 | −1 | 70 | −1 | 0 |
| 12 | 0 | −1 | 71 | −1 | 1 |
| 13 | −1 | −1 | 72 | 0 | 1 |
| 14 | 0 | −1 | 73 | −1 | 1 |
| 15 | 1 | −1 | 74 | 0 | 1 |
| 16 | 0 | −1 | 75 | 1 | 1 |
| 17 | −1 | −1 | 76 | 0 | 1 |
| 18 | −1 | 0 | 77 | −1 | 1 |
| 19 | −1 | −1 | 78 | 0 | 1 |
| 20 | −1 | 0 | 79 | 1 | 1 |
| 21 | −1 | −1 | 80 | 0 | 1 |
| 22 | −1 | 0 | 81 | 1 | 1 |
| 23 | −1 | −1 | 82 | 1 | 0 |

TABLE 1-continued

| | | | | | |
|---|---|---|---|---|---|
| 24 | 0 | −1 | 83 | 1 | 1 |
| 25 | −1 | −1 | 84 | 1 | 0 |
| 26 | 0 | −1 | 85 | 1 | 1 |
| 27 | −1 | −1 | 86 | 1 | 0 |
| 28 | 0 | −1 | 87 | 1 | 1 |
| 29 | 1 | −1 | 88 | 1 | 0 |
| 30 | 0 | −1 | 89 | 1 | 1 |
| 31 | −1 | −1 | 90 | 0 | 1 |
| 32 | −1 | 0 | 91 | 1 | 1 |
| 33 | −1 | −1 | 92 | 0 | 1 |
| 34 | 0 | −1 | 93 | −1 | 1 |
| 35 | −1 | −1 | 94 | 0 | 1 |
| 36 | 0 | −1 | 95 | −1 | 1 |
| 37 | −1 | −1 | 96 | 0 | 1 |
| 38 | 0 | −1 | 97 | 1 | 1 |
| 39 | 1 | −1 | 98 | 1 | 0 |
| 40 | 0 | −1 | 99 | 1 | −1 |
| 41 | 1 | −1 | 100 | 1 | 0 |
| 42 | 0 | −1 | 101 | 1 | −1 |
| 43 | −1 | −1 | 102 | 0 | −1 |
| 44 | −1 | 0 | 103 | 1 | −1 |
| 45 | −1 | 1 | 104 | 0 | −1 |
| 46 | −1 | 0 | 105 | −1 | −1 |
| 47 | −1 | 1 | 106 | 0 | −1 |
| 48 | 0 | 1 | 107 | −1 | −1 |
| 49 | −1 | 1 | 108 | −1 | 0 |
| 50 | −1 | 0 | 109 | −1 | 1 |
| 51 | −1 | 1 | 110 | 0 | 1 |
| 52 | −1 | 0 | 111 | −1 | 1 |
| 53 | −1 | −1 | 112 | 0 | 1 |
| 54 | −1 | 0 | 113 | 1 | 1 |
| 55 | −1 | 1 | 114 | 1 | 0 |
| 56 | −1 | 0 | 115 | 1 | 1 |
| 57 | −1 | −1 | 116 | 1 | 0 |
| 58 | 0 | −1 | 117 | 1 | 1 |
| 59 | −1 | −1 | 118 | 0 | 1 |
| 119 | 1 | 1 | 178 | 0 | −1 |
| 120 | 1 | 0 | 179 | 1 | −1 |
| 121 | 1 | 1 | 180 | 0 | −1 |
| 122 | 1 | 0 | 181 | 1 | −1 |
| 123 | 1 | −1 | 182 | 1 | 0 |
| 124 | 0 | −1 | 183 | 1 | 1 |
| 125 | 1 | −1 | 184 | 0 | 1 |
| 126 | 1 | 0 | 185 | 1 | 1 |
| 127 | 1 | 1 | 186 | 1 | 0 |
| 128 | 1 | 0 | 187 | 1 | 1 |
| 129 | 1 | 1 | 188 | 1 | 0 |
| 130 | 1 | 0 | 189 | 1 | −1 |
| 131 | 1 | 1 | 190 | 1 | 0 |
| 132 | 1 | 0 | 191 | 1 | 1 |
| 133 | 1 | −1 | 192 | 1 | 0 |
| 134 | 0 | −1 | 193 | 1 | 1 |
| 135 | 1 | −1 | 194 | 1 | 0 |
| 136 | 0 | −1 | 195 | 1 | −1 |
| 137 | 1 | −1 | 196 | 0 | −1 |
| 138 | 1 | 0 | 197 | −1 | −1 |
| 139 | 1 | 1 | 198 | −1 | 0 |
| 140 | 1 | 0 | 199 | −1 | 1 |
| 141 | 1 | 1 | 200 | −1 | 0 |
| 142 | 0 | 1 | | | |
| 143 | 1 | 1 | | | |
| 144 | 0 | 1 | | | |
| 145 | 1 | 1 | | | |
| 146 | 1 | 0 | | | |
| 147 | 1 | 1 | | | |
| 148 | 0 | 1 | | | |
| 149 | 1 | 1 | | | |
| 150 | 0 | 1 | | | |
| 151 | 1 | 1 | | | |
| 152 | 0 | 1 | | | |
| 153 | −1 | 1 | | | |
| 154 | −1 | 0 | | | |
| 155 | −1 | −1 | | | |
| 156 | −1 | 0 | | | |
| 157 | −1 | 1 | | | |
| 158 | 0 | 1 | | | |
| 159 | −1 | 1 | | | |
| 160 | −1 | 0 | | | |
| 161 | −1 | 1 | | | |
| 162 | 0 | 1 | | | |
| 163 | 1 | 1 | | | |
| 164 | 1 | 0 | | | |

TABLE 1-continued

| | | |
|---|---|---|
| 165 | 1 | 1 |
| 166 | 1 | 0 |
| 167 | 1 | 1 |
| 168 | 0 | 1 |
| 169 | 1 | 1 |
| 170 | 0 | 1 |
| 171 | −1 | 1 |
| 172 | −1 | 0 |
| 173 | −1 | −1 |
| 174 | 0 | −1 |
| 175 | −1 | −1 |
| 176 | 0 | −1 |
| 177 | 1 | −1 |

Another embodiment of the invention with pairings of multi-size image sections is identical to that described with reference to FIG. 10 except that each image representation is processed with a sequence of iterations which may differ from the sequences used to process other image representations. Each sequence has approximately the same number of iterations, but the magnitudes of the distances between paired segmental areas are tailored for each size of image representation. It will also be apparent that each image representation mapped in FIG. 10 can be processed with a separate image processor tailored for the size of whichever image representation it processes.

Sequential Progression of Sizes

Alternative to processing the different image representations independently of one another, as described with reference to FIG. 10, improved image quality after equal or fewer iterations results when the several image representations are processed sequentially and the new product determined for each image representation is used as the initialized information for the third channel refresh memory 44 (or for the second channel memory 96 when each processor is of the two-channel construction shown in FIG. 9). It is further advantageous to process the image representations in this ordered sequence starting with the smallest image representation as shown in FIG. 10 in memory region 128, and progressing to the largest.

FIG. 11 shows a full-color image-producing system for this practice of this invention. The illustrated system has an input stage 130 which applies image-responsive radiance information for each of three color bands to different ones of three memories 132, 134 and 136. A program control unit 138, illustrated as connected with all other elements of the system beyond the input stage, controls the operation of three image processors 140, 142, 144, illustratively each of the two-channel construction described above with reference to FIG. 9. Each processor 140, 142, 144 is connected to receive image information from one memory 132, 134, 136, respectively, by way of a zoom stage 145. An output stage 146 receives the processed image signals from the three processors to provide the color masking, exposure control and like further signal processing as appropriate and to provide the desired display or other output presentation of the lightness processed image.

The system first stores the logarithm of the radiance information for each element of the image field, for each of three wavelength bands, in different ones of the memories 132, 134 and 136. The program control unit 138 reduces the size of the information field in each memory 132, 134 and 136 by a factor of sixty-four with the zoom stage 145, and stores the minified image field in a one-sixty-fourth portion of the first channel refresh memory 148 of each processor. The control unit 138 similarly initializes, preferably with the logarithm of a selected uniform radiance field, a correspondingly located one-sixty-fourth portion of the second channel refresh memory 150 in each processor 140, 142, 144. The control unit then performs with each processor a selected number of iterations, each as described above with reference to FIG. 9, using only the one-sixty-fourth portion of each memory which stores image information.

Before the program control unit 138 executes a second cycle of iterations, the new product results of the last iteration of the prior, first cycle are magnified, with the zoom stage 145 and by enabling data paths 152 and 154 shown in the processor 144, by a linear factor of two to initialize the second channel memory 150 of each processor for the next set of iterations. The zoom stage 145 initializes each first channel memory 148 with a sixteen-to-one area reduction of the information field in each associated memory 132, 134, 136, using one-sixteenth of the refresh memory. The resultant new product in each second channel refresh memory 150 is again electronically magnified and placed in a one-quarter portion of that memory to initialize it for the third cycle of iterations. Similarly, the first refresh memory in each processor receives, in a one-quarter portion, a four-to-one area reduction of the original image field information in its associated memory 132, 134 and 136. After executing the third set of iterations, each processor is again initialized, this time using the entirety of each refresh memory. The results of the fourth set of such iterations yield in each second channel memory 150 a full-size field of lightness-identifying new product information for producing the desired display of the image field.

The system of FIG. 11 thus performs multiple cycles, each of multiple iterations and each using a successively larger field of image-identifying information. Each cycle produces a field of new product information which is electronically zoomed or magnified to form the initial old product for the start of the next set of iterations. FIGS. 10 and 11 thus illustrate practices of the invention using differently-sized image elements in different processing iterations.

Table II is a list of thirty-two numbered pairs of relative time delays for one specific practice of the invention, used for each of the four cycles as described for the system of FIG. 11.

TABLE II

| | | | | | |
|---|---|---|---|---|---|
| 1 | 1 | 1 | 17 | 1 | 0 |
| 2 | 1 | 1 | 18 | 1 | 1 |
| 3 | 1 | 1 | 19 | 1 | 1 |
| 4 | 1 | 1 | 20 | 0 | 1 |
| 5 | 1 | 1 | 21 | 0 | 1 |
| 6 | 1 | 1 | 22 | −1 | 1 |
| 7 | 1 | 0 | 23 | −1 | 1 |
| 8 | 1 | 0 | 24 | −1 | 1 |
| 9 | 1 | 0 | 25 | −1 | 1 |
| 10 | 1 | 0 | 26 | −1 | 1 |
| 11 | 1 | 0 | 27 | −1 | 1 |
| 12 | 1 | 0 | 28 | −1 | 1 |
| 13 | 1 | −1 | 29 | −1 | 1 |
| 14 | 1 | −1 | 30 | −1 | 1 |
| 15 | 1 | −1 | 31 | −1 | 1 |
| 16 | 1 | −1 | 32 | −1 | 1 |

Another embodiment of the multiple-size pairings uses a combination of optical and electronic techniques to change the size of the image. Here a zoom lens is employed to make a series of different size image representations of the same scene. The system first sets the zoom lens to the smallest specified representation of objects in the scene. The optical image under this condition includes more of the entire field of view because at this setting the lens has its widest angle. The desired portion of the scene is imaged in the center of the detector array and represents the image in relatively few pixels. The remainder of the image formed by the lens is called the peripheral image. In some applications the process can ignore the entire peripheral image by using techniques analogous to those described regarding wraparound insulation. In other applications, the process benefits from using the peripheral image information in calculating lightness fields that are influenced by segmental areas outside the final desired image.

In both cases, whether the peripheral image is included or not, the lightness field is calculated in the manner described with FIG. 9. The long distance, global interactions are performed first, in relatively few iterations. The processed image is then zoomed by electronic means to twice its original size by rewriting each pixel in the preceding image representation as four pixels. If desired, any known shading element can be used to smooth the edges of each four-pixel area. The new enlarged image is sent to the product memory 96 in FIG. 9 to serve as the array of previously determined values for the next stage of computation. The system next sets the zoom lens to form an image twice the size of the previous image and enters it at the input stage 86 in FIG. 9. The process then computes the next stage of the calculation for the slightly less global interactions. The system repeats this sequence a number of times, and for each successive iteration stage, the contents of the second channel memory 96 are zoomed by electronic means, and the image information in the input stage 86 is zoomed by optical means, each time to produce images of the same size. The final calculated lightness field has the benefit of both global and local interactions. As described above, this system can be implemented so that the lightness field of the desired image benefits from the information in the ultimately discarded peripheral images.

A Lightness Imaging Camera

FIG. 12 illustrates, in a schematic manner, an application of the invention to a self-developing camera 160. A light-tight camera housing 162 mounts a lens 164 that focuses the desired viewing field onto the photosensitive surface of a multi-element CCD array 166. The array 166 includes the electronic circuits of a program control unit and of three image processors, together with color masking and exposure control circuits as described above. A multiconductor cable 168 applies the resultant lightness imaging signals to a light emitting diode (LED) array 170. The lightness imaging signals from the CCD array 166 energize the arrayed light emitting diodes to expose a film unit in a film pack 172 through a transparent optical plate 174, which could, if desired, be lenticulated. The camera includes a pair of motor driven spreading rollers 176 and associated mechanism for withdrawing each film unit from the film pack after exposure and ejecting it from the camera, as illustrated with the film unit 178, in a manner which initiates the self-developing process known for self-developing cameras such as those manufactured by the Polaroid Corporation.

This type of camera has a number of unique design features that take advantage of the physical properties of the components. The individual detector elements in the array 166 can be small, even in comparison to the size of the individual elements in the light emitting array 170. The latter array in turn is matched to the resolution of the film. The use of a small detecting array is advantageous because it allows the use of relatively short focal length lenses for the same size final image, i.e. film unit 178. A short focal length lens 164 means that the camera is proportionally less thick, and that the optical image has proportionally greater depth of field, thus making the requirements for focusing less demanding. In addition, shorter focal length lenses have smaller f/numbers for the same diameter aperture.

An array of charge coupled devices (a CCD array) or of charge induction devices (a CID array) is particularly appropriate for the practice of this invention because of a combination of physical properties. First, this type of photoelectric transducer is specifically designed to report the radiances of a large number of pixels. Second, these detectors respond to a large range of radiances. This enhances the ability of the system to correct for the large dynamic ranges of radiances found in natural illuminations. Third, either array can additionally serve as a memory device. In principle this dual property of the CCD or CID array, being both detector and memory, can lead to a multilayered embodiment of FIG. 9 that includes at least an input stage 86 and memories 84 and 94 in a single integrated circuit chip. Correspondingly, a FIG. 3 processor 20 can be constructed with at least the input stage detector 14 and the first channel memory 28 in a single IC chip.

The embodiments described above thus provide efficient lightness-imaging systems that provide both local and global computational interactions of radiance information. A succession of the interactions compares radiance information from image locations that are spaced apart by an ordered succession of distances, or compares radiance information of image representations having an ordered succession of magnifications. The embodiments further advance retinex processing by operation on a field basis, rather than on a location by location basis. A practice of this feature with a field of $(512)^2$ locations, and employing two memories each having capacity to store the entire field, can rapidly calculate and store one-quarter million parallel one-step sequences of reset ratio products. The advantage of this approach is that a single operation comparing two fields of information accomplishes—in this example—one-quarter million parallel computations. Succeeding iterations can build on the sequential product image in such a manner that N iterations accumulate information at every location along a patterned N-jump excursion on an individual path. Compared with prior practices in which each operation deals with only a single pair of pixels, these features can achieve time savings over prior practices of a factor approaching the number of locations.

The described embodiments manifest a further significant advance in processing efficiency by using field-by-field processing.

Combining image-information fields produced with successive processing iterations in accordance with the invention has maximal productivity in conjunction with another feature which the foregoing embodiments demonstrate. This feature is the pairing of image field locations employing a spatial parameter that changes from iteration to iteration. Every pairing, and correspondingly every iteration, brings to one pixel or location the information accumulated by the pixel paired therewith. This process yields a geometric growth in information accumulation such that there are $(2^N-1)$ such accumulations after N iterations. One end result of a lightness-computing process which employs diverse interactions in this manner is a real time imaging system.

Yet another feature of the invention which the foregoing embodiments implement is the ordering of iterations. The resetting function, which the lightness-image processing of the invention employs to establish lighter areas as references, is a non-linear operation that makes the ordering of iterations important. The combining of successive iterations in accordance with the invention with a geometric average has been found to produce optimal results when the larger field displacements precede smaller ones. The resetting function preferably establishes reference to an extreme or limit level of lightness, e.g. bright white or total black.

Three appendices are attached hereto. Appendix I is a computer program listing for one specific practice of the invention as described above with reference to FIGS. 3 and 6 and using either the eighteen-step cycle described with reference to FIG. 2 of a fifty-six step cycle. The listing is in Fortran language and is prepared for use with an International Imaging Systems Model 70 image processor controlled by a DEC PDP 11/60 computer operating under RSX 11M.

Appendix II is a further description of a preferred form of the color mask stage 58 of FIG. 3 for one practice of the invention.

Figure 13:
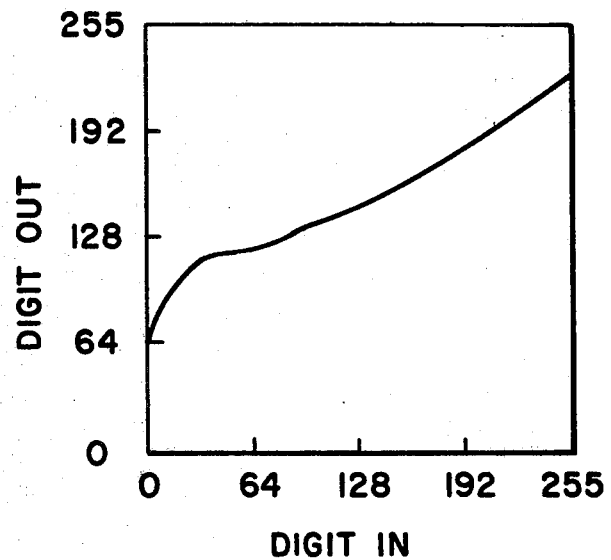
FIG. 13 shows a graph indicating the numeral transformation of stage 60.

Appendix III and FIG. 13 further describe a preferred embodiment of the exposure control stage 60 of FIG. 3 for one practice of the invention.

It will thus be seen that the objects set forth above, among those made apparent from the preceding description, are efficiently attained. Since certain changes may be made in carrying out the above methods and in the constructions set forth without departing from the scope of the invention, all matter contained in the above description or shown in the accompanying drawings is to be interpreted as illustrative and not in a limiting sense. One change, among numerous ones, is that the invention can be practiced with equipment which operates on an analog basis, rather than with the digital equipment of the described embodiments.

It is also to be understood that the following claims are intended to cover all of the generic and specific features of the invention herein described, and all statements of the scope of the invention which as a matter of language might be said to fall therebetween.

APPENDIX I

A program (named EYEFLY) is provided with a data file (in lines 51-77 of the following program listing), and the operator controls specific features of the sequence of iterations. Two samples of this data file follow: The first specifies a set of eighteen iterations as discussed with reference to FIG. 2. The second specifies a set of fifty-six iterations for use in producing a variety of images that exhibit the effectiveness of the process.

Following the data files is a complete, commented, 277-line listing of EYEFLY, after which appear indices of program sections, statement functions, variables, arrays, labels, and functions and subroutines used. Finally, a separate list is included of the subroutines, with comments on the functions they serve.

| Data File for 18-step Operation | |
|---|---|
| 18,0,0,1,0,2. | 18 jumps, controlled, (not used), multi-color, separations 0 to 2 |
| BAZ4 | ! zoomed face image, scaled to 4 decades |
| O | ! threshold=0 grey levels |
| .5,,, | ! weighting of old log(sum)=50% |
| 256,0,  ] | |
| 0,256   ] | |
| −128,0  ] | |
| 0,−128  ] | |
| 64,0    ] | |
| 0,64    ] | |
| −32,0   ] | |
| 16,0    ] | ! 18x,y pixel jump components; one pair/line |
| 0,16    ] | |
| −8,0    ] | |
| 0,−8    ] | |
| 4,0     ] | |
| 0,4     ] | |
| −2,0    ] | |
| 0,−2    ] | |
| 1,0     ] | |
| 0,1     ] | |

| Data File for 56-step Operation | |
|---|---|
| 56,0,0,1,0,2, | 56 jumps, controlled, (not used), multi-color, separations 0 to 2 |
| BAZ4 | !zoomed face image, scaled to 4 decades |
| O | !threshold=0 grey levels |
| .5,,, | !weighting of old log(sum)=50% |
| 128,128 ] | |
| −128,0  ] | |
| −128,0  ] | |
| 0,−128  ] | |
| 0,−128  ] | |
| 128,0   ] | |
| 128,0   ] | |
| 0,128   ] | |
| 64,64   ] | |
| −64,0   ] | |
| 0,−64   ] | |
| 0,−64   ] | |
| 64,0    ] | |
| 64,0    ] | |
| 0,64    ] | |
| 32,32   ] | |
| −32,0   ] | |
| −32,0   ] | |
| 0,−32   ] | |
| 0,−32   ] | |
| 32,0    ] | |
| 32,0    ] | |
| 0,32    ] | |
| 16,16   ] | |
| −16,0   ] | |
| −16,0   ] | |
| 0,−16   ] | ! 56x,y pixel jump components; one pair/line |
| 0,−16   ] | |
| 16,0    ] | |
| 16,0    ] | |

-continued

| Data File for 56-step Operation |
|---|
| 0,16 ] |
| 8,8 ] |
| −8,0 ] |
| −8,0 ] |
| 0,−8 ] |
| 0,−8 ] |
| 8,0 ] |
| 8,0 ] |
| 0,−8 ] |
| 0,−8 ] |
| 8,0 ] |
| 8,0 ] |
| 0,8 ] |
| 4,4 ] |
| −4,0 ] |
| −4,0 ] |
| 0,−4 ] |
| 0,−4 ] |
| 4,0 ] |
| 4,0 ] |
| 0,4 ] |
| 2,2 ] |
| −2,0 ] |
| −2,0 ] |
| 0,−2 ] |
| 0,−2 ] |
| 2,0 ] |
| 2,0 ] |
| 0,2 ] |

```
FORTRAN IV-PLUS V02-51      20:31:22    22-JUL-80         PAGE 1
EYEFLY.FTN       /TR:ALL/WR

0001              PROGRAM EYEFLY
        C         EYEFLY does instantaneous Retinex processing on a (log-energy) image.
0002              PARAMETER MXITER=16, MXCTRL=100
0003              INTEGER IDIRX(0:7),IDIRY(0:7),LUTNEG(256),LUTRAT(256),TOTX,TOTY
0004              integer indirx(0:7),indiry(0:7),RANDOM,cfalse,fulimg
0005              integer jum(mxiter),nho(mxiter),iep(mxiter),npa(mxiter)
0006              real chi(mxiter),dhi(mxiter),ehi(mxiter),aha(mxiter)
0007              INTEGER JCX(MXCTRL),JCY(MXCTRL)
0008              real co(0:1)
0009              integer buff(2048)
0010              integer lutlin(256),TEMP,avpath(0:255,0:1)
0011              INTEGER FCB(6),VRTC,ICHAN(3),scrach(0:255,0:1)
0012              byte MORE,OK,ISLOW,IPATH,onward,ever,name(30),comfil(30),basis(30)
0013              byte tname(30),namout(36)
0014              equivalence (avpath(0,0),buff(1)),(lutneg(1),buff(1025))
0015              DATA INDIRX /0,1,1, 1, 0,-1,-1,-1/
0016              DATA INDIRY /1,1,0,-1,-1,-1, 0, 1/
0017              oldp(ihop,itot)=C+ D/ihop + (E*ihop)/itot !Define combining fraction
        C                               of successive iterations as a function of hop number.
0018              call normal(fcb,buff,3,-5)
        C========================================================================
        C
        C                    INITIALIZE SYSTEM
        C
        C========================================================================
0019              call rbutn(fcb,icbut,icx,icy)
0020              DO 3 N=1,256
0021              randy=ran(ir1,ir2)
0022              LUTLIN(N)=N-1
0023              LUTRAT(N)=2*(N-128)      !will expand compressed ratios
0024     3        LUTNEG(N)=256-N          !Will help compute ratios
0025              LUTRAT(256)=255          !Else would overflow, from 256 to -256.
0026              call data(name,'4,,3#,')
0027              call data(basis,'1,,')
0028              do 4 n=1,1024
0029     4        buff(n)=0
0030              call ofm(fcb,buff,1,0,0)        !make blue invisible; green will be
        C                               too, due to CONST, most of the time, except in FREEZE.
0031              DO 434 N=1,255,2
0032              SCRACH(N,1)=0
0033     434      SCRACH(N,0)=N            !ODD-NUMBER SIGNS FULL-WEIGHT TO OLD PRODUCT.
        C         ----
0034              CALL LUT(FCB,LUTNEG,2,4,0,0)    !Green gets neg. input from chan. 2
0035              CALL LUT(FCB,LUTLIN,2,2,0,0)
0036              CALL LTCNT(FCB,6,2,0,0) !Green = channel 1 - channel 2
0037              CALL LUT(FCB,LUTRAT,4,2,0,0)    !Ready to use ratios
0038              CALL LUT(FCB,LUTLIN,4,1,0,0)    ! AND old sequential products
0039              DO 20 N=1,512    !IFM maps -255 to 0, 0 to 127, and 255 to 255.
0040              TEMP=(N-1)/2
0041              IF(IABS(N-255).LE.INTEPS) TEMP=127
0042     20       buff(N)=TEMP
```

```
0043            CALL IFM(FCB,buff,512,511,0,0,0)  !CHANGE, 2/20/80, TO LOAD ONCE ONLY
        C          USE GREEN CONST=512; won't affect normal feedback of green,BYPIFM.
0044            call const(fcb,0,512,0,0,0)
0045            do 30 j=1,256
0046       30   buff(j)=j-1
0047            do 31 j=257,511
0048       31   buff(j)=255     !White referenc. ^rces all white-exceeders back to 255.
0049            call ifm(fcb,buff,0,511,0,0,0)
0050            type 19,' ',7
        C=====================================================================
        C
        C             DETERMINE NAME OF CONTROLLING DATA FILE  ^ OPEN IT
        C
        C=====================================================================
0051            call demo('EYEFLY',input)
0052            ITYP=0
0053            if(input.ne.1) go to 2300
0054            type *,'Enter data file for EYEFLY.'
0055            accept 19,(comfil(j),j=1,29)
0056            DO 2200 N=1,29
0057            IF(COMFIL(N).NE.' ') ITYP=1
0058       2200 CONTINUE
0059       2300 IF(ITYP.EQ.0)   call data(comfil,'[1,5]eyefly.dat')
0060            OPEN (UNIT=2, NAME=comfil,TYPE='OLD',READONLY)
0061            read (2,9) nhi,RANDOM,cfalse,fulimg,minch,maxch
        C --Input # hierarchies, random/controlled switch, multi-color/1 separation
        C --switch, unused variable CFALSE, minimum, maximum color channel #'s.
0062            namlet=4
0063            if(fulimg.eq.1) namlet=7
0064            read (2,19) (name(i),i=namlet,29)
0065            if(RANDOM.NE.1) GO TO 350
        C=====================================================================
        C
        C       FOR RANDOM WALKS, for each "hierarchy of level",
        C  here input the jump size, # jumps, threshold, # paths, % that jump ahead,
        C  and coefficients for pooling fraction.
        C
        C=====================================================================
0066            do 300 n=1,nhi
0067            read (2,39) jum(n),nho(n),iep(n),npa(n),aha(n)
0068       300  read (2,69) chi(n),dhi(n),ehi(n)
0069            GO TO 400
        C=====================================================================
        C
        C       OR, FOR CONTROLLED JUMPS, read in the single threshold, pooling
        C                fraction coefficients, and the x,y, components of every
        C                jump-vector, and conventionally define exactly one "hierarchy"
        C                of one "path" composed of these vectors.
        C
        C=====================================================================
0070       350  read (2,9) inteps
0071            read (2,69) C,D,E
0072            do 360 n=1,nhi
0073       360  read (2,9) jcx(n),jcy(n)
0074            num=nhi
0075            NHI=1    !NHI for controlled series=1 long path of variable jump-sizes!
0076            NPATHS=1
0077       400  CLOSE (UNIT=2)
        C=====================================================================
        C
        C             DETERMINE THE NAMES OF INPUT & OUTPUT IMAGES
        C
        C=====================================================================
0078            if(input.ne.1) go to 2400
0079            type 509,7,(name(i),i=namlet,29)
0080            if(fulimg.eq.1) type *, 'Will store sections of color image:
                1 <ret> or enter input IMAGE-name.'
0081            accept 99,(tname(i),i=namlet,29)
0082            do 490 j=namlet,29
0083            if(tname(j).ne.' ') go to 495
0084       490  continue
0085            GO TO 2400
0086       495  do 496 j=namlet,29
0087       496  name(j)=tname(j)       !we allow terminal input of image-name
0088       2400 mnband=0
0089            mxband=0
0090            if(fulimg.ne.1) go to 2500
0091            mnband=minch
0092            mxband=maxch
0093            call data(namout,'1,s1,3#,')
0094            call data(namout(9),name(7))
0095            do 2410 l=9,30
0096            if(namout(l).eq.' '.or.namout(l).eq.'.') go to 2411
0097       2410 continue
0098            stop 'Disk filename too long.'
```

```
0099    2411    if(namout(1).eq.'.') go to 2415
0100            namout(1)='P'    !processed images gets "P" at the end of its name.
0101            go to 2500
0102    2415    do 2420 n=29,1+1,-1
0103    2420    namout(n)=namout(n-1)    !bump letters forward to make room for "P"
0104            namout(1)='P'
0105    2500    continue
0106            TIME0=secnds(0.)
C==========================================================================
C
C               LOOP OF DIFFERENT COLOR SEPARATIONS
C
C==========================================================================
0107            DO 1000 IBAND=MNBAND,MXBAND    !!!!do multiple colors in one run!!!!!
0108            call ones(buff,1,-1)    !WREF (all bits on) in chan. 0.
C==========================================================================
C
C               LOOP OF SUCCESSIVE HIERARCHY LEVELS FOR RANDOM PATHS
C               OF DIFFERENT JUMP-SIZE
C
C==========================================================================
0109            do 500 IHI=1,NHI
0110            if(fulimg.eq.1) name(5)=iband+'0'    !input channel picked from image
0111            call dazz(name)
0112            type *,' '    !skip along, so TOTX etc. doesn't over-write messages.
0113            if (random.ne.1) go to 150
C==========================================================================
C
C               INITIALIZE HIERARCHY-SPECIFIC CONSTANTS (jump size,
C                       possible vector components, pooling fraction coefficients)
C
C==========================================================================
0114            jumpsz=jum(ihi)
0115            IFAR=512-JUMPSZ  !far edge of screen (requiring insulation) starts here.
0116            num=nho(ihi)
0117            inteps=iep(ihi)
0118            npaths=npa(ihi)
0119            ahead=aha(ihi)
0120            c=chi(ihi)
0121            d=dhi(ihi)
0122            e=ehi(ihi)
0123            TYPE *,'Jump size (max 8), # of hops, integer thresh, NPATHS,
                1 AHEAD (4i5,f7.2)'
0124            TYPE 39,JUMPSZ,NUM,inteps,NPATHS,AHEAD
0125            if(npaths.le.0) npaths=1
0126            if(ahead.le.0) ahead=0.3
0127            type *,'Real coefficients C,D,E to calc. fraction weighting old SEQPR'
0128            type 79,num,num
0129            TYPE 69,c,d,e
0130            type *,'Hit button A to pause and consider early exit.'
0131            TYPE 19         !Space forward
0132    5       IF(JUMPSZ.LT.0 .OR. JUMPSZ.GT.504) JUMPSZ=8
0133            DO 6 N=0,7
0134            IDIRX(N)=INDIRX(N)*JUMPSZ
0135    6       IDIRY(N)=INDIRY(N)*JUMPSZ
C==========================================================================
C
C               LOOP OF MULTIPLE PATHS AT GIVEN HIERARCHY LEVEL
C                       (First, initialize path-specific parameters)
C
C==========================================================================
0136    150     do 200 np=1,npaths
0137            lastgo=ran(ir1,ir2)*8.
0138            TOTX=0
0139            TOTY=0
0140            if(np.eq.1.or.ihi.gt.1) go to 8
0141            call ones(buff,1,-1)    !WREF (all bits on) in chan. 0.
C==========================================================================
C
C               LOOP OF INDIVIDUAL JUMPS --the INNER WORKINGS!!
C
C==========================================================================
0142    8       DO 100 NHOP=1,NUM
C               if(NOSTOP.eq.1) GO TO 16
C==========================================================================
C               Optionally, view progress on this path so far.
C==========================================================================
0143            if(NEEDCR.eq.1) call rbutn(fcb,icbut,ix,iy)
0144            CALL RBUTN(FCB,IBUT,IX,IY)
0145            NEEDCR=0        !usually will not need to clear button next time.
0146            IF(IBUT.NE.1) GO TO 16
0147            TYPE *,'HIT button B to resume process, C to see original, D to exit.'
0148            TYPE 19         !Space forward
0149    7       call waitic(2)
0150            call rbutn(fcb,ibut,ix,iy)
0151            if(ibut.ne.1.and.ibut.ne.2.and.IBUT.NE.3.and.ibut.ne.4.and.ibut.ne.8)
                1       go to 7
```

```
0152            if(ibut.eq.8) call exit
0153            if(ibut.eq.2.or.IBUT.EQ.3) go to 15
0154            call ltcnt(fcb,ibut,4,0,0)      !show channel 0 vs. channel 2
0155            go to 7
0156    15      NEEDCR=1        !but here, must clear, and now is too early.
0157            call ltcnt(fcb,1,4,0,0)
0158    16      if(ibut.ne.3) go to 17
0159            type *,'Enter FREEZE mask: 1 shift, 2 ratio, 4 new product'
0160            accept 9,mfroze
0161    17      IF(RANDOM.NE.1) GO TO 11
        C====================================================================
        C
        C
        C         IF RANDOM, DETERMINE SPECIFIC VECTOR FOR THIS JUMP:
        C             (probability = 1.-AHEAD of veering off course of last jump)
        C
        C====================================================================
0162            randy=ran(ir1,ir2)
0163            MOVE=LASTGO
0164            IF(randy.le.ahead) GO TO 10
0165            IDEL=1
0166            IF(randy.LT.(1.+ahead)/2.) IDEL=-1
0167            MOVE=JFMOD(LASTGO+IDEL,8)
0168    10      LASTGO=MOVE
0169            MOVX=IDIRX(MOVE)
0170            MOVY=IDIRY(MOVE)
0171            go to 12
        C====================================================================
        C
        C
        C         OR, TAKE VECTOR from input list, and find
        C             its magnitude and that of complementary wrap-around edge.
        C
        C====================================================================
0172    11      movx=jcx(nhop)
0173            movy=jcy(nhop)
0174            jumpsz=max(abs(movx),abs(movy))
0175            ifar=512-jumpsz
0176    12      TOTX=TOTX+MOVX
0177            TOTY=TOTY+MOVY
0178            TYPE 49,TOTX,TOTY,nhop  !Type accumulated excursion of jumps so far.
        C====================================================================
        C
        C         EXTEND SEQUENTIAL PRODUCTS!!!!!!!!!!!!!!!!!!!!!!!!!
        C         Next five lines beginning with "CALL..." perform the vital functions:
        C             1) Shift Original Image
        C             2) Feed it to Intermediate Channel
        C             3) Feed back Ratio of shifted original to the Intermediate Channel
        C             4) Enable the Contributors to the Intermediate Product
        C             5) Feed the Intermediate Product back to the Intermediate Channel
        C
        C====================================================================
0179            CALL LTCNT(FCB,4,1,0,0) !Enable blue from chan. 2, latest image-shift.
0180            CALL feedm2 (buff,1,1,-1,1,MOVX,MOVY)
0181            if(iand(mfroze,1).ne.0) call freeze(2,2) !(optional pause for a look)
0182            CALL FDBCK(FCB,2,2,-1,0,0,0)    !Store "ratios" in channel 1.
0183            CALL LTCNT(FCB,3,4,0,0) !Red from (log seqpr)+(log ratio)
0184            if(iand(mfroze,2).ne.0) call freeze(2,4)    !RED uses ratio LUT
                                                            !(optional pause for a look)
0185            CALL feedm2(buff,4,1,-1,0,0,0)
0186            if(iand(mfroze,4).ne.0) call freeze(2,2) !(optional pause for a look)
0187            call ltcnt(fcb,1,4,0,0) !want to watch the progress of sequential prod.
        C               IF MOVED>0, influence just spread in positive direction,so
        C               we must safekeep 1st several rows from wrap-around by copying
        C               the OLD product (chan. 0) there into the part of new product
        C               (far edge) that WOULD otherwise change them when old, new are
        C               averaged.
        C                   IF MOVED<0, vice-versa.  That is, safekeep higher rows of old
        C               into lower of new.
        C
        C --Revision AGAIN, 2/16/80, 11 pm. New method is faster and will handle
        C       cases where both MOVX and MOVY are nonzero.  Wrap-around zones are
        C       marked with ones in bit-plane zero (detail lost anyway with C=.50!)
        C       These marked areas effect 100% weighting of old product, thanks
        C       to 434-loop initializing of SCRACH arrays, above.
        C====================================================================
        C
        C         CLEAR OUT ROOM FOR and then MARK WRAP-AROUND ZONES
        C
        C====================================================================
0188            call fdbck(fcb,2,3,1,1,0,0,1)   !zero out plane 0 of chans 0,1
0189            IF(JUMPSZ.EQ.256) GO TO 1035
        C               !NO "wrap-around" worries for unique JUMPSZ=(screen width)/2!
0190            do 1030 j=0,1
0191            moved=movy      !J (direction) 0=> rows, for which Y-change is key.
0192            if(j.eq.1) moved=movx
0193            if(moved.eq.0) go to 1030       !no work needed
0194            ifrom=0
0195            if(moved.lt.0) ifrom=ifar
```

```
0196              ito=ifar-ifrom
0197              call markl(buff,jumpsz,ifrom,ito,1,j,2)
0198       1030   continue
0199       1035   continue
0200              my=-movy
0201              mx=(-movx/8)*8
0202              if(mx.lt.-movx) mx=mx+8
0203              ipx=mx-(-movx)   !Need to "unscroll" the new sequential product
           C               before it can be (averaged with old) and fed back to chan. 0.
           C               So, as in feedm2, we break down every X scroll into a scroll and
          .C       a (negative) rightward 0-7 pixel offset: do the offset first.
           C=================================================================
           C           0-to-7 pixel "offset" for precise unscrolling
           C=================================================================
0204              if(ipx.eq.0) go to 33
0205              call image(fcb,buff,512-ipx,0,512*ipx,1,2,-1,1,1,0,0,0,0,1)
0206              CALL LTCNT(FCB,2,2,0,0)
0207              call fdbck(fcb,2,2,-1,1,ipx,0,0)
0208              call ltcnt(fcb,6,2,0,0)   !Get green ready for next RATIO again.
0209              call image(fcb,buff,0,0,512*ipx,1,2,-1,1,1,0,0,0,0,0)
           C=================================================================
           C           (Residual) UN-SCROLLING OF INTERMEDIATE PRODUCT
           C=================================================================
0210       33     call scrol(fcb,mx,my,2,0,0)
           C=================================================================
           C
           C           SET UP COMBINATION OF INTERMEDIATE, PREVIOUS PRODUCTS
           C
           C=================================================================
0211              if(nhop.gt.1.and.d.eq.0.and.e.eq.0.) go to 435 !SCRACH arrays ready.
0212              oh=oldp(nhop,num)
0213              if(oh.lt.0) oh=0.
0214              if(oh.gt.1.) oh=1.
0215              co(0)=oh
0216              co(1)=1.-oh
0217              do 34 ic=0,1
0218              do 34 n=0,254,2
0219       34     scrach(n,ic)=co(ic)*n
0220              do 35 ic=0,1
0221       35     call lut(fcb,scrach(0,ic),1,2**ic,0,0)
0222       435    call ltcnt(fcb,3,1,0,0)  !Blue will be a weighted avg. of old,new SEQPRs
           C                ─────────
           C=================================================================
           C .         Feed back Combination to SEQUENTIAL PRODUCT CHANNEL
           C=================================================================
0223       36     call fdbck(fcb,1,1,-1,1,0,0,0)
           C=================================================================
           C           RE-ZERO the scrolling register needed for "UN-SCROLLING"
           C=================================================================
224               call scrol(fcb,0,0,2,0,0)          !TROUBLE, if don't reset.
225        100    CONTINUE
           C**********
226               if(npaths.eq.1) go to 200          !no averaging to do!
           C=================================================================
           C
         , C   .         CALCULATE RESULT FROM AVERAGE OF MANY PATHS, and
           C                    (optionally) compare it to single most recent path.
           C
           C=================================================================
227               IF(NP.NE.0) call dazz('2,,,eye.tem;1')
228               do 180 n=0,255
229               avpath(n,1)=((np-1)*float(n))/float(np) !average of old paths
230        180    avpath(n,0)=float(n)/float(np)     !new path
           C Weight accumulated avg. UP by a factor of (NP-1) compared to new single path.
231               do 185 n=0,1
232        185    call lut(fcb,avpath(0,n),4,2**n,0,0)    !make RED = updated average.
233               call ltcnt(fcb,3,4,0,0)
234               call fdbck(fcb,4,2,-1,1,0,0,0)
235               CALL LUT(FCB,LUTLIN,4,3,0,0) !for examination, linear; later restore RAT
236               call ltcnt(fcb,2,4,0,0)
237               type 59,7,np,np
238               ipushd=0
239               iwait=0
240        190    call waitic(2)
241               iwait=iwait+1
242               if(ipushd.eq.0.and.iwait.gt.30) go to 195  !so prog can run several
           C                                                 ! paths on its own.
243               call rbutn(fcb,ibut,ix,iy)
244               if(ibut.ne.1.and.ibut.ne.2.and.ibut.ne.4.and.ibut.ne.8) go to 190
245               if(ibut.eq.8) go to 195
246               call ltcnt(fcb,ibut,4,0,0)
247               ipushd=1          !Once you make a request, must push D to go on.
248               go to 190
249        195    call rbutn(fcb,icbut,ix,iy)        !Clear button
250               call dazz('2,1,,eye.tem;1')
251               if(np.eq.npaths) go to 200
```

```
252            call ltcnt(fcb,1,4,0,0)
253            call lut(fcb,lutrat,4,2,0,0)  !ratios from chan 1 to Red enabled, AGAIN!
254     200    continue
C*******************
255            IF(NHI.LE.1) GO TO 500
256            call ltcnt(fcb,2,4,0,0)
257            call fdbck(fcb,4,1,-1,1,0,0,0) !Feed red (avg. at this level)
       C                                      to channel 0 for next level
258            call ltcnt(fcb,1,4,0,0)
259            call lut(fcb,lutrat,4,2,0,0)  !ratios from chan 1=> Red enabled, AGAIN!
260     500    continue
C******************************
261            if(fulimg.ne.1) go to 1000     !skip storing of results.
262            namout(3)='+'
263            if(iband.gt.0) namout(3)='-'  !NOTE: a red record is written to NEW
       C                                     file; other records augment or update an OLD file.
264            namout(7)=iband+'0'
265            call dazz(namout)
266    1000    continue
C*************************************
267            type *,'Time elapsed=',secnds(time0),'seconds.'
268     9      FORMAT(16I5)
269     19     FORMAT(80A1)
270     39     FORMAT (4I5,f7.2)
271     49     FORMAT ('+TOTX,TOTY=',2I5,' hop #',I5)
272     59     format (1x,a1,'Path',I3,' done: button A=last, B=avg. of',I3,
              1' C=original, D=GO ON!',/)
273     69     format (10f8.2)
274     79     format (' Function is C + D/nhop +E*(nhop/',I3,'), nhop varying
              1 from 1 to',I3,' on each path.')
275     99     format (80a1)
276     509    format (1x,a1,' <return> to process:',26a1,':or enter IDISK,
              1 input-file.')
277            END
```

PROGRAM SECTIONS

| NUMBER | NAME | SIZE | | ATTRIBUTES |
|---|---|---|---|---|
| 1 | $CODE1 | 010734 | 2286 | RW,I,CON,LCL |
| 2 | $PDATA | 001076 | 287 | RW,D,CON,LCL |
| 3 | $IDATA | 001660 | 472 | RW,D,CON,LCL |
| 4 | $VARS | 016220 | 3696 | RW,D,CON,LCL |
| 5 | $TEMPS | 000010 | 4 | RW,D,CON,LCL |

STATEMENT FUNCTIONS

| NAME | TYPE | ADDRESS |
|---|---|---|
| OLDP | R*4 | 1-010678 |

VARIABLES

| NAME | TYPE | ADDRESS | NAME | TYPE | ADDRESS | NAME | TYPE | ADDRESS | NAME | TYPE | ADDRESS | NAME | TYPE | ADDRESS |
|---|---|---|---|---|---|---|---|---|---|---|---|---|---|---|
| AHEAD | R*4 | 4-016136 | C | R*4 | 4-016032 | CFALSE | I*2 | 4-011106 | D | R*4 | 4-016038 | E | R*4 | 4-016042 |
| EVER | L*1 | 4-015575 | FULIMG | I*2 | 4-011110 | I | I*2 | 4-016106 | IBAND | I*2 | 4-016126 | IBUT | I*2 | 4-016156 |
| IC | I*2 | 4-016212 | ICBUT | I*2 | 4-016046 | ICX | I*2 | 4-016050 | ICY | I*2 | 4-016052 | IDEL | I*2 | 4-016164 |
| IFAR | I*2 | 4-016134 | IFROM | I*2 | 4-016174 | IHI | I*2 | 4-016130 | IHOP | I*2 | F-000002# | INPUT | I*2 | 4-016072 |
| INTEPS | I*2 | 4-016066 | IPATH | I*2 | 4-015573 | IPUSHD | I*2 | 4-016214 | IPX | I*2 | 4-016204 | IR1 | I*2 | 4-016062 |
| IR2 | I*2 | 4-016064 | ISLOW | L*1 | 4-015572 | ITO | I*2 | 4-016176 | ITOT | I*2 | F-000010# | ITYP | I*2 | 4-016074 |
| IWAIT | I*2 | 4-016216 | IX | I*2 | 4-016152 | IY | I*2 | 4-016154 | J | I*2 | 4-016070 | JUMPSZ | I*2 | 4-016132 |
| L | I*2 | 4-016120 | LASTGO | I*2 | 4-016144 | MAXCH | I*2 | 4-016102 | MFROZE | I*2 | 4-016160 | MINCH | I*2 | 4-016100 |
| MNBAND | I*2 | 4-016114 | MORE | L*1 | 4-015570 | MOVE | I*2 | 4-016162 | MOVED | I*2 | 4-016172 | MOVX | I*2 | 4-016166 |
| MOVY | I*2 | 4-016170 | MX | I*2 | 4-016202 | MXBAND | I*2 | 4-016116 | MY | I*2 | 4-016200 | N | I*2 | 4-016054 |
| NMLET | I*2 | 4-016104 | NEEDCR | I*2 | 4-015150 | NHI | I*2 | 4-016076 | NHOP | I*2 | 4-016146 | NP | I*2 | 4-016142 |
| NPATHS | I*2 | 4-016112 | NUM | I*2 | 4-016110 | OH | R*4 | 4-016206 | OK | L*1 | 4-015571 | ONWARD | L*1 | 4-015574 |
| RANDOM | I*2 | 4-011104 | RANDY | R*4 | 4-016056 | TEMP | I*2 | 4-013542 | TIME0 | R*4 | 4-016122 | TOTX | I*2 | 4-011040 |
| TOTY | I*2 | 4-011042 | VRTC | I*2 | 4-013560 | | | | | | | | | |

ARRAYS

| NAME | TYPE | ADDRESS | SIZE | | DIMENSIONS |
|---|---|---|---|---|---|
| AHA | R*4 | 4-011612 | 000100 | 32 | (16) |
| ALPATH | I*2 | 4-000000 | 002000 | 512 | (0:255,0:1) |
| BASIS | L*1 | 4-015572 | 000036 | 15 | (30) |
| BUFF | I*2 | 4-000000 | 010000 | 2048 | (2048) |
| CHI | R*4 | 4-011312 | 000100 | 32 | (16) |
| CO | R*4 | 4-012532 | 000010 | 4 | (0:1) |
| COMFIL | L*1 | 4-015634 | 000036 | 15 | (30) |
| DHI | R*4 | 4-011412 | 000100 | 32 | (16) |
| EHI | R*4 | 4-011512 | 000100 | 32 | (16) |
| FCB | I*2 | 4-013544 | 000014 | 6 | (6) |
| ICHAN | I*2 | 4-013562 | 000006 | 3 | (3) |
| IDIRX | I*2 | 4-010000 | 000020 | 8 | (0:7) |
| IDIRY | I*2 | 4-010020 | 000020 | 8 | (0:7) |
| IEP | I*2 | 4-011212 | 000040 | 16 | (16) |
| INDIRX | I*2 | 4-011044 | 000020 | 8 | (0:7) |

```
INDIRY I*2   4-011064  000020    8    (0:7)
JCX    I*2   4-011712  000310   100   (100)
JCY    I*2   4-012222  000310   100   (100)
JUM    I*2   4-011112  000040    16   (16)
LUTLIN I*2   4-012542  001000   256   (256)
LUTNEG I*2   4-004000  001000   256   (256)
LUTRAT I*2   4-010040  001000   256   (256)
NAME   L*1   4-015576  000036    15   (30)
NMOUT  L*1   4-015706  000044    18   (36)
NO     I*2   4-011152  000040    16   (16)
NPA    I*2   4-011252  000040    16   (16)
SCRACH I*2   4-013570  002000   512   (0:255,0:1)
TNAME  L*1   4-015730  000036    15   (30)
```

LABELS

| LABEL | ADDRESS | LABEL | ADDRESS | LABEL | ADDRESS | LABEL | ADDRESS | LABEL | ADDRESS |
|---|---|---|---|---|---|---|---|---|---|
| 3 | ** | 4 | ** | 5 | ** | 6 | ** | 7 | 1-004724 |
| 8 | 1-004540 | 9' | 3-000000 | 10 | 1-005462 | 11 | 1-005536 | 12 | 1-005666 |
| 15 | 1-005126 | 16 | 1-005156 | 17 | 1-005260 | 19' | 3-000064 | 20 | ** |
| 30 | ** | 31 | ** | 33 | 1-006674 | 34 | ** | 35 | ** |
| 36 | ** | 39' | 3-000018 | 49' | 3-000020 | 59' | 3-000054 | 69' | 3-000164 |
| 79' | 3-000172 | 99' | 3-000316 | 100 | ** | 150 | 1-004374 | 180 | ** |
| 185 | ** | 190 | 1-010006 | 195 | 1-010200 | 200 | 1-010276 | 300 | ** |
| 350 | 1-002020 | 360 | ** | 400 | 1-002272 | 434 | ** | 435 | 1-007264 |
| 490 | ** | 495 | 1-002624 | 496 | ** | 500 | 1-010420 | 509' | 3-000322 |
| 1000 | 1-010550 | 1030 | 1-006370 | 1035 | 1-006412 | 2200 | ** | 2300 | 1-001266 |
| 2400 | 1-002666 | 2410 | ** | 2411 | 1-003102 | 2415 | 1-003144 | 2420 | ** |
| 2500 | 1-003230 | | | | | | | | |

FUNCTIONS AND SUBROUTINES REFERENCED

```
CLOS$  CONST  DATA   DAZZ   DEMO   EXIT   FDBCK  FEEDM2 FREEZE IFM    IMAGE  JFMOD  LTCNT  LUT    MARK1  NORMAL
OFM    ONES   OPEN$  RAN    RBUTN  SCROL  SECNDS WAITIC $MAX0
```

TOTAL SPACE ALLOCATED = 032142  6705

,DP1:[1,55]EYEFLY/NOSP/LI:6=DP1:[1,55]EYEFLY
SUBROUTINE CONST (FCB, CONB, CONG, CONR, VRTRTC, READ)

SUBROUTINE READS OR WRITES THE CONSTANT REGISTER.

INTEGER FCB(1), CONB, CONG, CONR, VRTRTC, READ

CONB - THE ADDITIVE CONSTANT USED BY THE BLUE SUM PROCESSOR
CONG - THE ADDITIVE CONSTANT USED BY THE GREEN SUM PROCESSOR
CONR - THE ADDITIVE CONSTANT USED BY THE RED SUM PROCESSOR
READ - 0 IMPLIES WRITE, 1 IMPLIES READ.

SUBROUTINE FDBCK (FCB, COLOR, CHANL, BITP, BYPIFM,
1                 PIXOFF, EXTERN, ZERO)

INTEGER FCB(1), COLOR, CHANL, BITP, BYPIFM, PIXOFF
INTEGER EXTERN, ZERO, VRTRTC

SUBROUTINE TO READ AND WRITE THE FEEDBACK LOOP CONTROL WORD

FCB     - AN INTEGER ARRAY USED FOR SYSTEM DEPENDENT INFORMATION
COLOR   - COLOR SELECT WORD
          4 => RED, 2 => GREEN, 1 => BLUE
CHANL   - A BIT MAP SELECTING THE CHANNEL FOR THE DESTINATION
          1 => IMAGE 0
          2 => IMAGE 1
          4 => IMAGE 2
              *
              *
          16384 => IMAGE 14
          -32768 => IMAGE 15 (GRAPHICS)

BITP    - A BIT MAP SELECTING THE BIT PLANES TO READ/WRITE
          NORMALLY -1, I.E. ALL BITS. THE EXCEPTION TO THIS
          RULE IS WHEN WRITING IN THE GRAPHICS CHANNEL.
BYPIFM  - 0 IMPLIES USE IFM, 1 IMPLIES BYPASS IFM.
PIXOFF  - PIXEL OFFSET, 0 <= N <= 7.
EXTERN  - 1 IMPLIES EXTERNAL INPUT, I.E. DIGITIZER
ZERO    - 0 => NORMAL; 1 => FEED BACK ALL 0'S
          (USEFUL FOR BLANKING THE DESTINATION CHAN.)

SUBROUTINE IFM (FCB, MAP, START, COUNT, PACK, VRTRTC, READ)

SUBROUTINE TO READ OR WRITE A SECTION OF THE INPUT FUNCTION MEMORY (IFM).

INTEGER FCB(1), MAP(1), START, COUNT, PACK, VRTRTC, READ
INTEGER BITS(16), PBITS

MAP    - A 'COUNT' WORD ARRAY TO RECEIVE/CONTAIN THE IFM CONTENTS
START  - THE POSITION (ZERO REL) IN THE IFM WHERE THE
         TRANSFER IS TO START

```
COUNT   - THE NUMBER OF IFM ELEMENTS TO TRANSFER
READ    - 0 IMPLIES WRITE, 1 IMPLIES READ.
PACK    - 1 IMPLIES PACKED MODE TRANSFER
SUBROUTINE IMAGE (FCB, PIXELS,
1                 XINIT, YINIT, NPIXEL, DIRECT,
2                 CHANNL, PLANES,
3                 PACKED, BYPIFM, BYTE, ADDWRT, BURST,
4                 VRTRTC, READ)

SUBROUTINE READS OR WRITES IMAGE DATA.

INTEGER FCB(1), PIXELS(1), XINIT, YINIT, NPIXEL, DIRECT
INTEGER COUNT, CHANNL, PLANES
INTEGER PACKED, BYPIFM, BYTE, ADDWRT, VIDORD, BURST, VRTRTC, READ

PIXELS - AN INTEGER ARRAY TO RECEIVE/CONTAIN THE IMAGE DATA
XINIT  - THE X-COORDINATE OF THE FIRST PIXEL TRANSFERED (0 REL)
YINIT  - THE Y COORDINATE OF THE FIRST PIXEL TRANSFERED (0 REL)
NPIXEL - THE TOTAL NUMBER OF PIXELS TO TRANSFER
DIRECT - 0 IMPLIES READ/WRITE PROCEEDING TO THE RIGHT,
         1 IMPLIES READ/WRITE PROCEEDING DOWNWARD
CHANNL - A BIT MAP SELECTING THE CHANNEL(S) TO READ/WRITE:
             1 -> IMAGE 0
             2 -> IMAGE 1
             4 -> IMAGE 2
             ETC.
         16384 -> IMAGE 14
        -32768 -> IMAGE 15 (GRAPHICS)
             WHEN WRITING ONLY, THESE CODES MAY BE COMBINED
             TO WRITE THE SAME DATA INTO TWO OR MORE CHANNELS.
             FOR EXAMPLE, CHANNL = -32758 WOULD MEAN CHANNELS
             1, 3, & 15.
PLANES - A BIT MAP SELECTING THE BIT PLANES TO READ/WRITE,
         NORMALLY -1, IE. ALL BITS. THE EXCEPTION TO THIS
         RULE IS WHEN WRITING IN THE GRAPHICS CHANNEL.
PACKED - 0 IMPLIES 1 BYTE/WORD, 1 IMPLIES 2 BYTES/WORD
BYPIFM - 0 IMPILES USE IFM, 1 IMPLIES BYPASS IFM
BYTE   - 0 IMPLIES NORMAL, 1 IMPLIES 8 PIXELS/BYTE,
         I.E., BINARY DATA.
         ** NOTE - XINIT MUST BE A MULTIPLE OF 8
ADDWRT - 0 IMPLIES NORMAL, 1 IMPLIES THAT THE DATA IN
         MEMORY(S) IS OR'ED TO THE DATA PRESENTED FROM
         THE COMPUTER AND THE RESULT IS STORED IN THE MEMORY(S).
         ** NOTE - USED WHEN WRITING ONLY!!
BURST  - 0 IMPLIES NORMAL TRANSFER, 1 IMPLIES BURST (FAST) XFER.
         ** NOTE BYTE=1 MUST BE SPECIFIED.
VRTRTC - 0 IMPLIES WRITE ANYTIME,
         1 IMPLIES WRITE DURING VERTICAL RETRACE ONLY.
READ   - 0 IMPLIES WRITE, 1 IMPLIES READ.
SUBROUTINE OFM (FCB, MAP, COLOR, VRTRTC, READ)

SUBROUTINE TO READ/WRITE AN ENTIRE OUTPUT FUNCTION MEMORY (OFM)

INTEGER FCB(1), MAP(1024), COLOR, VRTRTC, READ

MAP    - A 1024 WORD ARRAY TO RECEIVE/CONTAIN THE OFM CONTENTS
COLOR  - A CODE INDICATING WHICH OFM TO READ/WRITE:
    1 -> BLUE
    2 -> GREEN
    4 -> RED
         WHEN WRITING ONLY, THESE CODES MAY BE
         COMBINED TO WRITE THE SAME DATA INTO TWO
         OR THREE OFM'S. FOR EXAMPLE, COLOR=5 WOULD
         WRITE BOTH THE BLUE AND RED OFM'S.
READ   - 0 IMPLIES WRITE, 1 IMPLIES READ.

SUBROUTINE SCROL (FCB, SCROLX, SCROLY, CHANNL, VRTRTC, READ)

SUBROUTINE READS OR WRITES A SCROLL CONTROL REGISTER.

INTEGER FCB(1), SCROLX, SCROLY, CHANNL, VRTRTC, READ

SCROLX - AN INTEGER SPECIFYING THE SCROLLING OFFSET
         IN THE X (HORIZONTAL) DIRECTION
         (NOTE THAT ONLY HORIZ. SCROLLS IN INCREMENTS OF
          8 PIXELS ARE POSSIBLE- THE 3 LEAST SIG. BITS
          OF SCROLX ARE IGNORED)

SCROLY - AN INTEGER SPECIFYING THE SCROLLING OFFSET
         IN THE Y (VERTICAL) DIRECTION

CHANNL - A BIT MAP SELECTING THE CHANNEL(S) TO READ/WRITE:
             1 -> IMAGE 0
             2 -> IMAGE 1
             4 -> IMAGE 2
             ETC
```

```
               16384 -> IMAGE 14
              -32768 -> IMAGE 15 (GRAPHICS)
                    WHEN WRITING ONLY, THESE CODES MAY BE COMBINED
                    TO WRITE THE SAME DATA INTO TWO OR MORE CHANNELS.
                    FOR EXAMPLE, CHANNL = -32758 WOULD MEAN CHANNELS
                    1, 3, & 15
READ     - 0 IMPLIES WRITE, 1 IMPLIES READ.

SUBROUTINE RBUTN (FCB, BUTTON, X, Y)

ROUTINE TO READ BUTTON WORD AND
CURSOR POSITION
SUBROUTINE LTCNT (FCB, MASK, COLOR, VRTRTC, READ)

SUBROUTINE TO READ OR WRITE THE LUT MASK(S)

INTEGER FCB(1), MASK, COLOR, VRTRTC, READ

MASK     - AN INTEGER WHOSE BIT MAP DETERMINES
              WHICH LOOK UP TABLES ARE ENABLED AND DISABLED
              LSB = 1  ==> ENABLE 0TH MEMORY
              ...ETC.

COLOR    - A CODE INDICATING WHICH LUT MASK TO READ/WRITE:
              1 - BLUE
              2 - GREEN
              4 - RED
              7 - RED+GREEN+BLUE

READ     - 0 IMPLIES WRITE, 1 IMPLIES READ

SUBROUTINE LUT (FCB, MAP, COLOR, CHANNL, VRTRTC, READ)

SUBROUTINE TO READ/WRITE AN ENTIRE LOOK-UP TABLE (LUT)

INTEGER FCB(1), MAP(256), COLOR, CHANNL, VRTRTC, READ

MAP      - A 256 WORD ARRAY TO RECEIVE/CONTAIN THE LUT CONTENTS
COLOR    - A CODE INDICATING WHICH LUT TO READ/WRITE:
     1 -> BLUE
     2 -> GREEN
     4 -> RED
             WHEN WRITING ONLY, THESE CODES MAY BE
             COMBINED TO WRITE THE SAME DATA INTO TWO
             OR THREE LUT'S. FOR EXAMPLE, COLOR=5 WOULD
             WRITE BOTH THE BLUE AND RED LUT'S.
CHANNL   - A BIT MAP SELECTING THE CHANNEL(S) TO READ/WRITE:
              1 -> IMAGE 0
              2 -> IMAGE 1
              4 -> IMAGE 2
              ETC
          16384 -> IMAGE 14
         -32768 -> IMAGE 15 (GRAPHICS)
                WHEN WRITING ONLY, THESE CODES MAY BE COMBINED
                TO WRITE THE SAME DATA INTO TWO OR MORE CHANNELS.
                FOR EXAMPLE, CHANNL = -32758 WOULD MEAN CHANNELS
                1, 3, & 15.
READ     - 0 IMPLIES WRITE, 1 IMPLIES READ.
```

```
FORTRAN IV-PLUS V02-51        12:42:19     20-AUG-80              PAGE 1
MARK1.FTN       /TR:ALL/WR 0001         subroutine mark1(buff,numlin,line1,new1,ichan,idir,IDEST)
       C           MARK1 is a special-purpose, un-general subroutine to
       C     mark a 512-by-NUMLIN section of image in two channels.
       C     VARIABLES:
       C     buff-   scratch buffer of 1024 integers needed by subroutine.
       C     line1-  is the 1st row or column
       C     new1-   is the new 1st row or column
       C     ichan-  is the relevant (SOURCE) channel mask
       C     idir-   is 0 for rows, 1 for columns
       C     Idest-  destination channel mask; if missing or 0, defaults to =ICHAN.
       c             DEGENERATE CASE: IF JDEST=ICHAN and NEW1=LINE1, then only
       C             one set of ones is drawn in, to save a bit of time :4/4/80
0002         integer fcb(6),xi(0:1),xo(0:1),byte
0003         integer buff(1024)
0004         call argchk(7,iact)
0005         do 1 n=1,1024
0006    1    int(n)=-1
0007         byte=1
0008         jdir=idir
0009         jdest=idest
0010         if(jdir lt 0.or. jdir.gt.1) jdir=0
0011         if(mod(numlin,8).ne.0) byte=0  !in this application, this condition
       c             is sufficient to avoid INITX non-multiple of 8!
0012         if(jdest eq 0) jdest=ichan
0013         npass=(numlin+31)/32
0014         last=mod(numlin,32)
0015         if(last eq 0) last=32
0016         do 5 n=0,1
0017         xo(n)=0
0018    5    xi(n)=0
```

```
0019            IGO=1
0020            IEND=NPASS
0021            INC=1
0022            if(linel.gt.newl) go to 20
0023            igo=npass
0024            iend=1
0025            inc=-1    !Must flip order to avoid early over-writes of parts perhaps
          C               !needed in later chunks.
0026    20      do 30 i=igo,iend,inc
0027            num=32
0028            if(i.eq.npass) num=last
0029            xi(1-jdir)=linel+(i-1)*32
0030            xo(1-jdir)=newl+(i-1)*32
0031            call image(fcb,buff,xi(0),xi(1),512*NUM,jdir,ichan,1,1,1,byte,0,0,0,0)
0032            if(jdest.ne.ichan.or.newl.ne.linel) call image
               1 (fcb,buff,xo(0),xo(1),512*NUM,jdir,jdest,1,1,1,byte,0,0,0,0)
0033    30      continue
0034            return
0035            end
```

FORTRAN IV-PLUS V02-51         12:42:19    20-AUG-80            PAGE 2
MARK1.FTN       /TR:ALL/WR

PROGRAM SECTIONS

| NUMBER | NAME    | SIZE         | ATTRIBUTES     |
|--------|---------|--------------|----------------|
| 1      | $CODE1  | 001062   281 | RW,I,CON,LCL   |
| 2      | $PDATA  | 000014     6 | RW,D,CON,LCL   |
| 3      | $IDATA  | 000120    40 | RW,D,CON,LCL   |
| 4      | $VARS   | 000054    22 | RW,D,CON,LCL   |
| 5      | $TEMPS  | 000004     2 | RW,D,CON,LCL   |

ENTRY POINTS

| NAME  | TYPE | ADDRESS  | NAME | TYPE | ADDRESS | NAME | TYPE | ADDRESS | NAME | TYPE | ADDRESS | NAME | TYPE | ADDRESS |
|-------|------|----------|------|------|---------|------|------|---------|------|------|---------|------|------|---------|
| MARK1 |      | 1-000000 |      |      |         |      |      |         |      |      |         |      |      |         |

VARIABLES

| NAME  | TYPE | ADDRESS    | NAME  | TYPE | ADDRESS   | NAME   | TYPE | ADDRESS    | NAME  | TYPE | ADDRESS    | NAME  | TYPE | ADDRESS    |
|-------|------|------------|-------|------|-----------|--------|------|------------|-------|------|------------|-------|------|------------|
| BYTE  | I*2  | 4-000024   | I     | I*2  | 4-000050  | IACT   | I*2  | 4-000026   | ICHAN | I*2  | F-000012*  | IDEST | I*2  | F-000016*  |
| IDIR  | I*2  | F-000014*  | IEND  | I*2  | 4-000044  | IGO    | I*2  | 4-000042   | INC   | I*2  | 4-000046   | JDEST | I*2  | 4-000034   |
| JDIR  | I*2  | 4-000032   | LAST  | I*2  | 4-000040  | LINE1  | I*2  | F-000006*  | N     | I*2  | 4-000030   | NEWL  | I*2  | F-000010*  |
| NPASS | I*2  | 4-000036   | NUM   | I*2  | 4-000052  | NUMLIN | I*2  | F-000004*  |       |      |            |       |      |            |

ARRAYS

| NAME | TYPE | ADDRESS   | SIZE          | DIMENSIONS |
|------|------|-----------|---------------|------------|
| BUFF | I*2  | F-000002* | 004000   1024 | (1024)     |
| FCB  | I*2  | 4-000000  | 000014      6 | (6)        |
| XI   | I*2  | 4-000014  | 000004      2 | (0:1)      |
| XO   | I*2  | 4-000020  | 000004      2 | (0:1)      |

LABELS

| LABEL | ADDRESS | LABEL | ADDRESS | LABEL | ADDRESS  | LABEL | ADDRESS | LABEL | ADDRESS |
|-------|---------|-------|---------|-------|----------|-------|---------|-------|---------|
| **    | 5       | **    | 20      |       | 1-000526 | 30    | **      |       |         |

FUNCTIONS AND SUBROUTINES REFERENCED

ARGCHK  IMAGE

TOTAL SPACE ALLOCATED = 001276    351

NO FPP INSTRUCTIONS GENERATED

DP1:MARK1,MARK1/NOSP=MARK1/LI:6
FORTRAN IV-PLUS V02-51         12:42:48    20-AUG-80            PAGE 1
FEEDM2.FTN      /TR:ALL/WR

```
0001            SUBROUTINE FEEDM2(buff,ICOLOR,IDEST,ITEMP,BYPIFM,IX,IY)
          C         FEEDM2 feeds color ICOLOR (R4,G2,B1) to channel IDEST, offsetting the
          C         image (WHATEVER its origin) by IX and IY. (MODIFIED 5/29/79 to work
          C         for ANY ix,iy by using IPXOFF in FDBCK for x-offsets not divisible
          C         by 8.)
          C             --to patch the single-pixel in x accuracy claimed 8 months ago,
          C             (-----IPXOFF in feedback leaves several black columns in the
          C                  leftmost seven of the destination, which can be
          C                  devastating; )
          C     FEEDM2 uses BUFF supplied to kluge in these few columns,
          C     with 2 calls to IMAGE. (1/8/80)
          C             The IIS scroll conventions apply to this call. That is,
          C         IX>0 scrolls an image to the LEFT, and IY>0 scrolls UPWARD. The
          C         operation would produce interesting but normally undesirable results
          C         if IDEST channel contributed to ICOLOR, because the scrolled ICOLOR
          C         image may be distorted during feedback to IDEST. To avoid such problems,
```

```
      C   channel ITEMP can be fed results to feed on to IDEST. Any
      C   case of a channel contributing to its "scrolled self" requires an ITEMP
      C   channel be available. If ITEMP is not needed, set it to -1.
      C   --For now, UN-SCROLLED CHANNELS ONLY can contribute to
      C     ICOLOR.  Generalizing would ascertain current scrolls from all
      C     contributing channels, and individually update and reset each one.
      C   BYPIFM is 0 to use or 1 to bypass the input function memory.
      C     Note (6/5/79) that any call to feed back a color to which the
      C     digitizer contributes must include an ITEMP channel, since the
      C     digitizer "channel" can not be scrolled --AND the original design
      C     of scrolling the destination inversely fails because it does NOT
      C     affect feedback!
      C   BUFF must be [8-jfmod(ix,8)]*512 bytes long, and start on a word boundary.
0002      INTEGER BYPIFM,FCB(6),CNTRIB
0003      integer buff(256)    !must NOT start on byte boundary.
0004      NUM1=ITEMP
0005      IF(NUM1.LT.0) NUM1=IDEST
0006      CALL LTCNT(FCB,CNTRIB,ICOLOR,0,1)
      d   type *,'cntrib=',cntrib
0007      jx=ix
0008      ipxoff=0
0009      m=mod(ix,8)
0010      if(m.eq.0) go to 20
0011      jx=(ix/8)*8
0012      if(jx.lt.ix) jx=jx+8   !FDBCK offset must be rightward (effectively<0)
0013      ipxoff=jx-ix
0014 20   if(itemp.lt.0) CALL SCROL(FCB,JX,IY,CNTRIB,0,0)
0015      CALL FDBCK(FCB,ICOLOR,2**NUM1,-1,BYPIFM,0,0,0)
0016      if(ipxoff.eq.0) go to 25  !no "correction" needed to fill in left edge.
0017      call image(fcb,buff,512-ipxoff,0,512*ipxoff,1,2**numl,-1,1,1,0,0,0,0,1)
0018      CALL FDBCK(FCB,ICOLOR,2**NUM1,-1,BYPIFM,ipxoff,0,0)
0019      call image(fcb,buff,0,0,512*ipxoff,1,2**numl,-1,1,1,0,0,0,0)
0020 25   if(itemp.ge.0) go to 30
0021      CALL SCROL(FCB,0,0,CNTRIB,0,0)
0022      go to 100
0023 30   DO 5 J=1,256
0024  5   buff(J)=J-1
0025      CALL LTCNT(FCB,MASK,2**(2-IDEST),0,1)  !Read current MASK for IDEST color
0026      CALL LUT(FCB,buff,2**(2-IDEST),2**ITEMP,0,0)  !Load linear LUT for FDBCK.
0027      CALL LTCNT(FCB,2**ITEMP,2**(2-IDEST),0,0)
0028      call scrol(fcb,jx,iy,2**itemp,0,0)
0029      CALL FDBCK(FCB,2**(2-IDEST),2**IDEST,-1,1,0,0,0)
0030      call scrol(fcb,0,0,2**itemp,0,0)
0031      CALL LTCNT(FCB,MASK,2**(2-IDEST),0,0)  !Restore color to previous state.
0032 100  RETURN
0033      END
```

FORTRAN IV-PLUS V02-51      12:42:48    28-AUG-89         PAGE 2
FEEDM2.FTN     /TR:ALL/WR

PROGRAM SECTIONS

| NUMBER | NAME | SIZE | | ATTRIBUTES |
|---|---|---|---|---|
| 1 | $CODE1 | 001442 | 401 | RW,I,CON,LCL |
| 2 | $PDATA | 000014 | 6 | RW,D,CON,LCL |
| 3 | $IDATA | 000366 | 123 | RW,D,CON,LCL |
| 4 | $VARS | 000032 | 13 | RW,D,CON,LCL |
| 5 | $TEMPS | 000002 | 1 | RW,D,CON,LCL |

ENTRY POINTS

| NAME | TYPE | ADDRESS |
|---|---|---|
| FEEDM2 | I-000000 | |

VARIABLES

| NAME | TYPE | ADDRESS | NAME | TYPE | ADDRESS | NAME | TYPE | ADDRESS | NAME | TYPE | ADDRESS | NAME | TYPE | ADDRESS |
|---|---|---|---|---|---|---|---|---|---|---|---|---|---|---|
| BYPIFM | I*2 | F-000012 | CNTRIB | I*2 | 4-000014 | ICOLOR | I*2 | F-000040 | IDEST | I*2 | F-000060 | IPXOFF | I*2 | 4-000022 |
| ITEMP | I*2 | F-000010 | IX | I*2 | F-000014 | IY | I*2 | F-000016 | J | I*2 | 4-000026 | JX | I*2 | 4-000020 |
| M | I*2 | 4-000024 | MASK | I*2 | 4-000030 | NUM1 | I*2 | 4-000016 | | | | | | |

ARRAYS

| NAME | TYPE | ADDRESS | SIZE | | DIMENSIONS |
|---|---|---|---|---|---|
| BUFF | I*2 | F-000020 | 001000 | 256 | (256) |
| FCB | I*2 | 4-000000 | 000014 | 6 | (6) |

LABELS

| LABEL | ADDRESS | LABEL | ADDRESS | LABEL | ADDRESS | LABEL | ADDRESS | LABEL | ADDRESS |
|---|---|---|---|---|---|---|---|---|---|
| 5 | ** | 20 | 1-000264 | 25 | 1-000632 | 30 | 1-000670 | 100 | 1-001440 |

FUNCTIONS AND SUBROUTINES REFERENCED

FDBCK   IMAGE   LTCNT   LUT   SCROL

```
TOTAL SPACE ALLOCATED = 002100  544

NO FPP INSTRUCTIONS GENERATED

DP1: FEEDM2,FEEDM2/NOSP=FEEDM2/LI:6

DAZZ        -takes a character string commanding a transfer of 512x512
             image separations between disk and refresh memory.
WAITIC      -waits specified number of 60ths of a second.
FREEZE      -pauses to allow examination of contents of specified channel.
EXIT        -end processing.
ONES        -fill an entire image plane or planes with ones.
DATA        -initialize an array with a given alphanumeric literal.
DEMO        -pause and wait several seconds; report back if there is
             input during that time.
NORMAL      -normalizes all functional tables in the system.
```

APPENDIX II

A preferred color masking stage 58 of FIG. 3 performs linear transformations of all three sets of processed-image information from the image processors 20, 22 and 24. A first operation calculates the average of the combined outputs from the three processors 20, 22 and 24. With most images this average has an approximately uniform distribution of values from (0) to (255).

A second operation, performed in parallel with the first, calculates the difference between the outputs of the information processors 20 and 22, which process the long wavelength image information and the middle wavelength information, respectively. The resultant color difference between the two outputs is represented on a scale of (0) to (255). At a given pixel, all colors with equal output from processors 20 and 22 will have a vlue of (128) on this scale. The difference value at most pixels in the image falls in the vicinity of this middle value, i.e. (128). Only the most saturated colors approach the extreme values of (0) to (255). In fact, if the color detecting system 14 has overlap in its spectral sensitivity functions it will cause the total range of difference values to be limited to values higher than (0) and lower than (255). Based on the range of difference values found in a variety of typical images, one can expand the limited range found in the particular hardware system to fill the range of potential color differences. This can be implemented by taking the range of values determined in taking the long wavelength minus middle wavelength difference, in this case at difference values from (80) to (175), and linearly expanding that distribution to values that range from (0) to (255).

A third operation of this color masking stage 58, performed in parallel with the first two, is the combination of half of the long-wavelength information from processor 20 plus half of the middle-wavelength information from processor 22, minus the short-wavelength information from processor 24. The resultant represents the color differences between two other color bands in the color space. As in the second operation, the characteristic range of values associated with the particular system can be linearly expanded to fill the range of potential color differences.

After this expansion of the color difference properties, the color masking stage recombines the expanded transformations of the image by computing inverse transforms of the original transforms. This produces a color-enhanced image that is sent to the exposure control stage 60.

The initial transformation and the color expansion described above are fully detailed by the following listing of a program termed ZOWIE and the data file it requires, termed ZOWIE.DAT. The listing and the data file are in the same language and for the same equipment as described for Appendix I.

$$\begin{bmatrix} 0.33 & 0.33 & 0.33 \\ 0.50 & -0.50 & 0.00 \\ -0.25 & -0.25 & 0.50 \end{bmatrix} \times \begin{matrix} R \\ G \\ B \end{matrix} = \begin{matrix} L \\ C1 - 127.5 \\ C2 - 127.5 \end{matrix}$$

After placing L, C1, and C2 into the three memories, ZOWIE then expands C1 and C2 by the amount specified in ZOWIE.DAT. The inverse transform proceeds in a similar manner.

Beginning with L, as is, and the two expanded color difference channels, each minus 127.5, the mathematical inverse of the above matrix is multiplicatively applied:

$$\begin{bmatrix} 1.00 & 1.00 & -0.67 \\ 1.00 & -1.00 & -0.67 \\ 1.00 & 0.00 & 1.33 \end{bmatrix}$$

In performing this second transformation, the only new requirement concerns results more extreme than the storage range (0) to (225), which can occur because of the expansion. Such values are replaced with the appropriate limit, i.e. either (0) or (255).

```
FORTRAN IV-PLUS  V02-51        10:41:00   14-AUG-80
ZOWIE.FTN        /TR:ALL/WR

0001            PROGRAM ZOWIE
0002            INTEGER FCB(6), BUFFER(0:1023)
0003            INTEGER BUFLUM(0:255), BUFRMG(0:255), BUFBMY(0:255)
0004            INTEGER LR,HIR,LOUT,HIOUT
0005            OPEN(UNIT=1, NAME='[111,4]ZOWIE.DAT',TYPE='OLD',READONLY)
0006     1000   FORMAT(2I5)
0007            READ(1,1000),LR,HIR,LOUT,HIOUT
0008            DO 13 I=0,LR
0009       13   BUFLUM(I)=LOUT
0010            DO 14 I=HIR,255
0011       14   BUFLUM(I)=HIOUT
0012            XINC=FLOAT(HIOUT-LOUT)/FLOAT(HIR-LR)
0013            DO 15 I=LR,HIR
0014       15   BUFLUM(I)=NINT(FLOAT(LOUT)+FLOAT(I-LR)*XINC)
0015            READ(1,1000),LR,HIR,LOUT,HIOUT
0016            DO 213 I=0,LR
```

```
0017        213    BUFRMG(I)=LOUT
0018               DO 214 I=HIR,255
0019        214    BUFRMG(I)=HIOUT
0020               XINC=FLOAT(HIOUT-LOUT)/FLOAT(HIR-LR)
0021               DO 215 I=LR,HIR
0022        215    BUFRMG(I)=NINT(FLOAT(LOUT)+FLOAT(I-LR)*XINC)
0023               READ(1,1000),LR,HIR,LOUT,HIOUT
0024               DO 313 I=0,LR
0025        313    BUFBMY(I)=LOUT
0026               DO 314 I=HIR,255
0027        314    BUFBMY(I)=HIOUT
0028               XINC=FLOAT(HIOUT-LOUT)/FLOAT(HIR-LR)
0029               DO 315 I=LR,HIR
0030        315    BUFBMY(I)=NINT(FLOAT(LOUT)+FLOAT(I-LR)*XINC)
            C
            C
            C      TRANSFORM IMAGE TO LUMINANCE-CHROMINANCE-CHROMINANCE SPACE
            C
            C
0031               CALL NORMAL(FCB,BUFFER,3,0)
0032               CALL LTCNT(FCB,7,7,0,0)
            C
            C      THIS PROGRAM SHOULD TAKE AN IMAGE IN REFRESH WITH RED (R),
            C      GREEN (G), AND BLUE (B) SEPARATIONS IN CHANNELS 0,1,2, RESPECTIVELY,
            C      AND REPLACE IT BY A NEW IMAGE IN WHICH CHANNEL 0 WILL CONTAIN
            C      "LUMINANCE" (L), DEFINED AS :
            C
            C             L= (1/3)*(R+G+B)
            C
            C      CHANNEL 1 WILL CONTAIN THE COLOR DIFFERENCE RED MINUS GREEN
            C      SCALED TO THE RANGE 0 TO 255:
            C
            C             C1=(1/2)*(255+R-G)
            C
            C      CHANNEL 2 WILL CONTAIN THE COLOR DIFFERENCE BLUE MINUS YELLOW
            C      SCALED TO THE RANGE 0 TO 255:
            C
            C             C2=(1/4)*(510+2B-(R+G))
            C
            C
            C      THE PROCEDURE WILL NOT REQUIRE ANY MOVING OR STORING OF IMAGES, JUST
            C      USE OF LOOK UP TABLES, CONSTANT REGISTER, IFM, AND FEEDBACK.
            C
            C------------------------------------------------------------
            C
            C
            C      STEP 1.  REPLACE CHANNEL 0 BY L
            C
0033               DO 10 I=0,255
0034         10    BUFFER(I)=I
0035               CALL LUT(FCB,BUFFER,4,7,0,0)
0036               DO 20 I=0,765
0037         20    BUFFER(I)=NINT(FLOAT(I)/3.)
0038               CALL IFM(FCB,BUFFER,0,766,0,0,0)
0039               CALL FDBCK(FCB,4,1,255,0,0,0,0)
            C
            C------------------------------------------------------------
            C
            C      STEP 2.  REPLACE CHANNEL 1 BY C1
            C
            C NOTE: SINCE CHANNEL 0 HAS BEEN REPLACED BY L, WE USE A DIFFERENT FORMULA
            C       FOR COMPUTING C1:
            C
            C       C1=(1/2)*(255+3L-2G-B)
            C
            C NOTE: THE LOOK UP TABLE FOR THE IMAGE WITH THE MAXIMUM SCALED RANGE
            C       (NAMELY [3/2]*L) WILL BE SCALED TO USE AS MUCH OF ITS RANGE AS
            C       POSSIBLE.  THE OTHER TABLES WILL BE SCALED APPROPRIATELY.  THE
            C       MULTIPLICATIVE SCALE FACTOR MUST, OF COURSE, BE THE SAME FOR ALL
            C       THREE LOOK UP TABLES.  THE VARIOUS ADDITIVE OFFSETS (USED TO MAKE
            C       THE LOWEST OUTPUT BE MAPPED TO THE BEGINNING OF THE LOOK UP TABLE
            C       OUTPUT, -256) WILL BE COMPENSATED FOR WITH THE CONSTANT REGISTER.
            C       THIS REGISTER WILL ALSO BE USED TO HANDLE THE 255 OVERALL ADDITIVE
            C       CONSTANT.  THE WHOLE THING WILL THEN BE FED BACK TO THE 0 TO 255
            C       RANGE OF REFRESH THROUGH THE INPUT FUNCTION MEMORY (IFM).
            C
            C NOTE: ANALOGOUSLY FOR C2.
            C
            C------------------------------------------------------------
            C
            C      IN LINE WITH THE ABOVE, WE REWRITE THE FORMULA FOR C1:
            C
            C      C1=(3/4)*(2L+(-4/3)G+(-2/3)B+170)
            C
0040               DO 30 I=0,255
0041         30    BUFFER(I) = 2*I - 256
0042               CALL LUT(FCB,BUFFER,2,1,0,0)
```

```
0043            DO 40 I=0,255
0044       40   BUFFER(I)=NINT(-4.*FLOAT(I)/3.) + 84
0045            CALL LUT(FCB,BUFFER,2,2,0,0)
0046            DO 50 I=0,255
0047       50   BUFFER(I)=NINT(-2.*FLOAT(I)/3.) - 86
0048            CALL LUT(FCB,BUFFER,2,4,0,0)
0049            CALL CONST(FCB,0,428,0,0,0)
0050            DO 60 I=0,340
0051       60   BUFFER(I)=NINT(3.*FLOAT(I)/4.)
0052            CALL IFM(FCB,BUFFER,0,341,0,0,0)
0053            CALL FDBCK(FCB,2,2,255,0,0,0,0)
      C
      C--------------------------------------------------
      C
      C       STEP 3.  REPLACE CHANNEL 2 BY C2
      C
      C       AS FOR C1, ABOVE, WE MUST REWRITE FORMULA FOR C2 USING THE QUANTITIES
      C       THAT STILL EXIST IN REFRESH:  L, C1, B.  (C1 IS NOT REQUIRED HERE.)
      C
      C       C2=(3/4)*(170+B-L)
      C
      C
      C
0054            DO 70 I=0,255
0055       70   BUFFER(I)=I
0056            CALL LUT(FCB,BUFFER,1,4,0,0)
0057            DO 80 I=0,255
0058       80   BUFFER(I)=-I
0059            CALL LUT(FCB,BUFFER,1,1,0,0)
0060            CALL LTCNT(FCB,5,1,0,0)
0061            CALL CONST(FCB,170,0,0,0,0)
0062            DO 90 I=0,340
0063       90   BUFFER(I)=NINT(3.*FLOAT(I)/4.)
0064            CALL IFM(FCB,BUFFER,0,341,0,0,0)
0065            CALL FDBCK(FCB,1,4,255,0,0,0,0)
0066            CALL NORMAL(FCB,BUFFER,3,0)
      C
      C--------------------------------------------------
      C
      C           NOW CHANGE SLOPE OF LUMINANCE CHANNEL
      C
0067            CALL LUT(FCB,BUFLUM,4,1,0,0)
0068            CALL FDBCK(FCB,4,1,255,1,0,0,0)
0069            CALL LUT(FCB,BUFRMG,2,2,0,0)
0070            CALL FDBCK(FCB,2,2,255,1,0,0,0)
0071            CALL LUT(FCB,BUFBMY,1,4,0,0)
0072            CALL FDBCK(FCB,1,4,255,1,0,0,0)
0073            STOP 'ZOWIE'
0074            END
```

ZOWIE.DAT file that specifies magnitude of color masking transformatio
(for program ZOWIE)

|   |     |                      |     |              |       |
|---|-----|----------------------|-----|--------------|-------|
| 0 | 255 | LUMINANCE CHANNEL    | IN  | (LOW, HIGH)  | (2I5) |
| 0 | 255 |                      | OUT | (LOW, HIGH)  | (2I5) |
| 80| 175 | RED-GREEN CHANNEL    | IN  | (LOW, HIGH)  | (2I5) |
| 0 | 255 |                      | OUT | (LOW, HIGH)  | (2I5) |
| 80| 175 | BLUE-YELLOW CHANNEL  | IN  | (LOW, HIGH)  | (2I5) |
| 0 | 255 |                      | OUT | (LOW, HIGH)  | (2I5) |

FORTRAN IV-PLUS V02-51      10:41:00    14-AUG-80
ZOWIE.FTN       /TR:ALL/WR

PROGRAM SECTIONS

| NUMBER | NAME    | SIZE   |      | ATTRIBUTES    |
|--------|---------|--------|------|---------------|
| 1      | $CODE1  | 003030 | 780  | RW,I,CON,LCL  |
| 2      | $PDATA  | 000110 | 36   | RW,D,CON,LCL  |
| 3      | $IDATA  | 000542 | 177  | RW,D,CON,LCL  |
| 4      | $VARS   | 007032 | 1805 | RW,D,CON,LCL  |
| 5      | $TEMPS  | 000004 | 2    | RW,D,CON,LCL  |

VARIABLES

| NAME  | TYPE | ADDRESS  | NAME | TYPE | ADDRESS  | NAME | TYPE | ADDRESS  | NAME | TYPE | ADDRE: |
|-------|------|----------|------|------|----------|------|------|----------|------|------|--------|
| HIOUT | I*2  | 4-007022 | HIR  | I*2  | 4-007016 | I    | I*2  | 4-007024 | LOUT | I*2  | 4-007! |
| LR    | I*2  | 4-007014 | XINC | R*4  | 4-007026 |      |      |          |      |      |        |

ARRAYS

| NAME   | TYPE | ADDRESS  | SIZE   |      | DIMENSIONS |
|--------|------|----------|--------|------|------------|
| BUFBMY | I*2  | 4-006014 | 001000 | 256  | (0:255)    |
| BUFFER | I*2  | 4-000014 | 004000 | 1024 | (0:1023)   |
| BUFLUM | I*2  | 4-004014 | 001000 | 256  | (0:255)    |
| BUFRMG | I*2  | 4-005014 | 001000 | 256  | (0:255)    |
| FCB    | I*2  | 4-000000 | 000014 | 6    | (6)        |

LABELS

| LABEL | ADDRESS | LABEL | ADDRESS | LABEL | ADDRESS | LABEL | ADDRESS |
|---|---|---|---|---|---|---|---|
| 10 | ** | 13 | ** | 14 | ** | 15 | ** |
| 20 | ** | 30 | ** | 40 | ** | 50 | ** |
| 60 | ** | 70 | ** | 80 | ** | 90 | ** |
| 213 | ** | 214 | ** | 215 | ** | 313 | ** |
| 314 | ** | 315 | ** | 1000' | 3-000000 | | |

FUNCTIONS AND SUBROUTINES REFERENCED

CONST   FDBCK   IFM   LTCNT   LUT   NORMAL   OPEN$   $NINT

TOTAL SPACE ALLOCATED = 012740  2800

,ZOWIE/NOSP=ZOWIE/LI:6

APPENDIX III

A preferred exposure control stage 60 of FIG. 3 uses the output from the color masking stage 58 and computes an optimal use of the characteristic dynamic ranges of each color component of the color display, in this case Polaroid SX-70 Time Zero brand instant film. Exposure control functions that map the numerical output of the FIG.3 system into those which produce the desired representation on this film are calculated. These transformations are small because of the powerful improvements already incorporated in the image processing stages 20, 22 and 24, and in the color masking stage 58. This final exposure control stage is thus designed to fit the limited dynamic range of outputs from processors 20, 22 and 24 more closely to the particular dynamic range of the display device, e.g. the photographic film being used. The numerical transformation performed in one control stage 60 for the above-noted film is shown in the plot of FIG. 13. The transformation is identical for the red, green, and blue channels.

Having described the invention, what is claimed as new and secured by Letters Patent is set forth in the appended claims.

1. Apparatus for producing an image of a subject which comprises
   A. means for detecting radiance ratios between different areas of said subject and producing a first lightness-determining quantity in response to each such ratio,
   B. means for effecting said ratio detection for each area of said subject a multiple number of times with other areas of said subject which are at different locations on said subject relative to that area,
   C. means for combining each first lightness-determining quantity with a second lightness-determining quantity associated with one area in that ratio and replacing the second lightness-determining quantity associated with another area in that ratio in response thereto, and
   D. means for producing an image of the subject in which the lightness of the respective image areas is determined by the last replacement values of said second lightness-determining quantities.

2. Image processing apparatus for determining a field of accumulating measures of image lightness in response to information identifying optical radiance associated with arrayed sections of an image field, said apparatus having the improvement comprising
   A. means for sequentially determining a comparative measure of the radiance information for each segmental area of said image field relative to said information for each of plural other segmental areas, said means
      (i) providing a new intermediate value of each such measure in response to the product of a ratio function of the radiance information associated with each first-named segmental area and with each second-named segmental area and of a like measure previously determined for the second-named segmental area, and
      (ii) determining a sequentially new value of each said measure in response to a selectively weighted averaging of said new intermediate value and a like measure previously determined for said first-named segmental area, and
   B. means for the prior measure for each first-named segmental area in response to said newly-determined value, thereby to determine each measure in the field thereof in response to an accumulating succession of said measures.

3. Image processing apparatus according to claim 2 further characterized in that said measure-determining means includes means for determining different ones of each said plurality of measures for first-named and second-named areas that correspond to spatially different sections of said image field, where said spatial difference includes at least a difference in size of or in separation between first-named and second-named areas for which that measure is being determined.

4. Image processing apparatus for determining a field of accumulating measures of image lightness in response to information identifying optical radiance associated with an image field, said apparatus having the improvement comprising
   A. means for sequentially determining a comparative measure of the radiance information for each segmental area of said image field relative to said information for each of plural other segmental areas of that field, said means
      (i) providing a new intermediate value of each such comparative measure in response to the product of a ratio function of the radiance information associated with each first-named segmental area and with each second-named segmental area and of a like measure previously determined for the second-named segmental area, and further providing each such intermediate value with reference to a selected condition of said product, and
      (ii) determining a sequentially new value of each said comparative measure in response to a selectively weighted averaging of said new intermediate value and a like measure previously determined for said first-named segmental area, and B. means for replacing the previously determined measure for each first-named segmental area in response to said sequentially-determined new value, thereby to determine each measure in the field in response to an accumulating succession of said comparative measures.

5. Image processing apparatus according to claim 4 further characterized in that said measure determining means includes means for determining said measure for each first-named area relative to each of a set of second-named other areas, where said set includes areas at selected different image-field locations relative to said first-named area.

6. Image processing apparatus according to claim 4 further characterized in that said measure determining means includes means for effecting a determination of said measure for each of a selected plurality of areas prior to effecting a further such determination for an area of that plurality.

7. Image processing apparatus for determining information corresponding to image lightness in response to radiance-identifying information for a selected image field, said apparatus having the improvement comprising A. means for representing the radiance-identifying information for each of selected segmental areas of the viewing field, B. means for determining a selected comparison measure between said identifying information for each segmental area and said information for another segmental area, and for determining therefrom and from a previously-determined lightness-identifying quantity for each latter segmental area a newly-determined lightness-identifying quantity for each former segmental area, C. means for effecting a selected multiple of said determinations sequentially and between segmental areas that correspond to differently-spaced locations in said field of view, and D. means for producing said lightness-information for said image field in response to said multiple determinations.

8. Image processing apparatus according to claim 7 having the further improvement in which said means for effecting said determinations sequentially includes means for applying each newly-determined quantity of one determination as a previously-determined quantity in a subsequent determination.

9. Image processing apparatus according to claim 7 having the further improvement in which said means for effecting said determinations with differently-spaced locations includes means for ordering said determinations according to the magnitude of the spacing between locations.

10. Image processing apparatus according to claim 9 having the further improvement in which said means for ordering said determinations effects said ordering with determinations between areas of largest spacing being performed first.

11. Image processing apparatus according to claim 7 having the further improvement in which said means for determining includes means for operating on a set of said identifying information that is responsive to said selected image field to effect one said determination for each segmental area of the image field prior to effecting a further determination for any such segmental area.

12. Image processing apparatus according to claim 7 having the further improvement in which said means for effecting multiple determinations is further arranged to produce for each segmental area a lightness-identifying quantity that is responsive to radiance-identifying information for substantially every other segmental area of the image field.

13. Image processing apparatus for determining information corresponding to image lightness in response to radiance-identifying information for a selected image field, said apparatus having the improvement comprising A. means for representing said radiance-identifying information for each of selected segmental areas of the viewing field, B. means for determining a selected comparison measure between said identifying information for each segmental area and said information for another segmental area, and for determining therefrom and from a previously-determined lightness-identifying quantity for each latter segmental area a newly-determined lightness-identifying quantity for each former segmental area, said means for determining including means for effecting a determination of said measure for each of a selected plurality of areas prior to effecting a further such determination for an area of that plurality, C. means for effecting a selected multiple of said determinations for said plurality of areas sequentially, different ones of said sequential determinations being between segmental areas having a spatial parameter different from that of the areas of other such determinations, and for applying each newly-determined quantity of one determination as a previously-determined quantity in a subsequent determination, and further including means for ordering said determinations according to the magnitude of said spatial parameter, and D. means for producing said lightness-information for said image field in response to said multiple determinations.

14. Lightness-imaging apparatus having means for providing information identifying optical radiance associated with arrayed sections of a selected image field, said apparatus further comprising A. means for selectively grouping segmental areas of said image field a selected number of times, different ones of at least some of said groupings involving areas having at least one spatial parameter different from other groupings of areas, B. means for providing, for each grouping of segmental area, at least one measure of visually significant transition in said radiance information between areas of that grouping, said measures being with reference to a selected lightness condition, and C. means for determining image lightness for each arrayed section of the image field in response to a plurality of said measures, at least some of which are provided for groupings which differ from one another in at least one spatial parameter.

15. Imaging apparatus according to claim 14 in which each segmental area has a geometrical center, and in which said means for grouping provides different ones of at least some of said groupings among areas having a different spacing parameter between the geometrical centers thereof.

16. Imaging apparatus according to claim 14 in which each segmental area has a geometrical center, and in which said means for grouping provides different ones of at least some of said groupings among areas having a different spacing dimension between the geometrical centers thereof.

17. Imaging apparatus according to claim 14 in which each segmental area has a geometrical center, and in which said means for grouping provides different ones of at least some of said groupings among areas having a different spacing direction between the geometrical centers thereof.

18. Imaging apparatus according to claim 14 in which said means for grouping provides different ones of at least some of said groupings among areas having different separations between the edges thereof.

19. Imaging apparatus according to claim 14 in which said means for grouping provides different ones of at least some of said groupings among segmental areas having a size different from the sizes of segmental areas in other groupings.

20. Imaging apparatus according to claim 14 in which said means for grouping provides at least a first of said groupings with areas of uniform size and provides different ones of such groupings among areas having different separations in terms of at least one spatial parameter selected from the parameters of distance and of direction.

21. Imaging apparatus according to claim 14
    A. further comprising means for assigning each segmental area an initializing value of said measure.
    B. in which said measure-providing means includes means for providing each said measure in response to the product of a ratio function of the radiance information associated with grouped areas and the measure already assigned to a first of said grouped areas, and
    C. further comprising means for replacing the measure assigned to a second of said grouped areas in response to said product-responsive measure.

22. Imaging apparatus according to claim 14 further including means for resetting said product-responsive measure with reference to said selected lightness condition.

23. Imaging apparatus according to claim 21 in which said measure-providing means includes means for imposing a threshold on said ratio function.

24. Imaging apparatus according to claim 21 further comprising means for retaining the measure assigned to said second of said grouped areas, in lieu of said replacing, for each said second grouped area which is grouped with an area located beyond said image field.

25. Imaging apparatus according to claim 14 in which said measure-providing means includes means for resetting at least selected ones of said measures with reference to said selected lightness condition.

26. Imaging apparatus according to claim 14 in which said determining means determines image lightness in response to an arithmetic averaging function of plural ones of said measures provided for groupings which differ from one another in at least one spatial parameter.

27. Imaging apparatus according to claim 14 in which said measure-providing means includes means for providing at least some said measures in sequence with one another and for providing sequentially-successive measures in response, at least partially, to a preceding measure for an area of a grouping, thereby to determine said image lightness in response to an accumulating succession of said measures.

28. Imaging apparatus according to claim 27
    A. in which said means for grouping provides groupings which differ by a magnitude parameter, and
    B. in which said measure-providing means includes means for providing said sequential measures ordered between groupings of largest spatial parameter and groupings of smallest parameter.

29. Imaging apparatus according to claim 14 in which said measure-providing means includes
    A. means for sequentially providing different ones of said measures of visually-significant transition in radiance information for the same segmental area,
    B. means for assigning each segmental area an initializing prior value of said measure,
    C. means for providing an intermediate value of each said measure in response to the product of a ratio function of the radiance information associated with grouped areas and the measure already assigned to a first of said grouped areas,
    D. means for providing each said measure in response to a selectively weighted averaging of an intermediate value provided sequentially previously for said first of said grouped areas and of the prior measure for a second of said grouped areas, and
    E. means for replacing the prior measure for said second of said grouped areas in response to said averaging, thereby to determine image lightness in response to an accumulating succession of said measures.

30. In lightness-imaging apparatus having
    (i) means for providing information identifying optical radiance associated with each arrayed section of a selected image field,
    (ii) means for selectively pairing segmental areas of said image field a selected number of times, each said pairing being of segmental areas of identical configuration and size,
    (iii) means for providing, for each pairing of segmental areas, at least one comparative measure of said radiance information at the paired areas, and
    (iv) means for resetting each said measure with reference to a selected limit condition,
the improvement comprising means for determining image lightness for each arrayed section of the image field in response to a plurality of said reset measures, at least some of which are provided for pairings which differ from one another in at least one spatial parameter.

31. In imaging apparatus according to claim 30, the further improvement
    A. comprising means for assigning each segmental area an initializing value of said measure,
    B. in which said measure-providing means includes means for providing each said measure in response to the product of a ratio function of the radiance information associated with paired areas and the measure already assigned to a first of said paired areas, and
    C. further comprising means for assigning a replacement value to the measure assigned to a second of said paired areas in response to said product-responsive measure.

32. In imaging apparatus according to claim 30, the further improvement in which said means for pairing segmental areas includes means for providing different ones of said pairs of said areas with different spacing parameters ordered in said sequence from pairings of the largest parameter to pairings of the smallest parameter.

33. In imaging apparatus according to claim 30, the further improvement including
    A. memory means arranged for storing said radiance-identifying information, B. scroll means arranged with said memory means for providing said selective pairings of segmental areas, C. signal transformation means for providing said resetting of measures and for providing selectively transformed information in said memory means, and D. adder means arranged with said memory means, said scroll means and said transformation means for providing said comparative measures in response to selectively scrolled and transformed information in said memory means, and for providing an arithmetic averaging of plural reset measures, at least some of which are provided for pairings which differ from one another in at least one spatial parameter.

34. In imaging apparatus according to claim 30, the further improvement

A. in which said means for pairing segmental areas includes means for providing said number of pairs sequentially, B. comprising means for assigning each segmental area an initializing value of said measure, and C. in which said measure-providing means includes (1) means for providing an intermediate value of each said measure in response to the product of a ratio function of the radiance information associated with paired areas and the measure already assigned to a first area of each pair, (2) means for providing each said measure in response to a selectively weighted averaging of the last previously provided intermediate value for said first area of each pair and the last previously provided prior measure for a second area of each pair, and (3) means for proving a replacement for the prior measure for each second area in response to said averaging, thereby to determine image lightness in response to an accumulating succession of said measures.

35. In imaging apparatus according to claim 34, the further improvement in which said measure-providing means includes means for providing a unity ratio in response to radiance values within a selected measure of one another.

36. In imaging apparatus according to claim 34 the further improvement in which said measure-providing means includes means for producing said measure, for each second area which is paired with a first area located beyond the image field, in response exclusively to the measure already assigned to that second area.

37. In imaging apparatus according to claim 30, the further improvement in which A. each segmental area corresponds to a coordinate-identified location of said image field, and B. said means for pairing provides a pairing of each of plural second areas with a different first area removed therefrom by the same coordinate direction and spacing.

38. In imaging apparatus according to claim 37, the further improvement

A. in which said means for pairing segmental areas includes means for providing said number of pairs sequentially, B. comprising means for assigning each segmental area an initializing prior measure and for updating each prior measure in response to the measure provided for each sequential pairing, and C. comprising means for providing said measure, for each second area paired with a first area located beyond said image field in said coordinate direction, in response only to the prior measure assigned to that second area.

39. Image processing apparatus comprising

A. first and second signal addder means,

B. first and second delay means, each arranged to apply signals output therefrom to an input of the same-numbered adder means, C. first and second signal transformation means, each arranged to apply signals output therefrom to a further input of the same-numbered adder means, said first transformation means having a polarity inversion function and said second transformation means having a reset function and being arranged to receive signals output from said first adder means, D. first memory means arranged to apply signals read therefrom to said first transformation means and to said first delay means, E. second memory means arranged to apply signals read therefrom to a further input of said first adder means and to said second delay means, F. further signal transformation means having a compress function and arranged to receive signals from said second added means and to apply signals to an input of said second memory means, and G. control means for controlling said adder means, delay means, transformation means and memory means for applying signals to said first adder means from said first transformation means and from said first delay means and from said second memory means with selected relative timing, and to apply signals to said second adder means from said second transformation means and from said second delay means with selected timing relative to one another and relative to said application of signals to said first adder means.

40. Lightness-imaging apparatus having means for providing information identifying optical radiance associated with arrayed sections of a selected image field, said apparatus further comprising A. means for pairing identically configured and sized segmental areas of said viewing field differently a number of times and for providing a multiple of sets of said different pairings, each said set involving areas of a size different from other sets, B. means for providing, for each pairing of segmental areas, a comparative measure of said radiance information at the paired areas, C. means for resetting each said measure with reference to a selected limit, and D. means for determining image lightness for each arrayed section of the image field in response to a plurality of said reset measures.

41. Imaging apparatus according to claim 40

A. further comprising means for assigning each segmental area an initializing value of said measure, B. in which said measure-providing means includes (1) means for providing each said measure in response to the product of a ratio function of the radiance information associated with the two paired areas and the measure already assigned to a first of said paired areas, and (2) means for replacing the measure assigned to each second area of a pair in response to said product, and C. in which said means for determining includes
  (1) means for providing said replaced measures for each set of pairings sequentially for different sets thereof, and
  (2) means for producing an initializing value of said measure for all but the sequentially first set of pairings in response to the replaced measure produced with the last pairing of the sequentially preceding set thereof.

42. Imaging apparatus according to claim 40
A. in which said measure-providing means includes means for providing multiple measures of image-field lightness for said pairings in each set thereof, and
B. in which said means for determining includes means for arithmetically combining said measures from each set of pairings.

43. Lightness-imaging apparatus having means for providing information identifying optical radiance associated with each arrayed section of a selected image field, said apparatus further comprising
A. means for selectively pairing segmental areas of said image field a selected number of times, each said pairing being of segmental areas of identical configuration and size,
B. means for providing, for each pairing of segmental areas, at least one measure of transition in said radiance information between the paired areas, said measure conforming to the equation:

$$\log ip(xy) = \log op(o,o) + \log r(x,y) - \log r(o,o)$$

where
  $\log ip(x,y)$ is the log of the measure for a first segmental area at location $(x,y)$ in the image field relative to a reference location for a second area paired therewith,
  $\log op(o,o)$ is the log of the measure previously assigned to or determined for said second segmental area at said reference location $(o,o)$ in the image field and paired with said first area, and
  $\log r(x,y)$ and $\log r(o,o)$ are the logs of the radiance information for said first and second paired areas, respectively, C. means for resetting each said measure with reference to a selected limit, and
D. means for determining image lightness for each arrayed section of the image field in response to an arithmetic averaging of a plurality of said reset measures, at least some of which are provided for pairings which differ from one another in at least one spatial parameter.

44. Lightness-imaging apparatus having means for providing information identifying optical radiance associated with each arrayed section of a selected image field, said apparatus further comprising
A. means for selectively pairing segmental areas of said image field a selected number of times, each said pairing being of segmental areas of identical configuration and size,
B. means for providing, for each pairing of segmental areas, at least one measure of transition in said radiance information between the paired areas, said measure conforming to the equation:

$$\log np(x,y) = 1/2([\log op(x,y)] + [\log op(o,o) + \log r(x,y) - \log r(o,o)])$$

where
  $\log np(x,y)$ is the log of the measure for a first segmental area at location $(x,y)$ in the image field relative to a reference location for a second area paired therewith,
  $\log op(x,y)$ is the log of the measure previously assigned to or determined for said first area,
  $\log op(o,o)$ is the log of the measure previously assigned to or determined for said second segmental area at said reference location $(o,o)$ in the image field and paired with said first area, and
  $\log r(x,y)$ and $\log r(o,o)$ are the logs of the radiance information for said first and second paired areas, respectively,
  and where each said term $[\log op(o,o) + \log r(x,y) - \log r(o,o)]$ is reset with reference to a selected limit.

45. Imaging apparatus according to claim 44 further comprising means for determining image lightness for each arrayed section of the image field in response to an arithmetic averaging of a plurality of said reset measures, at least some of which are provided for pairings which differ from one another in at least one spatial parameter.

46. A method for producing an image of a subject comprising the steps of
A. detecting radiance ratios between different areas of said subject and producing a first lightness-determining quantity in response to each such ratio,
B. effecting said ratio detection for each area of said subject a multiple number of times with other areas of said subject which are at different locations on said subject relative to that area,
C. combining each first lightness-determining quantity with a second lightness-determining quantity associated with one area in that ratio and replacing the second lightness-determining quantity associated with another area in that ratio in response thereto, and
D. producing an image of the subject in which the lightness of the respective image areas is determined by the last replacement values of said second lightness-determining quantities.

47. An image-processing method for determining a field of accumulating measures of image lightness in response to information identifying optical radiance associated with an image field, said method having the improvement comprising the steps of
A. sequentially determining a comparative measure of the radiance information for each segmental area of said image field relative to said information for each of plural other segmental areas, said method-determining step including
  (i) providing a new intermediate value of each such measure in response to the product of a ratio function of the radiance information associated with each first-named segmental area and with each second-named segmental area and of a like measure previously determined for the second-named segmental area,
  (ii) determining a sequentially new value of each said measure in response to a selectively weighted averaging of said new intermediate value and a like measure previously determined for said first-named segmental area, and
B. updating the previously determined measure for each first-named segmental area in response to said sequentially-determined new value, thereby to determine each measure in the field in response to an accumulating succession of said measures.

48. An image processing method according to claim 47 further characterized in that said measure-determining step includes determining different ones of each said plurality of measures for first-named and second-named areas that correspond to spatially different sections of said image field, where said spatial difference includes at least a difference in size of or in separation between first-named and second-named areas for which that measure is being determined.

49. An image processing method for determining a field of accumulating measures of image lightness in response to information identifying optical radiance associated with an image field, said method having the improvement comprising the steps of
  A. sequentially determining a comparative measure of the radiance information for each segmental area of said image field relative to said information for each of plural other segmental areas of that field, said measure-determination including
    (i) providing a new intermediate value of each such comparative measure in response to the product of a ratio function of the radiance information associated with each first-named segmental area and with each second-named segmental area and of a like measure previously determined for the second-named segmental area, and further providing each such intermediate value with reference to a selected condition of said product, and
    (ii) determining a sequentially new value of each said comparative measure in response to a selectively weighted averaging of said new intermediate value and a like measure previously determined for said first-named segmental area, and
  B. replacing the previously-determined measure for each first-named segmental area in response to said sequentially new value, thereby to determine each measure in the field thereof in response to an accumulating succession of said comparative measures.

50. An image processing method according to claim 49 further characterized in that said measure-determining step includes determining said measure for each first-named area relative to each of a set of second-named other areas, where said set includes areas at selected different image-field locations relative to said first-named area.

51. An image processing method according to claim 49 further characterized in that said measure determining step includes effecting a determination of said measure for each of a selected plurality of areas prior to effecting a further such determination for an area of that plurality.

52. An image processing method for determining information corresponding to image lightness in response to radiance-identifying information for a selected image field, said method having the improvement comprising the steps of
  A. representing said radiance-identifying information for each of selected segmental areas of the viewing field,
  B. determining a selected comparison measure between said identifying information for each segmental area and said information for another segmental area, and determining therefrom and from a previously-determined lightness-identifying quantity for each latter segmental area a newly-determined lightness-identifying quantity for each former segmental area,
  C. effecting a selected multiple of said computations sequentially between segmental areas that correspond to differently-spaced locations in said field of view, and
  D. producing said lightness-information for said image field in response to said multiple determinations.

53. An image processing method according to claim 52 having the further improvement in which said step of effecting said determinations sequentially includes applying each newly-determined quantity of one determination as a previously-determined quantity in a subsequent determination.

54. An image processing method according to claim 52 having the further improvement in which said step of effecting said determinations with differently-spaced locations includes ordering said determinations according to the magnitude of the spacing between locations.

55. An image processing method according to claim 52 having the further improvement in which said step of determining includes operating on a set of said identifying information that is responsive to said selected image field to effect one said determination for each segmental area of the image field prior to effecting a further determination for any such segmental area.

56. An image processing method according to claim 52 having the further improvement in which said step of effecting multiple determinations is further adapted for producing for each segmental area a lightness-identifying quantity that is responsive to radiance-identifying information for substantially every other segmental area of the image field.

57. An image processing method for determining information corresponding to image lightness in response to radiance-identifying information for a selected image field, said method having the improvement comprising the steps of
  A. representing said radiance-identifying information for each of selected segmental areas of the viewing field,
  B. determining a selected comparison measure between said identifying information for each segmental area and said information for another segmental area, and determining therefrom and from a previously-determined lightness-identifying quantity for each former segmental area a newly-determined lightness-identifying quantity for each latter segmental area, said measure-determination including means for effecting a determination of said measure for each of a selected plurality of areas prior to effecting a further such determination for an area of that plurality,
  C. effecting a selected multiple of said determinations for said plurality of areas sequentially, different ones of said sequential determinations being between segmental areas having a spatial parameter different from that of the areas of other such determinations, and applying each newly-determined quantity of one determination as a previously-determined quantity in a subsequent determination, and further including ordering said determinations according to the magnitude of said spatial parameter, and
  D. producing said lightness-information for said image field in response to said multiple determina- 58. A lightness-imaging method in which information is provided identifying optical radiance associated with arrayed sections of a selected image field, said method further comprising the steps of
  A. selectively grouping segmental areas of said image field a selected number of times, different ones of at least some of said groupings involving areas having at least one spatial parameter different from other groupings of areas,
  B. providing, for each grouping of segmental areas, at least one measure of visually significant transition in said radiance information between areas of that grouping, said measures being with reference to a selected lightness condition, and
  C. determining image lightness for each arrayed section of the image field in response to a plurality of said measures, at least some of which are provided for groupings which differ from one another in at least one spatial parameter selected from the parameters of distance, direction and size.

59. An imaging method according to claim 58 in which said grouping step provides at least a first of said groupings with areas of uniform size and provides different ones of such groupings among areas having different separations in terms of at least one spatial parameter selected from the parameters of distance and of direction.

60. A imaging method according to claim 58
  A. further comprising the step of assigning each segmental area an initializing value of said measure,
  B. in which said measure-providing step includes providing each said measure in response to the product of a ratio function of the radiance information associated with grouped areas and the measure already assigned to a first of said grouped areas, and
  C. further comprising the step of assigning a replacement value to the measure assigned to a second of said grouped areas in response to said product-responsive measure.

61. An imaging method according to claim 60 further including the step of resetting said product-responsive measure with reference to said selected lightness condition.

62. An imaging method according to claim 60 in which said measure-providing step includes imposing a threshold on said ratio function.

63. An imaging method according to claim 60 further comprising the step of retaining the measure assigned to said second of said grouped areas, in lieu of said assignment of a replacement value, for each said second grouped area which is paired with an area located beyond said image field.

64. An imaging method according to claim 58 in which said determining step includes determining image lightness in response to an arithmetic averaging function of plural ones of said measures provided for groupings which differ from one another in at least one spatial parameter.

65. An imaging method according to claim 58 in which said measure-providing step includes providing at least some said measures in sequence with one another and for providing sequentially-successive measures in response, at least partially, to a preceding measure for an area of a grouping, thereby to determine said image lightness in response to an accumulating succession of said measures.

66. An imaging method according to claim 65
  A. in which said grouping step provides groupings which differ by a magnitude parameter, and
  B. in which said measure-providing step includes providing said sequential measures ordered between groupings of largest spatial parameter and groupings of smallest parameter.

67. In a lightness-imaging method in which information is provided identifying optical radiance associated with each arrayed section of a selected image field, and including
  (i) selectively pairing segmental areas of said image field a selected number of times, each said pairing being of segmental areas of identical configuration and size,
  (ii) providing, for each pairing of segmental areas, at least one comparative measure of said radiance information at the paired areas, and
  (iii) resetting each said measure with reference to a selected limit condition,
the improvement comprising the further step of determining image lightness for each arrayed section of the image field in response to a plurality of said reset measures, at least some of which are provided for pairings which differ from one another in at least one spatial parameter.

68. In an imaging method according to claim 67, the further improvement
  A. comprising the step of assigning each segmental area an initializing value of said measure,
  B. in which said measure-providing step includes providing each said measure in response to the product of a ratio function of the radiance information associated with paired areas and the measure already assigned to a first of said paired areas, and
  C. comprising the step of assigning a replacement value to the measure assigned to a second of said paired areas in response to said product-responsive measure.

69. In an imaging method according to claim 67, the further improvement in which said step of pairing segmental areas includes providing different oes of said pairs of said areas with different spacing parameters ordered in said sequence from pairings of the largest parameter to pairings of the smallest parameter.

70. In an imaging method according to claim 67, the further improvement
  A. in which said step of pairing segmental areas includes providing said number of pairs sequentially,
  B. comprising the step of assigning each segmental area an initializing value of said measure, and
  C. in which said measure-providing step includes
    (1) providing an intermediate value of each said measure in response to the product of a ratio function of the radiance information associated with paired areas and the measure already assigned to a first area of each pair,
    (2) providing each said measure in response to a selectively weighted averaging of the last previously provided intermediate value for said first area of each pair and the last previously provided prior measure for a second area of each pair, and
    (3) providing a replacement value for the prior measure for each second area in response to said averaging, thereby to determine image lightness in response to an accumulating succession of said measures.

71. In an imaging method according to claim 70, the further improvement in which said measure-providing step includes providing a unity ratio in response to radiance values within a selected measure of one another.

72. In an imaging method according to claim 70, the further improvement in which said measure-providing step includes producing said measure, for each second area which is paired with a first area located beyond the image field, in response exclusively to the measure already assigned to that second area.

73. In an imaging method according to claim 67 in which each segmental area corresponds to a coordinate-identified location of said image field, the further improvement
- A. in which said pairing step provides a pairing of each of plural second areas with a different first area removed therefrom by the same coordinate direction and spacing,
- B. in which said step of pairing segmental area includes providing said number of pairs sequentially, and
- C. comprising the steps of
  - (1) assigning each segmental area an initializing prior measure,
  - (2) updating each prior measure in response to the measure provided for each sequential pairing, and
  - (3) providing said measure, for each second area paired with a first area located beyond said image field in said coordinate direction, in response only to the prior measure assigned to that second area.

74. A lightness-imaging method in which information is provided identifying optical radiance associated with arrayed sections of a selected image field, said method comprising the step of
- A. pairing identically configured and sized segmental areas of said viewing field differently a number of times and for providing a multiple of sets of said different pairings, each said set involving areas of a size different from other sets,
- B. providing, for each pairing of segmental areas, a comparative measure of said radiance information at the paired areas,
- C. resetting each said measure with reference to a selected limit condition, and
- D. determining image lightness for each arrayed section of the image field in response to a plurality of said reset measures.

75. An imaging method according to claim 74
- A. further comprising the step of assigning each segmental area an initializing value of said measure,
- B. in which said measure-providing step includes
  - (1) providing each said measure in response to the product of a ratio function of the radiance information associated with the two paired areas and the measure already assigned to a first of said paired areas, and
  - (2) replacing the measuring assigned to each second area of a pair in response to said product, and
- C. in which said determining step includes
  - (1) providing said replaced measures for each set of pairings sequentially for different sets thereof, and
  - (2) producing an initializing value of said measure for all but the sequentially first set of pairings in response to the replaced measure produced with the last pairing of the sequentially preceding set thereof.

76. A lightness-imaging method in which information is provided identifying optical radiance associated with each arrayed section of a selected image field, said method comprising the steps of
- A. selectively pairing segmental areas of said image field a selected number of times, each said pairing being of segmental areas of identical configuration and size,
- B. providing, for each pairing of segmental areas, at least one measure of transition in said radiance information between the paired areas, said measure conforming to the equation:

$$\log ip(x,y) = \log op(o,o) + \log r(x,y) - \log r(o,o)$$

where
- $\log ip(x,y)$ is the log of the measure for a first segmental area at location $(x,y)$ in the image field relative to a reference location for a second area paired therewith,
- $\log op(o,o)$ is the log of the measure previously assigned to or determined for said second segmental area at said reference location $(o,o)$ in the image field and paired with said first area, and
- $\log r(x,y)$ and $\log r(o,o)$ are the logs of the radiance information for said first and second paired areas, respectively,
- C. resetting each said measure with reference to a selected limit, and
- D. determining image lightness for each arrayed section of the image field in response to an arithmetic averaging of a plurality of said reset measures, at least some of which are provided for pairings which differ from one another in at least one spatial parameter.

77. A lightness-imaging method in which information is provided identifying optical radiance associated with each arrayed section of a selected image field, said method comprising the steps of
- A. selectively pairing segmental areas of said image field a selected number of times, each said pairing being of segmental areas of identical configuration and size,
- B. providing, for each pairing of segmental areas, at least one measure of transition in said radiance information between the paired areas, said measure conforming to the equation:

$$\log np(x,y) = 1/2\{[\log op(x,y)] + [\log op(o,o) + \log r(x,y) - \log r(o,o)]\}$$

where
- $\log np(x,y)$ is the log of the measure for a first segmental area at location $(x,y)$ in the image field relative to a reference location for a second area paired therewith,
- $\log op(x,y)$ is the log of the measure previously assigned to or determined for said first area,
- $\log op(o,o)$ is the log of the measure previously assigned to or determined for said second segmental area at said reference location $(o,o)$ in the image field and paired with said first area, and
- $\log r(x,y)$ and $\log r(o,o)$ are the logs of the radiance information for said first and second paired areas, respectively,
  and where each said term $[\log op(o,o) + \log r(x,y) - \log r(o,o)]$ is reset with reference to a selected limit.

78. An imaging method according to claim 77 further comprising the step of determining image lightness for each arrayed section of the image field in response to an arithmetic averaging of a plurality of said reset measures, at least some of which are provided for pairings which differ from one another in at least one spatial parameter.

79. Image processing apparatus comprising
A. means for receiving information responsive to the radiance values defining an image field, and
B. means for deriving from said information a lightness field containing final lightness values for predetermined segmental areas of said image field, said final lightness value deriving means establishing initial lightness values for all areas of said image field and sequentially performing a selected number of process steps for said image field, in each step of which process selected areas of said image field are selectively paired with different areas of said image field and in successive steps of which process such pairings of areas differ from other pairings in at least one spatial parameter according to a predetermined sequence, and in each of which steps such paired areas are compared to establish a new lightness value for each said selected area as a function of the ratio of its radiance value to that of the different area with which it is paired and as a function of lightness values established for such paired areas in a preceding process step, and wherein said final lightness value for each said segmental area comprises an effective comparison of information responsive to its radiance value to information responsive to the radiance value from substantially all other areas of said image field without a direct comparison to each of said other segmental areas.

80. Image processing apparatus according to claim 79 in which said lightness-value deriving means includes means for establishing each new lightness value with reference to at least one selected lightness condition.

81. Image processing apparatus according to claim 79 in which said lightness value deriving means includes means for pairing areas of uniform like size throughout at least a selected portion of said process steps and for selecting at least one spatial parameter for pairing, in successive steps, areas spaced apart by a distance that decreases progressively in the course of at least said portion of said process steps.

82. Image processing apparatus according to claim 79 in which said lightness value deriving means includes means for pairing areas of like size in each said process step, and for selecting at least one spatial parameter to decrease the sizes, in said image field, of said paired areas in at least selected different steps progressively in the course of said process steps.

83. Image processing apparatus according to claim 79 in which said lightness value deriving means includes means for selecting said one spatial parameter to decrease in magnitude, at at least selected successive steps, in the course of said process steps.

84. Image processing apparatus comprising
A. means for receiving information responsive to the radiance values defining an image field, and
B. means for deriving from said information a lightness field containing final lightness values for predetermined segmental areas of said image field, said final lightness value deriving means establishing initial lightness values for all areas of said image field and performing a selected number of process steps for said image field, in each step of which process selected areas of said image field are selectively paired with different areas of said image field and in different steps of which process such pairings of areas differ selectively from other pairings in at least one spacial parameter, and in each of which steps such paired areas are compared to establish a new lightness value for each said selected area as a function of the ratio of its radiance value to that of the different area with which it is paired and as a function of lightness values established for such paired areas in a different process step, and in which said one spatial parameter is selected, for at least selected different ones of such pairings, to establish new lightness values for areas that are at least relatively small or relatively closely spaced apart using lightness values established for areas that are comparatively larger or comparatively further spaced apart, and wherein said final lightness value for each said segmental area comprises an effective comparison of information responsive to its radiance value to information responsive to the radiance value from substantially all other areas of said image field without a direct comparison to each of said other segmental areas.

85. An image processing method comprising the steps of
A. receiving information responsive to the radiance values defining an image field, and
B. deriving from said information a lightness field containing final lightness values for predetermined segmental areas of said image field, said final lightness value deriving step establishing initial lightness values for all areas of said image field and sequentially performing a selected number of process steps for said image field, in each step of which process selected areas of said image field are selectively paired with different areas of said image field and in successive steps of which process such pairings of areas differ from other pairings in at least one spatial parameter according to a predetermined sequence, and in each of which steps such paired areas are compared to establish a new lightness value for each said selected area as a function of the ratio of its radiance value to that of the different area with which it is paired and as a function of lightness values established for such paired areas in a preceding process step, and wherein said final lightness value for each said segmental area comprises an effective comparison of information responsive to its radiance value to information responsive to the radiance value from substantially all other areas of said image field without a direct comparison to each of said other segmental areas.

86. An image processing method comprising the steps of
A. receiving information responsive to the radiance values defining an image field, and
B. deriving from said information a lightness field containing final lightness values for predetermined segmental areas of said image field, said final lightness value deriving step establishing initial lightness values for all areas of said image field and performing a selected number of process steps for said image field, in each step of which process selected areas of said image field are selectively paired with different areas of said image field and in different steps of which process such pairings of areas differ selectively from other pairings in at least one spacial parameter, and in each of which steps such paired areas are compared to establish a new lightness value for each said selected area as a function of the ratio of its radiance value to that of the different area with which it is paired and as a function of lightness values established for such paired areas in a different process step, and in which said one spatial parameter is selected, for at least selected different ones of such pairings, to establish new lightness values for areas that are at least relatively small or relatively closely spaced apart using lightness values established for areas that are comparatively larger or comparatively further spaced apart, and wherein said final lightness value for each said segmental area comprises an effective comparison of information responsive to its radiance value to information responsive to the radiance value from substantially all other areas of said image field without a direct comparison to each of said other segmental areas.

* * * * *